(12) United States Patent
Karty et al.

(10) Patent No.: US 9,799,041 B2
(45) Date of Patent: Oct. 24, 2017

(54) METHOD AND APPARATUS FOR INTERACTIVE EVOLUTIONARY OPTIMIZATION OF CONCEPTS

(71) Applicant: Affinnova, Inc., Waltham, MA (US)

(72) Inventors: Kevin D. Karty, Lincoln, MA (US); Steven H. Lamoureux, Boston, MA (US); Jenkin Espinosa Lee, Sparta, NJ (US); Mark Gerard Flynn, Somerville, MA (US); Xinyan Chen, Charlottesville, VA (US)

(73) Assignee: The Nielsen Company (US), LLC, New York, NY (US)

( * ) Notice: Subject to any disclaimer, the term of this patent is extended or adjusted under 35 U.S.C. 154(b) by 226 days.

(21) Appl. No.: 14/211,788

(22) Filed: Mar. 14, 2014

(65) Prior Publication Data
US 2014/0344013 A1 Nov. 20, 2014

Related U.S. Application Data

(60) Provisional application No. 61/788,476, filed on Mar. 15, 2013, provisional application No. 61/792,611, filed on Mar. 15, 2013.

(51) Int. Cl.
G06Q 10/00 (2012.01)
G06Q 30/00 (2012.01)
(Continued)

(52) U.S. Cl.
CPC ......... G06Q 30/0201 (2013.01); G06N 3/126 (2013.01)

(58) Field of Classification Search
CPC ...................... G06Q 10/00–50/00; G06Q 3/00
(Continued)

(56) References Cited

U.S. PATENT DOCUMENTS 4,115,761 A 9/1978 Ueda et al.
4,603,232 A 7/1986 Kurland et al.
(Continued)

FOREIGN PATENT DOCUMENTS

CA  WO 2008022341 A2 * 2/2008 .......... G06K 9/6221
JP  2001331627  11/2001
(Continued)

OTHER PUBLICATIONS

U.S., "Final Office Action" issued in connection with U.S. Appl. No. 14/559,084, dated Jul. 17, 2015 (8 pages).
(Continued)

Primary Examiner — Alan S Miller
(74) Attorney, Agent, or Firm — Hanley, Flight & Zimmerman, LLC

(57) ABSTRACT

A method includes determining a plurality of data points, determining a distance between each data point and each of the other plurality of data points, choosing a first one of the plurality of data points, identifying all of the other plurality of data points within a maximum distance of the chosen data point, repeating steps the previous steps to choose a different one of the plurality of data points until all of the data points have been chosen, identifying one or more clusters each having a predefined minimum number, K, of data points within a predefined search radius and analyzing the one or more clusters with respect to K linkages.

16 Claims, 32 Drawing Sheets

(51) Int. Cl.
  *G06Q 30/02*    (2012.01)
  *G06N 3/12*    (2006.01)
(58) Field of Classification Search
  USPC .............................................. 705/7.11–7.42
  See application file for complete search history.

(56) References Cited

U.S. PATENT DOCUMENTS

| | | | |
|---|---|---|---|
| 4,908,761 A | | 3/1990 | Tai |
| 4,935,877 A | | 6/1990 | Koza |
| 5,041,972 A | * | 8/1991 | Frost .................... G06F 17/18 |
| | | | 705/7.32 |
| 5,090,909 A | | 2/1992 | Kellar et al. |
| 5,124,911 A | * | 6/1992 | Sack .................... G06Q 30/02 |
| | | | 705/7.32 |
| 5,124,991 A | | 6/1992 | Allen |
| 5,222,192 A | | 6/1993 | Shaefer |
| 5,255,345 A | | 10/1993 | Shaefer |
| 5,299,115 A | | 3/1994 | Fields et al. |
| 5,375,195 A | | 12/1994 | Johnston |
| 5,400,248 A | | 3/1995 | Chisholm |
| 5,420,786 A | | 5/1995 | Felthauser et al. |
| 5,559,729 A | | 9/1996 | Abe |
| 5,583,763 A | | 12/1996 | Atcheson et al. |
| 5,608,424 A | | 3/1997 | Takahashi et al. |
| 5,615,341 A | | 3/1997 | Agrawal et al. |
| 5,651,098 A | | 7/1997 | Inoue et al. |
| 5,654,098 A | | 8/1997 | Aono et al. |
| 5,687,369 A | | 11/1997 | Li |
| 5,704,017 A | | 12/1997 | Heckerman et al. |
| 5,717,865 A | | 2/1998 | Stratmann |
| 5,724,567 A | | 3/1998 | Rose et al. |
| 5,734,890 A | | 3/1998 | Case et al. |
| 5,754,938 A | * | 5/1998 | Herz .................... G06Q 20/383 |
| | | | 348/E7.056 |
| 5,819,245 A | | 10/1998 | Peterson et al. |
| 5,884,282 A | | 3/1999 | Robinson |
| 5,893,098 A | | 4/1999 | Peters et al. |
| 5,913,204 A | | 6/1999 | Kelly |
| 5,918,014 A | | 6/1999 | Robinson |
| 5,930,780 A | | 7/1999 | Hughes et al. |
| 5,995,951 A | | 11/1999 | Ferguson |
| 6,012,051 A | | 1/2000 | Sammon, Jr. et al. |
| 6,029,139 A | | 2/2000 | Cunningham et al. |
| 6,041,311 A | | 3/2000 | Chislenko et al. |
| 6,064,980 A | | 5/2000 | Jacobi et al. |
| 6,064,996 A | | 5/2000 | Yamaguchi et al. |
| 6,070,145 A | | 5/2000 | Pinsley et al. |
| 6,078,740 A | | 6/2000 | Detreville |
| 6,088,510 A | | 7/2000 | Sims |
| 6,093,026 A | | 7/2000 | Walker et al. |
| 6,115,700 A | | 9/2000 | Ferkinhoff et al. |
| 6,125,351 A | | 9/2000 | Kauffman |
| 6,151,585 A | | 11/2000 | Altschuler et al. |
| 6,155,839 A | | 12/2000 | Clark et al. |
| 6,167,445 A | | 12/2000 | Gai et al. |
| 6,175,833 B1 | | 1/2001 | West et al. |
| 6,202,058 B1 | | 3/2001 | Rose et al. |
| 6,233,564 B1 | | 5/2001 | Schulze, Jr. |
| 6,236,977 B1 | | 5/2001 | Verba et al. |
| 6,249,714 B1 | | 6/2001 | Hocaoglu et al. |
| 6,266,649 B1 | | 7/2001 | Linden et al. |
| 6,281,651 B1 | | 8/2001 | Haanpaa et al. |
| 6,304,861 B1 | | 10/2001 | Ferguson |
| 6,366,890 B1 | | 4/2002 | Usrey |
| 6,380,928 B1 | | 4/2002 | Todd |
| 6,385,620 B1 | | 5/2002 | Kurzius et al. |
| 6,438,579 B1 | | 8/2002 | Hosken |
| 6,460,036 B1 | | 10/2002 | Herz |
| 6,477,504 B1 | | 11/2002 | Hamlin et al. |
| 6,546,380 B1 | | 4/2003 | Lautzenheiser et al. |
| 6,574,585 B2 | | 6/2003 | Caruso et al. |
| 6,629,097 B1 | | 9/2003 | Keith |
| 6,636,862 B2 | | 10/2003 | Lundahl et al. |
| 6,741,967 B1 | | 5/2004 | Wu et al. |
| 6,754,635 B1 | | 6/2004 | Hamlin et al. |
| 6,778,807 B1 | | 8/2004 | Martino et al. |
| 6,826,541 B1 | | 11/2004 | Johnston et al. |
| 6,839,680 B1 | | 1/2005 | Liu et al. |
| 6,859,782 B2 | | 2/2005 | Harshaw |
| 6,873,965 B2 | | 3/2005 | Feldman et al. |
| 6,901,424 B1 | | 5/2005 | Winn |
| 6,915,269 B1 | | 7/2005 | Shapiro et al. |
| 6,934,748 B1 | | 8/2005 | Louviere et al. |
| 6,944,514 B1 | | 9/2005 | Matheson |
| 6,993,495 B2 | | 1/2006 | Smith, Jr. et al. |
| 6,999,987 B1 | | 2/2006 | Billingsley et al. |
| 7,016,882 B2 | | 3/2006 | Afeyan et al. |
| 7,054,828 B2 | | 5/2006 | Heching et al. |
| 7,058,590 B2 | | 6/2006 | Shan |
| 7,114,163 B2 | | 9/2006 | Hardin et al. |
| 7,177,851 B2 | | 2/2007 | Afeyan et al. |
| 7,197,485 B2 | | 3/2007 | Fuller |
| 7,233,914 B1 | | 6/2007 | Wijaya et al. |
| 7,249,044 B2 | | 7/2007 | Kumar et al. |
| 7,269,570 B2 | | 9/2007 | Krotki |
| 7,281,655 B2 | | 10/2007 | Wagner et al. |
| 7,302,475 B2 | | 11/2007 | Gold et al. |
| 7,308,418 B2 | | 12/2007 | Malek et al. |
| 7,337,127 B1 | | 2/2008 | Smith et al. |
| 7,359,913 B1 | * | 4/2008 | Ordonez .......... G06F 17/30598 |
| 7,398,223 B2 | | 7/2008 | Kahlert et al. |
| 7,610,249 B2 | | 10/2009 | Afeyan et al. |
| 7,630,986 B1 | | 12/2009 | Herz et al. |
| 7,711,580 B1 | | 5/2010 | Hudson |
| 7,730,002 B2 | | 6/2010 | Afeyan et al. |
| 7,836,057 B1 | | 11/2010 | Micaelian et al. |
| 7,860,776 B1 | | 12/2010 | Chin et al. |
| 7,877,346 B2 | | 1/2011 | Karty |
| 7,912,898 B2 | | 3/2011 | Gold et al. |
| 8,082,519 B2 | | 12/2011 | Oron et al. |
| 8,103,540 B2 | | 1/2012 | Gross |
| 8,150,795 B2 | | 4/2012 | Montgomery, Jr. et al. |
| 8,234,152 B2 | | 7/2012 | Jepson et al. |
| 8,620,717 B1 | | 12/2013 | Micaelian et al. |
| 8,868,448 B2 | | 10/2014 | Freishtat et al. |
| RE46,178 E | | 10/2016 | Afeyan et al. |
| 2001/0013009 A1 | | 8/2001 | Greening et al. |
| 2002/0002482 A1 | | 1/2002 | Thomas |
| 2002/0016731 A1 | | 2/2002 | Kupersmit |
| 2002/0046128 A1 | | 4/2002 | Abe et al. |
| 2002/0052774 A1 | | 5/2002 | Parker et al. |
| 2002/0077881 A1 | | 6/2002 | Krotki |
| 2002/0087388 A1 | | 7/2002 | Keil et al. |
| 2002/0128898 A1 | | 9/2002 | Smith, Jr. et al. |
| 2002/0133502 A1 | | 9/2002 | Rosenthal et al. |
| 2002/0152110 A1 | | 10/2002 | Stewart et al. |
| 2002/0161664 A1 | | 10/2002 | Shaya et al. |
| 2002/0169727 A1 | | 11/2002 | Melnick et al. |
| 2003/0014291 A1 | | 1/2003 | Kane et al. |
| 2003/0018517 A1 | | 1/2003 | Dull et al. |
| 2003/0074369 A1 | * | 4/2003 | Schuetze .......... G06F 17/3071 |
| 2003/0078900 A1 | | 4/2003 | Dool |
| 2003/0088457 A1 | | 5/2003 | Keil et al. |
| 2003/0088458 A1 | * | 5/2003 | Afeyan .................... G06F 17/50 |
| | | | 706/13 |
| 2003/0140012 A1 | | 7/2003 | Harvey et al. |
| 2003/0187708 A1 | | 10/2003 | Baydar et al. |
| 2003/0233337 A1 | | 12/2003 | Yanase et al. |
| 2004/0123247 A1 | | 6/2004 | Wachen et al. |
| 2004/0133468 A1 | | 7/2004 | Varghese |
| 2004/0181461 A1 | | 9/2004 | Raiyani et al. |
| 2004/0199923 A1 | | 10/2004 | Russek |
| 2004/0204957 A1 | | 10/2004 | Afeyan et al. |
| 2004/0210471 A1 | | 10/2004 | Luby et al. |
| 2004/0236625 A1 | | 11/2004 | Kearon |
| 2004/0249719 A1 | | 12/2004 | Urpani |
| 2004/0267604 A1 | | 12/2004 | Gross |
| 2005/0004819 A1 | | 1/2005 | Etzioni et al. |
| 2005/0060222 A1 | | 3/2005 | White |
| 2005/0075919 A1 | | 4/2005 | Kim |
| 2005/0131716 A1 | | 6/2005 | Hanan et al. |
| 2005/0197988 A1 | | 9/2005 | Bublitz |
| 2005/0203807 A1 | | 9/2005 | Bezos et al. |

(56) References Cited

U.S. PATENT DOCUMENTS

| | | |
|---|---|---|
| 2005/0209909 A1 | 9/2005 | Dull et al. |
| 2005/0261953 A1* | 11/2005 | Malek .................... G06Q 30/02 705/7.32 |
| 2006/0004621 A1* | 1/2006 | Malek .................... G06Q 30/02 705/7.32 |
| 2006/0080265 A1 | 4/2006 | Hinds et al. |
| 2006/0080268 A1 | 4/2006 | Afeyan et al. |
| 2006/0106656 A1 | 5/2006 | Ouimet |
| 2006/0112099 A1 | 5/2006 | Musgrove et al. |
| 2006/0149616 A1 | 7/2006 | Hildick-Smith |
| 2006/0247956 A1 | 11/2006 | Rosen et al. |
| 2006/0259344 A1* | 11/2006 | Patel .................... G06Q 10/0635 705/7.33 |
| 2007/0067212 A1 | 3/2007 | Bonabeau |
| 2007/0192166 A1 | 8/2007 | Van Luchene |
| 2007/0203783 A1 | 8/2007 | Beltramo |
| 2007/0218834 A1 | 9/2007 | Yogev et al. |
| 2007/0222793 A1 | 9/2007 | Olhofer et al. |
| 2007/0226073 A1 | 9/2007 | Wang |
| 2007/0282666 A1 | 12/2007 | Afeyan et al. |
| 2008/0065471 A1 | 3/2008 | Reynolds et al. |
| 2008/0077901 A1 | 3/2008 | Arsintescu |
| 2008/0086364 A1 | 4/2008 | Hahn et al. |
| 2008/0091510 A1 | 4/2008 | Crandall et al. |
| 2008/0114564 A1 | 5/2008 | Ihara |
| 2008/0147483 A1 | 6/2008 | Ji |
| 2008/0208659 A1 | 8/2008 | An et al. |
| 2008/0243637 A1* | 10/2008 | Chan .................... G06Q 30/02 705/26.1 |
| 2008/0306895 A1 | 12/2008 | Karty |
| 2009/0006184 A1 | 1/2009 | Leach et al. |
| 2009/0076887 A1 | 3/2009 | Spivack et al. |
| 2009/0150213 A1 | 6/2009 | Cyr et al. |
| 2009/0231356 A1 | 9/2009 | Barnes et al. |
| 2009/0234710 A1 | 9/2009 | Belgaied Hassine et al. |
| 2009/0254971 A1 | 10/2009 | Herz et al. |
| 2009/0282482 A1 | 11/2009 | Huston |
| 2009/0287728 A1 | 11/2009 | Martine et al. |
| 2009/0307055 A1 | 12/2009 | Karty |
| 2010/0010893 A1 | 1/2010 | Rajaraman et al. |
| 2010/0082441 A1 | 4/2010 | Doemling et al. |
| 2010/0125541 A1 | 5/2010 | Wendel et al. |
| 2010/0205034 A1 | 8/2010 | Zimmerman et al. |
| 2010/0306028 A1 | 12/2010 | Wagner |
| 2010/0313119 A1 | 12/2010 | Baldwin et al. |
| 2010/0318916 A1 | 12/2010 | Wilkins |
| 2011/0071874 A1 | 3/2011 | Schneersohn et al. |
| 2011/0087679 A1 | 4/2011 | Rosato et al. |
| 2011/0125591 A1 | 5/2011 | Evans |
| 2011/0261049 A1 | 10/2011 | Cardno et al. |
| 2011/0302494 A1 | 12/2011 | Callery et al. |
| 2012/0116843 A1 | 5/2012 | Karty |
| 2012/0209723 A1 | 8/2012 | Satow et al. |
| 2012/0229500 A1 | 9/2012 | Lamoureux et al. |
| 2012/0232850 A1 | 9/2012 | Lamoureux et al. |
| 2012/0232851 A1 | 9/2012 | Lamoureux et al. |
| 2012/0232852 A1 | 9/2012 | Lamoureux et al. |
| 2012/0233037 A1* | 9/2012 | Lamoureux ............ G06Q 30/02 705/27.2 |
| 2012/0259676 A1 | 10/2012 | Wagner |
| 2013/0060662 A1 | 3/2013 | Carlson et al. |
| 2014/0279203 A1 | 9/2014 | Malek et al. |
| 2015/0088609 A1 | 3/2015 | Wagner |

FOREIGN PATENT DOCUMENTS

| | | |
|---|---|---|
| JP | 2002015097 | 1/2002 |
| JP | 2002092291 | 3/2002 |
| JP | 2002117204 | 4/2002 |
| JP | 2002215870 | 8/2002 |
| JP | 2003030537 | 1/2003 |
| KR | 1020100082650 | 7/2010 |
| WO | 0002138 | 1/2000 |
| WO | 02057986 | 7/2002 |
| WO | 2005116896 | 12/2005 |
| WO | 2006012122 | 2/2006 |
| WO | 2008022341 | 2/2008 |
| WO | 2010055017 | 5/2010 |
| WO | 2014143729 | 9/2014 |

OTHER PUBLICATIONS

International Searching Authority, "International Search Report and Written Opinion," issued in connection with International Patent Application No. PCT/US2014/026808, dated Jun. 26, 2014 (10 pages).

International Searching Authority, "International Search Report and Written Opinion," issued in connection with International Patent Application No. PCT/US2014/027812, dated Jul. 24, 2014 (10 pages).

Canadian Intellectual Property Office, "Examiner's Report," issued in connection with Canadian Patent Application No. 2,566,943, dated Aug. 12, 2015 (6 pages).

International Searching Authority, "International Preliminary Report on Patentability," issued in connection with International Patent Application No. PCT/US2014/026808, dated Sep. 24, 2015 (7 pages).

International Searching Authority, "International Preliminary Report on Patentability," issued in connection with International Patent Application No. PCT/US2014/027812, dated Sep. 24, 2015 (7 pages).

U.S., "Final Office Action" issued in connection with U.S. Appl. No. 12/887,027, dated Oct. 8, 2015 (21 pages).

Canadian Intellectual Property Office, "Examiner's Report," issued in connection with Canadian Patent Application No. 2,428,079, dated Oct. 26, 2015 (3 pages).

U.S., "Non-Final Office Action," issued in connection with U.S. Appl. No. 13/283,495, dated Nov. 23, 2015 (8 pages).

Geyer-Schulz, "On Learning in a Fuzzy Rule-Based Expert System," Supplement to Kybernetika, vol. 28, 1992, downloaded from www.kybernetika.cz/content/1992/7/33/paper.pdf, Nov. 24, 2015 (4 pages).

U.S., "Notice of Allowance," issued in connection with U.S. Appl. No. 13/740,699, dated Dec. 8, 2015 (17 pages).

U.S., "Final Office Action," issued in connection with U.S. Appl. No. 12/476,806, dated Jun. 30, 2015 (21 pages).

"Chapter 7: Sampling in Market Research," retrieved from <http://web.archive.org/web/20050313042847/http://www.fao.org/docrep/w3241e/w3241e08.htm>, retrieved on Apr. 22, 2013 (29 pages).

"Sampling Techniques," Oct. 2003, retrieved from <http://web.archive.org/web/20031031223726/http://cs.fit.edu/~jpmcgee/classes/CSE5800/SamplingTechniques.pdf>, retrieved on Apr. 22, 2013 (12 pages).

Adomavicius et al., "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749 (16 pages).

Anthony, Cynthia S., "Electronic Monitoring Legislation for Businesses with Call Centers is Fraught with Problems," Telecommunications, ABI/INFORM Global, vol. 28, No. 3, Mar. 1994 (1 page).

Arsham, Hossein, "Questionnaire Design and Surveys Sampling," Mar. 4, 2004, retrieved from <http://web.archive.org/web/20040304232826/http://home.ubalt.edu/ntsbarsh/stat_data/Surveys.htm>, retrieved on Apr. 22, 2013 (15 pages).

Balakrishnan et al., "Genetic Algorithm for Product Design," Management Science, vol. 42, No. 8, Aug. 1996, pp. 1105-1117 (13 pages).

Bartlett II, et al., "Organizational Research: Determining Appropriate Sample Size in Survey Research," Information Technology, Learning, and Performance Journal, vol. 19, No. 1, Spring 2001, pp. 43-50 (8 pages).

Bonabeau, Eric, "Agent-Based Modeling: Methods and Techniques for Simulating Human Systems," PNAS, vol. 99, Supplement 3, May 14, 2002, retrieved from <http://www.pnas.org/cgi/doi/10.1073/pnas.082080899> (8 pages).

(56) References Cited

OTHER PUBLICATIONS

Borgatti, Stephen P., "Multi-Dimensional Scaling," 1997, retrieved from http://www.analytictech.com/borgatti/mds.htm>, retrieved on Sep. 8, 2010 (8 pages).
Brown et al., "Restricted Adaptive Cluster Sampling," Environmental and Ecological Statistics, vol. 5, 1998, pp. 49-63 (15 pages).
Buja et al., "Interactive Data Visualization with Multi-Dimensional Scaling," Mar. 29, 2004 (32 pages).
Cabena et al., "Intelligent Miner for Data Applications Guide," IBM, Redbook, SG24-5252-00, Mar. 1999 (175 pages). (NPL in 2 parts).
Callery et al., "Smart Presentation Application," U.S. Appl. No. 61/351,486, filed Jun. 4, 2010, as incorporated by reference in U.S. PG Publication 2011/0302494 (50 pages).
Canadian Intellectual Property Office, "Examiner's Report," issued in connection with Canadian Patent Application No. 2,428,079, dated Sep. 8, 2014 (2 pages).
Canadian Intellectual Property Office, "Examiner's Report," issued in connection with Canadian Patent Application No. 2,566,943, dated Oct. 17, 2013 (4 pages).
Cattin et al., "Commercial Use of Conjoint Analysis: A Survey," Journal of Marketing, vol. 46, Summer 1982, pp. 44-53 (8 pages).
Chen, Doris Tung, "Network Monitoring and Analysis in a Large Scale PACS and Teleradiology Environment," AAT 9620717, University of California, 1996, Abstract Only, Abstract retrieved from <http://proquest.umi.com/pqdweb?index=3&did=74184...D&RQT=309&VName=PQD&TS=1235762960&clientId=19649>, retrieved on Feb. 27, 2009 (2 pages).
Cheng et al., "Testing for IIA in the Multi-Nomial Logit Model," Sociological Methods & Research, vol. 35, No. 4, May 2007 (19 pages).
Dahan et al., "The Predictive Power of Internet-Based Product Concept Testing Using Visual Depiction and Animation," Journal of Production Innovation Management, vol. 17, 2000, pp. 99-109 (11 pages).
Desmond et al., "Smart Office Tools," (Presentation ) IBM Research, Oct. 18, 2010, retrieved from <http://ics.uci.edu/nlopezgi/flexitools/presentations/desmond_flexitools_splash2010.pdf> (22 pages).
Desmond et al., "Towards Smart Office Tools," 2010, retrieved from <http://http://www.ics.uci.edu/~nlopezgi/flexitools/papers/desmond_flexitools_splash2010.pdf> (4 pages).
DSS Research, "A Review of Conjoint Analysis," DSS Research, retrieved from <http://www.conjoint.com/CR01.aspx>, retrieved on Feb. 26, 2015 (6 pages).
Ellis et al., "Comparing Telephone and Fact-to-Face Surveys in Terms of Sample Representativeness: A Meta-Analysis of Demographic Characteristics," Ohio State University, Apr. 1999 (61 pages).
Environmental Protection Agency, "Guidance on Choosing a Sampling Design for Environmental Data Collection," EPA QA/G-5S, Dec. 2002 (178 pages). (NPL in 2 parts).
European Patent Office, "Notice from the European Patent Office," Official Journal of the European Patent Office, vol. 30, No. 11, dated Nov. 1, 2007, pp. 592-593, XPO007905525 ISSN: 0170-9291 (2 pages).
European Patent Office, "Supplemental Search Report," issued in connection with European Patent Application No. 05753821.7, dated Dec. 17, 2009 (2 pages).
European Patent Office, "Proceeding further with the European patent application pursuant to Rule 70(2) EPC," issued in connection with European Patent Application No. 05753821.7, dated Jan. 4, 2010 (1 page).
European Patent Office, "Communication Pursuant to Article 94(3) EPC," issued in connection with European Patent Application No. 05753821.7, dated Feb. 5, 2013 (5 pages).
European Patent Office, "Extended European Search Report," issued in connection with European Patent No. 10001340.8, dated May 31, 2010 (4 pages).
European Patent Office, "Communication Pursuant to Article 94(3) EPC," issued in connection with European Patent Application No. 10001340.8, dated Mar. 31, 2011 (5 pages).
European Patent Office, Summons to Attend Oral Proceedings Pursuant to Rule 115(1) EPC, issued in connection with European Patent Application No. 10001340.8, dated Feb. 10, 2012 (6 pages).
Fader et al., "Modeling Consumer Choice Among SKU's," Journal of Marketing Research, vol. 33, No. 4, Nov. 1996 (12 pages).
Fienberg, Stephen E."Notes on Stratified Sampling (for Statistics 36-303: Sampling, Surveys and Society)," Department of Statistics, Carnegie Mellon University, Mar. 12, 2003 (12 pages).
Fly, "Swap an Image in PowerPoint 2007 with Ease," CGI Interactive, Dec. 23, 2010, retrieved from <http://cgiinteractive.com/blog2010/12/swap-change-image-powerpoint-2007-ease/feed/> (3 pages).
Garcia, Fernando D., "Computer Screen Design Aided by a Genetic Algorithm," Late Breaking Papers at the 2000 Genetic and Evolutionary Computation Conference, Whitley, D. ed. 2000, pp. 98-101 (4 pages).
Government of India Patent Office, "First Examination Report," issued in connection with Indian Patent Application No. 3684/KOLNP/2006, dated Mar. 14, 2011 (2 pages).
Graf et al., "Interactive Evolution of Images," Evolutionary Programming IV—Proc. Fourth Annual Conference—Evolutionary Programming, MIT Press, Cambridge MA, 1995, pp. 53-65 (13 pages).
Gu et al., "Sampling and Its Application in Data Mining: A Survey," National University of Singapore, Singapore, Jun. 1, 2000 (31 pages).
Gu et al., "Sampling: Knowing Whole From its Part," Instance Selection and Construction for Data Mining, Chapter 2, May 2, 2001 (32 pages).
Guadagni et al., "A Logit Model of Brand Choice Calibrated on Scanner Data," Marketing Science, vol. 2, No. 3, Summer 1983, pp. 203-238 (37 pages).
Haupt et al., Practical Genetic Algorithms, 1998, pp. 66-70 and 85-88 (10 pages).
Huber et al., "Market Boundaries and Product Choice: Illustrating Attraction and Substitution Effects," Journal of Consumer Research, Inc., vol. 10, No. 1, Jun. 1983 (15 pages).
International Searching Authority, "International Search Report and Written Opinion," issued in connection with International Patent Application No. PCT/US2010/049645, dated Feb. 28, 2011 (7 pages).
International Searching Authority, "International Preliminary Report on Patentability," issued in connection with International Patent Application No. PCT/US2010/049645, dated Mar. 27, 2012 (6 pages).
International Searching Authority, "International Preliminary Report on Patentability," issued in connection with International Patent Application No. PCT/US2001/51284, dated Sep. 29, 2008 (3 pages).
International Searching Authority, "International Preliminary Report on Patentability," issued in connection with International Patent Application No. PCT/US2005/021948, dated Jan. 9, 2007 (8 pages).
International Searching Authority, "International Search Report," issued in connection with International Patent Application No. PCT/US2005/021948, dated Nov. 13, 2006 (2 pages).
International Searching Authority, Written Opinion, issued in connection with International Patent Application No. PCT/US2005/021948, dated Nov. 13, 2006 (7 pages).
International Searching Authority, "International Preliminary Report on Patentability," issued in connection with International Patent Application No. PCT/US2005/17179, dated Jan. 30, 2007 (4 pages).
International Searching Authority, "International Search Report," issued in connection with International Patent Application No. PCT/US2005/17179, dated Jan. 16, 2007 (4 pages).
International Searching Authority, "Written Opinion," issued in connection with International Patent Application No. PCT/US2005/17179, dated Jan. 16, 2007 (3 pages).

(56) References Cited

OTHER PUBLICATIONS

International Searching Authority, "Written Opinion," issued in connection with International Patent Application No. PCT/US2012/028364, dated Jul. 11, 2012 (4 pages).
International Searching Authority, "International Search Report," issued in connection with International Patent Application No. PCT/US2012/028364, dated Jul. 11, 2012 (4 pages).
International Searching Authority, "International Search Report," issued in connection with International Patent Application No. PCT/US2012/028369, dated Jul. 11, 2012 (4 pages).
International Searching Authority, "International Preliminary Report on Patentability," issued in connection with International Patent Application No. PCT/US2012/028369, dated Sep. 10, 2013 (6 pages).
International Searching Authority, "Written Opinion," issued in connection with International Patent Application No. PCT/US2012/028369, dated Jul. 11, 2012 (5 pages).
International Searching Authority, "International Preliminary Report on Patentability," issued in connection with International Patent Application No. PCT/US2012/028373, dated Sep. 10, 2013 (6 pages).
International Searching Authority, "International Search Report," issued in connection with International Patent Application No. PCT/US2012/028373, dated Jul. 6, 2012 (4 pages).
International Searching Authority, "Written Opinion," issued in connection with International Patent Application No. PCT/US2012/028373, dated Jul. 6, 2012 (5 pages).
International Searching Authority, "Written Opinion," issued in connection with International Patent Application No. PCT/US2012/028375, dated Jul. 6, 2012 (5 pages).
International Searching Authority, "International Preliminary Report on Patentability," issued in connection with International Patent Application No. PCT/US2012/028375, dated Sep. 10, 2013 (6 pages).
International Searching Authority, "International Search Report," issued in connection with International Patent Application No. PCT/US2012/028375, dated Jul. 6, 2012 (4 pages).
International Searching Authority, "International Preliminary Report on Patentability," issued in connection with International Patent Application No. PCT/US2012/028376, dated Sep. 19, 2013 (7 pages).
International Searching Authority, "International Search Report," issued in connection with International Patent Application No. PCT/US2012/028376, dated Jul. 9, 2012 (4 pages).
International Searching Authority, "Written Opinion," issued in connection with International Patent Application No. PCT/US2012/028376, dated Jul. 9, 2012 (5 pages).
iStockphoto, "iStockphoto Announces Plug-in That Allows Users of Microsoft PowerPoint and Word to Download iStock Photos and Illustrations Directly into Presentations and Documents," iStockphoto, retrieved from <http://www.istockphoto.com/istockphoto-office-ribbon>, May 17, 2010 (4 pages).
Jacobs, Richard M., "Educational Research: Sampling a Population," EDU 8603, 2003 (89 pages).
Japan Patent Office, "Notice of Reasons for Rejection," issued in connection with Japanese Patent Application No. P2013-236441, dated Feb. 25, 2015 (4 pages).
Johnston, "Why We Feel: The Science of Human Emotions," Perseus Books, Cambridge MA, 1999, pp. 152-155 (5 pages).
Kahn et al., "Modeling Choice Among Assortments," Journal of Retailing, vol. 67, No. 3, Fall 1991 (26 pages).
Kaye et al., "Research Methodology: Taming the Cyber Frontier-Techniques for Improving Online Surveys," Social Science Computer Review, vol. 17, No. 3, Fall 1999, pp. 323-337 (16 pages).
Kim et al., "Application of Interactive Genetic Algorithm to Fashion Design," Engineering Applications of Artificial Intelligence, vol. 13, 2000, pp. 635-644 (10 pages).
Kim et al., "Knowledge-Based Encoding in Interactive Genetic Algorithm for a Fashion Design Aid System," Genetic and Evolutionary Computation Conference, Jul. 10-12, 2000, p. 757 (4 pages).

Koppelmann et al, "The Paired Combinatorial Logit Model: Properties, Estimation and Application," Transportation Research Part B, vol. 34, 2000 (15 pages).
Lunsford et al., "Research Forum-The Research Forum Sample—Part 1: Sampling," Journal of Prosthetics and Orthotics, vol. 7, No. 3, 1995, retrieved from <http://www.oandp.org/jpo/library/printArticle.asp?printArticleId=1995_03_105>, retrieved on Feb. 26, 2015 (10 pages).
Medina, Martin Humberto Felix, "Contributions to the Theory of Adaptive Sampling," Doctorate Thesis in Statistics, The Pennsylvania State University, Dec. 2000 (259 pages). (NPL in 2 parts).
O'Reilly et al., "A Preliminary Investigation of Evolution as a Form Design Strategy," Artificial Life VI, MIT Press, Cambridge MA, 1998 (5 pages).
O'Reilly et al., "Evolution as a Design Strategy for Nonlinear Architecture: Generative Modeling of 3D Surfaces," Cambridge MA 1998 (10 pages).
Ossher et al., "Flexible Modeling Tools for Pre-Requirements Analysis: Conceptual Architecture and Research Challenges," ACM SIGPLAN Notices—OOPSLA-10, vol. 45, Issue 10, Oct. 2010, pp. 848-864 (17 pages).
Ossher et al., "Using Tagging to Identify and Organize Concerns During Pre-Requirements Analysis," Aspect-Oriented Requirements Engineering and Architecture Design, 2009, EA'09, ICSE Workshop, May 18, 2009, pp. 25-30 (6 pages).
Pazzani, Michael J., "A Framework for Collaborative, Content-Based and Demographic Filtering," Artificial Intelligence Review, vol. 13, 2000, pp. 393-408 (16 pages).
Reynolds, Reid T. "How Big is Big Enough?" American Demographics, Abstract Only, vol. 2, No. 4, Apr. 1980, Abstract retrieved from <http://search.proquest.com/printviewfile?accountid=14753>, retrieved on Apr. 22, 2013 (2 pages).
Riedesel, Paul, "A Brief Introduction to Discrete Choice Analysis in Marketing Research," Action Marketing Research, 1996, retrieved from <http://www.action-research.com/discrete.html>, retrieved on Jan. 16, 2009 (8 pages).
Rowland, Duncan Andrew, "Computer Graphic Control Over Human Face and Head Appearance, Genetic Optimization of Perceptual Characteristics," Ph.D. Thesis, University of St. Andrews, Scotland, Jan. 5, 1998, retrieved from <http://www.mindlab.msu.edu/documents/Thesis_Rowland/title.htm>, retrieved on May 12, 2000 (106 pages).
Sage Publishing, "Chapter 5: Sampling," retrieved from <http://sagepub.com/upm-data/24480_Ch5.pdf>, pp. 148-189 (42 pages).
Sims, Karl, "Artificial Evolution for Computer Graphics," Computer Graphics, vol. 25, No. 4, Jul. 1991, pp. 319-328 (22 pages).
Sinha et al., "Attribute Drivers: A Factor Analytic Choice Map Approach for Understanding Choices Among SKUs," Marketing Science, vol. 24, No. 3, Summer 2005, pp. 351-366 (17 pages).
Steiner et al., "A Probabilistic One-Step Approach to the Optimal Product Line Design Problem Using Conjoint and Cost Data," Review of Marketing Science Working Papers, vol. 1, No. 4, Working Paper 4, 2002, pp. 1-40 (41 pages).
Su et al., "An Internet-Based Negotiation Server for E-Commerce," The VLDB Journal—The International Journal on Very Large Data Bases, vol. 10, Issue 1, Aug. 2001, pp. 72-90 (20 pages).
Swain et al., "Webseer: an Image Search Engine for the World Wide Web," Technical Report, University of Chicago, 1996 retrieved from <http://citeseerx.ist.psu.edu/viewdoc/download?doi=10.1.1.44.9234&rep=rep1&type=pdf> (8 pages).
Terano et al., "Marketing Data Analysis Using Inductive Learning and Genetic Algorithms with Interactive- and Automated-Phases," Evolutionary Computation, 1995, IEEE International Conference on Perth, Volume , Nov. 29, 1995 (6 pages).
Thompson, Steven K., "Design and Inference in Adaptive Sampling," SSC Annual Meeting, Proceedings of the Survey Methods Section, Jun. 1997 (5 pages).
Thompson, Steven K., "Stratified Adaptive Cluster Sampling," Abstract Only, Biometrika, vol. 78, No. 2, 1991 (1 page).
U.S., "Non-Final Office Action" issued in connection with U.S. Appl. No. 14/559,084, dated Mar. 11, 2015 (16 pages).
U.S., "Non-Final Office Action" issued in connection with U.S. Appl. No. 13/081,924, dated Jan. 15, 2014 (19 pages).

(56) References Cited

OTHER PUBLICATIONS

U.S., "Final Office Action" issued in connection with U.S. Appl. No. 13/081,924, dated Sep. 12, 2013 (19 pages).
U.S., "Non-Final Office Action" issued in connection with U.S. Appl. No. 13/081,924, dated Feb. 28, 2013 (15 pages).
U.S., "Final Office Action" issued in connection with U.S. Appl. No. 13/081,924, dated Jun. 5, 2014 (19 pages).
U.S., "Non-Final Office Action" issued in connection with U.S. Appl. No. 12/476,806, dated Oct. 7, 2011 (15 pages).
U.S., "Final Office Action" issued in connection with U.S. Appl. No. 12/476,806, dated Aug. 16, 2012 (17 pages).
U.S., "Non-Final Office Action" issued in connection with U.S. Appl. No. 12/476,806, dated May 1, 2014 (21 pages).
U.S., "Non-Final Office Action" issued in connection with U.S. Appl. No. 12/476,806, dated Dec. 1, 2014 (21 pages).
U.S., "Non-Final Office Action" issued in connection with U.S. Appl. No. 12/887,027, dated Apr. 27, 2012 (9 pages).
U.S., "Final Office Action" issued in connection with U.S. Appl. No. 12/887,027, dated Apr. 11, 2013 (14 pages).
U.S., "Non-Final Office Action" issued in connection with U.S. Appl. No. 12/887,027, dated Jan. 15, 2015 (16 pages).
U.S., "Examiner's Answer to Appeal Brief" issued in connection with U.S. Appl. No. 12/368,028, dated Apr. 21, 2015 (11 pages).
U.S., "Non-Final Office Action" issued in connection with U.S. Appl. No. 12/368,028, dated Nov. 26, 2013 (37 pages).
U.S., "Non-Final Office Action" issued in connection with U.S. Appl. No. 12/368,028, dated Mar. 19, 2013 (33 pages).
U.S., "Non-Final Office Action" issued in connection with U.S. Appl. No. 12/368,028, dated Jun. 8, 2011 (16 pages).
U.S., "Advisory Action" issued in connection with U.S. Appl. No. 12/368,028, dated Sep. 29, 2014 (3 pages).
U.S., "Final Office Action" issued in connection with U.S. Appl. No. 12/368,028, dated Aug. 14, 2013 (34 pages).
U.S., "Final Office Action" issued in connection with U.S. Appl. No. 12/368,028, dated Apr. 16, 2014 (39 pages).
U.S., "Final Office Action" issued in connection with U.S. Appl. No. 12/368,028, dated Jan. 18, 2012 (32 pages).
U.S., "Non-Final Office Action," issued in connection with U.S. Appl. No. 11/758,877, dated Mar. 8, 2010 (25 pages).
U.S., "Final Office Action" issued in connection with U.S. Appl. No. 13/740,699, dated Apr. 2, 2015 (18 pages).
U.S., "Non-Final Office Action" issued in connection with U.S. Appl. No. 13/740,699, dated Jul. 18, 2014 (16 pages).
U.S., "Supplemental Notice of Allowance," issued in connection with U.S. Appl. No. 10/852,356, dated Oct. 22, 2007 (3 pages).
U.S., "Supplemental Notice of Allowance," issued in connection with U.S. Appl. No. 10/852,356, dated Sep. 4, 2007 (3 pages).
U.S., "Notice of Allowance," issued in connection with U.S. Appl. No. 11/758,877, dated Sep. 22, 2010 (6 pages).
U.S., "Notice of Allowance," issued in connection with U.S. Appl. No. 10/852,356, dated Jul. 19, 2007 (22 pages).
U.S., "Non-Final Office Action," issued in connection with U.S. Appl. No. 10/852,356, dated Jan. 3, 2007 (11 pages).
U.S., "Non-Final Office Action," issued in connection with U.S. Appl. No. 10/053,353, dated Feb. 18, 2005 (10 pages).
U.S., "Non-Final Office Action," issued in connection with U.S. Appl. No. 10/053,353, dated Oct. 17, 2005 (9 pages).
U.S., "Notice of Allowance," issued in connection with U.S. Appl. No. 10/053,353, dated Nov. 8, 2006 (6 pages).
U.S., "Non Final Office Action," issued in connection with U.S. Appl. No. 10/831,881, dated Jan. 6, 2005 (10 pages).
U.S., "Notice of Allowance," issued in connection with U.S. Appl. No. 10/831,881, dated Aug. 4, 2005 (7 pages).
U.S., "Notice of Allowance," issued in connection with U.S. Appl. No. 11/229,020, dated Mar. 17, 2009 (36 pages).
U.S., "Notice of Allowance," issued in connection with U.S. Appl. No. 11/726,350, dated Jul. 13, 2009 (10 pages).
U.S., "Non-Final Office Action," issued in connection with U.S. Appl. No. 13/282,321, dated Jul. 2, 2012 (40 pages).
U.S., "Final Office Action," issued in connection with U.S. Appl. No. 13/282,321, dated Feb. 22, 2013 (47 pages).
U.S., "Non-Final Office Action," issued in connection with U.S. Appl. No. 13/283,121, dated Sep. 20, 2012 (59 pages).
U.S., "Final Office Action," issued in connection with U.S. Appl. No. 13/283,121, dated May 24, 2013 (69 pages).
U.S., "Final Office Action," issued in connection with U.S. Appl. No. 13/283,495, dated Jan. 27, 2015 (34 pages).
U.S., "Non-Final Office Action," issued in connection with U.S. Appl. No. 13/283,495, dated Jul. 10, 2012 (39 pages).
U.S., "Non-Final Office Action," issued in connection with U.S. Appl. No. 13/283,495, dated Sep. 19, 2013 (50 pages).
U.S., "Final Office Action," issued in connection with U.S. Appl. No. 13/283,495, dated Feb. 11, 2013 (46 pages).
Weinberger, Martin, "Getting the Quota Sample Right," Journal of Advertising Research, vol. 13, No. 5, Oct. 1973, pp. 69-72 (5 pages).
Wempen, Faithe, Microsoft PowerPoint 2010 Bible, Wiley Publishing, Inc., May 10, 2010 (819 pages). (NPL in 6 parts).
Wen et al., The Generalized Nested Logit Model, Transportation Research Part B, 35, 2001 (15 pages).
Wikipedia, "Estimation Theory," Feb. 13, 2011, retrieved from <http://en.wikipedia.org/w/index.php?title=Estimation_theory&printable>, retrieved on Mar. 15, 2011 (8 pages).
Wikipedia, "Independence of Irrelevant Alternatives," Jan. 18, 2011, retrieved from <http://en.wikipedia.org/w/index.php?title=Independence_of_irrelevant_alternatives>, retrieved on Feb. 15, 2011 (7 pages).
Wikipedia, "Multinomial Logit," Feb. 4, 2011, retrieved from <http://en.wikipedia.org/w/index.php?title=Multinomial_logit&printable>, retrieved on Feb. 15, 2011 (3 pages).
Wikipedia, "Goodness of Fit," Jan. 22, 2011, retrieved from <http://en.wikipedia.org/w/index.php?title=Goodness_of_fit&printable>, retrieved on Mar. 15, 2011 (4 pages).
Wikipedia, "Sampling (statistics)," Oct. 24, 2005, retrieved from <http://en.wikipedia.org/wiki/Sampling_(statistics)>, retrieved on Oct. 26, 2005 (5 pages).
Wikipedia, "Revision history of Agent-based model," retrieved from <http://en.wikipedia.org/w/index.php?title=Agent-based_model&dir=prev>, retrieved on Jan. 21, 2009 (1 page).
Wikipedia, "Agent-based model," Jan. 18, 2009, retrieved from <http://en.wikipedia.org/w/index.php?title=Agent-based_model&printable=yes>, retrieved on Jan. 21, 2009 (7 pages).
Witbrock et al., "Evolving Genetic Art," Evolutionary Design by Computers, 1999, pp. 251-259 (9 pages).
International Searching Authority, "International Search Report and Written Opinion," issued in connection with corresponding International Patent Application No. PCT/US2014/027812, dated Jul. 24, 2014 (10 pages).
International Searching Authority, "International Search Report and Written Opinion," issued in connection with corresponding International Patent Application No. PCT/US2014/026808, dated Jun. 26, 2014 (10 pages).
U.S., "Notice of Allowance," issued in connection with U.S. Appl. No. 13/283,495, dated Jun. 8, 2016 (7 pages).
European Patent Office, "Communication Pursuant to Article 94(3) EPC," issued in connection with European Patent Application No. 13151891.2, dated Jun. 1, 2016 (6 pages).
Brintrup et al., "Ergonomic Chair Design by Fusing Qualitative and Quantitive Criteria Using Interactive Genetic Algorithms," IEEE Transactions on Evolutionary Computation, vol. 12, No. 3, Jun. 2008, 12 pages.
Hudson et al, "The Application of Genetic Algorithms to Conceptual Design," AI System Support for Conceptual Design, Springer London, 1996, 20 pages.
Quiroz et al., "Towards Creative Design Using Collaborative Interactive Genetic Algorithms," 2009 IEEE Congress on Evolutionary Computation, Aug. 26, 2009, 8 pages.
Yang et al, "Development of a Product Configuration System with an Ontology-Based Approach," Computer-Aided Design, vol. 40, No. 8, Aug. 2008, 16 pages.
U.S., "Non-Final Office Action," issued in connection with U.S. Appl. No. 14/208,013, dated Sep. 8, 2016, 14 pages.

(56) References Cited

OTHER PUBLICATIONS

U.S., "Final Office Action," issued in connection with U.S. Appl. No. 14/208,013, dated Feb. 14, 2017, 66 pages.
U.S., "Examiner's Answer to Appeal Brief," issued in connection with U.S. Appl. No. 14/559,084, dated May 3, 2016 (5 pages).
United States Patent and Trademark Office, "Notice of Allowance," issued in connection with U.S. Appl. No. 14/208,013, dated Jun. 2, 2017, 63 pages.
United States Patent and Trademark Office, "Decision on Appeal," issued in connection with U.S. Appl. No. 12/368,028, dated Aug. 11, 2017, 17 pages. (Copy not included as this is a USPTO document. Applicant will provide document upon request from examiner).

* cited by examiner

Computation of Niching (Sharing) Discount $\mathbf{R} = \begin{array}{c} \phantom{1}1 \phantom{xxxx} k \\ 1\,\boxed{\phantom{xxxx}} \\ k \end{array}$ $\mathbf{R}_{i,j}$ = Distance from Entity $i$ to $j$ in reproduction space $\rightarrow$ $\mathbf{R}' = \begin{array}{c} \phantom{1}1 \phantom{xxxx} k \\ 1\,\boxed{\phantom{xxxx}} \\ k \end{array}$ $\mathbf{R}'_{i,j} = \max\left(\dfrac{-1}{s_{thresh}} \dfrac{\mathbf{R}_{i,j}}{\max(\mathbf{R})} + 1, 0\right)$ where $s_{thresh} \in [0,1]$ $\sum_j \mathbf{R}'_{i,j} = \mathbf{d}_i \longrightarrow$ Niching discount for Entity $i$

METHOD AND APPARATUS FOR INTERACTIVE EVOLUTIONARY OPTIMIZATION OF CONCEPTS

CROSS-REFERENCE TO RELATED APPLICATIONS

This application claims the benefit of U.S. provisional patent application Ser. No. 61/788,476 filed Mar. 15, 2013, and U.S. provisional patent application Ser. No. 61/792,611 filed Mar. 15, 2013, both of which are hereby incorporated by reference in their entirety.

BACKGROUND

Field of the Invention

The present invention relates to methods and systems for improving the process of developing new products and services, and the attendant activities of consumer research, market segmentation, design iteration and market testing.

Description of the Related Art

Early in human history, the distinctions between the designer, the manufacturer, and the user of an artifact simply did not exist. People made their tools for their own use, and built their dwellings in an unselfconscious process passed across generations. Later, as the various arts and crafts evolved, the artisan or craftsman embodying both design and manufacturing functions remained close to his customers. The small volumes involved and the largely custom nature of craft production meant that the product responded directly to the needs and wants of individual customers. The industrial revolution brought an increase in the division and specialization of labor, along with the attendant economies of scale and scope. As a result, the design and production functions became distinct, production volumes increased, and products became more standardized. A particular product usually now had to satisfy a larger group of customers. That trend took a major leap with Ford's development of mass production.

Many products today require for their design large groups of people with highly specialized skills and knowledge, often numbering in the thousands, and often spread across continents. Furthermore, the development lead-time for some products can easily stretch to many years (e.g., new generation aircraft). The complexity of these products and services, and of the processes used to develop them, is reflected in the organizational structure of the companies that design and make them. Within the typical product development organization, the stakeholders in a given product development project include such diverse departments as product planning, styling, engineering, sales and marketing, manufacturing, after-sales service, legal affairs, and more recently, members of outside part supply companies. Each of these departments or organizations has its own objectives, constraints, and performance measures, and its executives and managers their own goals and idiosyncrasies. These and other factors have conspired to increase dramatically the distance between the people who design products and services, and the customers who consume them, whether the distance is measured in terms of geography, time, and technical knowledge, or in terms of worldview, goals, and daily concerns.

In the past, many product development organizations relied on a few powerful individuals in their design or marketing departments, or in their executive ranks. These individuals in turn relied on their knowledge of the market and the customer, on their understanding of the technological possibilities, and on their vision, judgment, experience, preferences, prejudices and biases. In recent years, as consumers have grown increasingly sophisticated and knowledgeable, and as markets have become increasingly fragmented, this job has become more difficult.

More recently, companies have adopted flatter, less hierarchical organizational models, with decision-making responsibility pushed lower through the ranks, and they have embraced a new focus on the "voice of the customer." This movement was intended to remind them that they are mere proxies for the ultimate consumer of the goods or services being designed, and that the needs and desires of the customer should be the paramount input to that process.

The process of going from the voice of the customer to a product or service that reflects it remains fraught with errors and the potential for distortions. The first source of error is in ascertaining the wants and needs of the customer; the second is in the process of translating that input into a decision, product, artifact or service without coloring and distorting it. Practitioners have developed and used several tools and techniques intended to assess the needs of the customer and to translate these needs into a product concept and into engineering requirements. These higher-level tools include Concept Engineering, and the House of Quality and Quality Function Deployment. A critical aspect of these higher level tools and methodologies is that they not only bring the product development team or organization closer to the customer, but also play an important role in creating a consensus between the different functions in the product development team, and in bringing the different parts of the organization together to work toward a common goal. In other words, whenever conflicts arise between different parts of the organization, they are supposed to be resolved by going back to the voice of the customer. If honest differences in interpreting the voice arise, the solution would be to seek clarification from the customer. These tools represent significant improvements in the product design and development process, but remain cumbersome and difficult to use, as their protagonists point out, and they require significant commitments of time and effort on the part of their users.

The tools and instruments that traditionally have been deployed by market researchers range from the highly qualitative methods borrowed from ethnography, such as open-ended interviewing, participant observation, and focus groups, to the highly popular quantitative statistical methods such as survey research and conjoint analysis. Some of these tools and techniques suffer from several shortcomings, which are detailed below.

During the development of a new product or service, the design organization typically will undertake a number of market research studies. Early on during the project, these may be more qualitative in nature, intended to uncover latent needs, or to develop new ideas for products and services. Later, the research may be more focused, intended to obtain feedback from current or potential customers on certain features or attributes of the proposed product; these could rely on qualitative methods, a focus group for example, as well as quantitative ones, such as surveys or structured serial interviews. One problem with consumer clinics is that potential customers are typically shown, and asked to comment on, a limited number of alternatives. This is done in order to keep the cognitive demands on the participants at a reasonable level, as these clinics are generally limited to a period of less than two hours, including the time necessary for providing the participants with the background and contextual information necessary for properly assessing the designs presented to them. Another reason is that the designs shown to the participants are in the form of models or prototypes that are costly to produce. In the traditional consumer clinic, people are suddenly taken from the world of today and asked to comment on future designs that they had not previously seen and which have not had the time to sink in.

Furthermore, consumer clinics, in which new products are shown to participants who are asked to comment on them, assume that people have preexistent preferences that are well developed and stable. They therefore assume that the attitude the participants form upon seeing the new product are valid and reflect the attitudes they will have when (and if) the product goes on the market. Yet, it is well known that in many cases, people's long-term disposition towards a product differs from their initial reaction. For example, it is not uncommon for a consumer to feel initially that the styling of an outgoing automobile model is more attractive than that of its newly introduced replacement, only to change his or her mind after a few weeks of seeing the newer one on the road. Conversely, it is not uncommon for people's assessment of the attractiveness of a new product to plummet after the novelty wears off. This phenomenon is probably a reflection of two countervailing human tendencies, the desire for novelty and variety seeking on the one hand, and the comfort of the familiar on the other. Due to their compressed format, focus groups and consumer clinics are vulnerable to this phenomenon.

Another problem with clinics and focus groups has to do with the interpersonal dynamics that the situation entails. In general, group dynamics are desirable in the sense that the discussion that takes place between participants is the mechanism for generating data, and the desired output is the active sharing and comparison of the participants' experiences and opinions. Problems arise when one or a few strong individuals end up dominating and biasing the discussion. Another difficulty is finding participants who do not know one another. This is desirable in order to avoid having one participant choose a particular design simply because his or her friend also chose it. This situation often arises when the product or service being designed is targeted at a small group of users, or users who are all members of the same group, for example, designing a benefits package for the employees of one company. Similar problems arise when the potential customers for a product happen to be competitors, and therefore less willing to sit together and share their preferences.

The interpersonal dynamics in the traditional focus group or consumer clinic are magnified when the designs being presented are radically novel or unusual. In such cases, many participants find it difficult to express their true opinions in front of the group. They find it safer to retreat to the safety of negative criticism. They tend to focus on what they find wrong with the design, instead of looking at the whole design and its potential benefits. Furthermore, it is well known that in the case of many products and services, consumer preferences vary geographically or ethnically. Southern California is considered to lead the rest of the country in automotive trends. Color preferences in the USA are different than those in France or China. For that reason, companies will generally hold consumer clinics in several different markets, each of which would be considered representative of a particular geographical area. This adds to the cost of using that format for eliciting consumer preferences.

Conjoint Analysis is used to assess consumer preference for different choices of products and services. It is a multi-attribute utility or preference measurement technique that explicitly accounts for the subjective tradeoffs people make when deciding among alternatives with multiple features and benefits. In its basic form, Conjoint Analysis is a decompositional technique: the parameters that measure the importance the decision maker ascribes to the different aspects of the product are derived, using statistical regression techniques, from the decision maker's evaluations of a number of full profile descriptions of the product or service. Conjoint Analysis has been used in a wide range of applications, from developing soaps and dietary supplements to improving the appeal of military careers within the Department of Defense.

The first step in conducting a Conjoint exercise is to identify the relevant attributes of the product or service in question, and to identify the levels of interest for each attribute. This is typically based on previous experience with similar products, and on earlier qualitative research such as an open-ended interview or a focus group. As an example, in the case of an automobile study, engine displacement may be one attribute of interest, with 2.0, 2.5, and 3.0 liters the three levels to be tested; and body style may be another attribute, with "sedan" and "coupe" as the levels of interest. Next, a number of full-profile descriptions of potential products, that is, descriptions in which every attribute is represented by a value, usually using a highly fractionated factorial orthogonal design (i.e., only a small fraction of all possible product profiles are used in the test.) These profiles are shown to the respondent, traditionally in the form of prop cards, and the respondent is asked to rank them by order of preference or to rate each of them on an interval scale, for example, from 0-100. The responses then are analyzed using statistical tools such as Ordinary Least Squares regression to estimate the "part-worths" for each of the attribute levels, that is, the contribution of each attribute level to the overall preference level of a profile. Returning to the earlier example, it might turn out that for one particular respondent, a 2.0 liter engine has a part-worth of 0.0, the 2.5 liter a part-worth of 0.5, and so on; the "sedan" body style may have a part worth of 0.0, whereas the "coupe" style may have a value of 0.8. Once the part-worths for an individual are obtained in this way, it is then possible to search through all the possible combinations of attribute levels to synthesize the optimal product for that individual, that is, the product that would give him or her the highest possible level of utility, or that he or she would have the strongest intention of buying.

Conjoint Analysis studies typically are conducted with more than one individual, and part-worths are typically obtained for a representative sample of consumers. This multi-respondent data can be used for several purposes. One is to identify the product design that would result in the greatest market share for the product development organization, given the attributes of competing products on the market (current and expected; this is known as the "share-of-choices" problem. Another purpose is to identify the product design that would maximize overall consumer utility, that is, the sum of utilities across all the consumers; this is known as the "buyer's welfare" problem. Solving these search problems is a hard computationally; mathematically, these are known as NP-Hard problems, requiring heuristic dynamic programming procedures for their solution. More recently, the adaptive search techniques of Genetic and Evolutionary Computation, more specifically Genetic Algorithms (GAs), have been used more effectively to find solutions to these problems. In that case, Conjoint Analysis data collected previously, using standard Conjoint Analysis techniques; in a separate and subsequent step, that data was subjected to the aforementioned search technique to find the optimal solutions or designs.

Another purpose of collecting Conjoint data from a representative group of participants is to identify distinct market segments with different preference profiles. This is done through cluster analysis, a statistical technique for finding subgroups of respondents such that respondents within a subgroup value the different product attributes similarly, but differently from respondents in other subgroups. Once clusters are identified, those that present significant commercial potential can be targeted with specific product designs.

While Conjoint Analysis does offer advantages over other techniques due to its decompositional nature, Conjoint Analysis also has shortcomings. The first is the tediousness of participating in the process as a respondent. Generally, the product designers and marketers, by virtue of their intimate involvement with and knowledge of the product, want to answer a large number of issues and test a large number of attributes. The customers on the other hand are generally less engaged and reluctant to submit to lengthy questionnaires. And even though highly fractionated factorial designs are used (a research design that itself introduces serious shortcomings, as discussed later), respondents typically are still asked to rate a considerable number of possibilities. For example, in a case where there are 12 product attributes, with four different levels for each attribute, the respondent would face about 35 profiles. That number is often multiplied by a factor of 3 in order to reduce the effect of random errors, resulting in the respondent having to face over 100 questions. The laboriousness of the process often leads to confusion and loss of attention and focus on the part of the respondents, who often end up resorting to heuristics as a shortcut for getting through the questionnaire. For example, instead of properly weighing all the attributes against one another, they only rely on one or two to make their decision, leading to inaccurate results.

More recently, several modifications to Conjoint Analysis that aim to reduce the tediousness of the process, and the resulting inaccuracy of the results, have been proposed and used in practice. These hybrid techniques do not consist exclusively of full profiles of hypothetical products, as in conventional Conjoint Analysis, but they start off by asking the respondent a set of self-explication questions (nonconjoint questions that involve no trade-offs), and follow that with partial-profile descriptions. Examples of such techniques include Adaptive Conjoint Analysis and the newer Hierarchical Conjoint Analysis.

In Adaptive Conjoint Analysis as implemented by Sawtooth Software, the most frequently used technique for commercial conjoint studies in both the United States and Europe, the survey starts by asking the respondent to eliminate those attribute levels that he or she would find unacceptable under any conditions. Those levels are no longer used in the subsequent part of the interview. Next, the respondent is asked to reduce the levels in each attribute to the 5 levels he or she is most likely to be interested in. The next step in the process asks the respondent to rate the importance of individual attributes; these ratings attempt to eliminate those attributes deemed unimportant, and to generate initial estimates of the respondent's utilities, which subsequently are used to generate a set of customized paired-comparison questions using partial profiles. With each response, the estimates of the respondent's utilities are updated, and appropriate paired-comparison questions generated. These questions are designed to converge and focus on the subspace of attribute comparisons that appears most favored by the respondent based on the earlier responses, with the objective of refining the estimates of that respondent's trade-off profile within that limited subspace.

Clearly, Adaptive Conjoint Analysis relies heavily on the self-explicated evaluation component of the questionnaire, where the decision maker is asked explicitly to indicate his attitude towards various attributes separately. A key assumption behind that method is that the respondent's attitudes and preferences are pre-existent and stable. Adaptive Conjoint relies on that assumption to quickly narrow the choices presented to the interviewee and reduce the workload imposed on him or her. Adaptive Conjoint thus precludes the possibility that the respondent might uncover or evolve new personal preferences or attribute trade-off profiles as he or she participates in the study. The problem with that approach is the danger of reification of any preconceived notions or partial, ill-formed preferences the respondent might have a priori, resulting in a sub optimal to the product design problem. In fact, users of Adaptive Conjoint Analysis are warned against allowing respondents to eliminate attribute levels (the first step described in the previous paragraph) "unless there is no other way to make an interview acceptably brief."

A more recent development, Hierarchical Bayes Conjoint Analysis, improves on Adaptive Conjoint through the use of more robust and theoretically more defensible statistical methods. It does not however address the problem described above. Furthermore, Hierarchical Bayes Adaptive Conjoint Analysis relies on the responses of other participants in the study to improve the estimates of each individual's utilities; in other words, Hierarchical Bayes makes it possible to trade the number of the respondents surveyed with the workload on any individual respondent. It is highly computationally intensive procedure however, requiring several hours of running time on a typical personal computer; it is therefore not very useful in a real-time online context. The existing software products perform the Hierarchical Bayes analysis of the data obtained through an Adaptive Conjoint study after the fact, offline.

The second major shortcoming of Conjoint Analysis, one that is not addressed by any of the improved methodologies discussed above, stems from the assumption that the different product attributes are independent of one another. Conjoint Analysis is a "main effects only" model; it assumes there are no interactions among attributes. In the additive part-worths model that is used universally, an individual's preference for a particular product is assumed to consist of the sum of independent functions of the attribute levels in that product. Using an automotive example again, a consumer's preference for exterior color, bright red versus dark gray for example, is assumed not to depend on body style, whether the automobile in question is a sport coupe or a luxury sedan. Yet we know empirically that bright red is a more popular on sporty cars than it is on luxury sedans. If the researcher suspects that there may be some interaction between two attributes (based on product knowledge or from statistical analysis), the solution within the Conjoint Analysis framework is to define composite variables ("superattributes") that are a combination of the two interacting attributes. These super-attributes are given the levels formed by combining the individual attribute levels. Returning to the previous example, the composite attribute would be "color-body style", and it would take on four levels (two times two): "bright red sports coupe", "bright red luxury sedan", "dark grey sport coupe", and "dark grey luxury sedan". The problem with that work-around is that it is highly deleterious to the respondent workload. (It is after all the main-effects only aspect of conjoint that makes possible the highly fractionated factorial designs.) Instead of two attributes with two levels each, we now have three attributes with a total of eight levels. This combinatorial explosion is much more severe when a more realistic number of individual attribute levels is used: in the case of five colors and five body styles, we would go from 10 levels (5+5) to a total of 35 levels (5+5+(5×5).) The number of parameters to be estimated by the Conjoint study, and therefore the number of questions respondents are subjected to, increase in proportion to the number of these levels.

The "main-effects only" nature of Conjoint Analysis has a more subtle and insidious effect, as it affects how many marketers and product developers come to think about their products and services. By relying on Conjoint Analysis to obtain the voice of the customer, they tend to design studies that use those attributes of the product which are more readily decomposable; and they present them in a way that makes it easy for the respondents to separate them. Respondents end up focusing on a few of these attributes, and using them heuristically (as mentioned earlier), and not performing the additional mental processing that would reveal possible interaction between attributes. The result is an artificially good fit to the additive partworths model, but poor predictive accuracy.

More fundamentally, the very notion that a product or service can be adequately described to a consumer by a set of attribute levels is itself problematic. Since it works by presenting decomposable stimuli to the respondent, Conjoint Analysis is particularly ill-suited for understanding how consumers evaluate important classes of products, namely, products that are perceived holistically by the consumer. Examples of such "unitary" products include, but are not limited to aesthetic objects, foods, fragrances, and music. Even though a perfume expert (known as a "nose" in the trade), upon smelling a scent, may be able to analyze it and describe its major attributes, that faculty is not available to the majority of perfume buyers. In such cases, where the respondent cannot break the stimulus presented to him or her into component parts or attributes, attempting to build simple models of the respondent's preference based on factorially designed studies is unlikely to succeed.

In many applications, there is a need to analyze and categorize large amounts of content, both textual and graphical. In particular, there is a need to analyze textual content generated by users of various networked computer applications, such as email communications, blog and social media postings, for purposes ranging from homeland security to consumer marketing. Examples from marketing include:

Analyzing online product and service reviews, from online review sites, or entries posted to companies' CRM (Customer Relationship Management) systems, for both topics addressed and valence of sentiment expressed Coding and organizing responses to surveys, specifically, survey questions allowing open-ended responses Organizing and assessing the relevance of consumer-generated ideas for new products or services, or elements thereof, such as brand names, product names, product features, new packaging features, or even new uses for existing products Several approaches and technologies have been developed to address the above need. In general, these approaches suffer from several shortcomings, as described in the following sections. These approaches have been most successful in situations where the domain is well defined and circumscribed. For example, certain solutions are specifically designed to deal with hotel ratings, or with certain types of security threats from certain parties. Such solutions are not appropriate for addressing the need to analyze content generated in the context of product or service innovation surveys, where studies can range across disparate domains, from life sciences to consumer electronics to fast-moving consumer goods to consumer electronics; and where product categories within one domain may have few commonalities (e.g., frozen dinners and laundry detergents, in the case of consumer goods).

Furthermore, user generated content or crowd-sourced ideas are no longer limited to textual entries. The web now makes it possible for contributors to submit ideas and suggestions involving graphical design elements. Examples include designs for corporate logos, product packaging and labeling, websites and web pages, banner ads, book covers, user interfaces for software applications, business cards, brochures, postcards, industrial products, apparel (such as T-shirts), and furniture, among others. For example, the website 99Designs.com (hhtp://99designs.com) is marketplace that brings together designers and people looking for new designs in a number of the above categories. It allows an individual or company looking to have something designed to set up a design contest by posting a design brief, with an appropriate prize for the winner of the design competition. In a recent design contest for a company logo, a few thousand suggestions from several hundred designers were generated within a few days. As with textual content, there is a need for technological solution to sort through, organize, and rate this massive volume of submissions. Unlike textual content, the available solutions for dealing with graphical crowd-sourced content are less developed.

In Unites States Patent publication 2004/0236625, a method for generating and evaluating feedback from a plurality of respondents is provided. The method presents topics to respondents and asks for answers to questions. The answers from multiple respondents are compiled into a list. Future respondents are given the option to use the answers from the list or add their own answers. The number of respondents choosing an answer is tallied to determine a ranking between answers. In this way, a consensus list is established with relative ranking between answers as the number of respondents grows. However, this method can be ineffective in that the consensus list follows the free associations of the respondents. This can lead to results that are not useful if the respondents wander off topic in their answers. In addition, later respondents may actually be answering different types of questions since they are influenced by the compiled list from earlier respondents. Further, the user interface is text based so that the utility is limited when graphic input is to be used.

Therefore, the need persists for simple and effective methods to gather input on concepts and products from respondents where the respondent is given flexibility while ensuring that the results will be useful.

SUMMARY OF THE INVENTION

Broadly, methods and systems are provided herein for determining which of a large number of forms of a concept, such as a concept for a product, a package, a process, an advertisement, a message, or the like, each of which has a plurality of alternative attributes or attribute values, is preferred by a "selector." References herein to any item among a concept, product, process, package, placement, feature, advertisement, message, placement, plan, services offering, solution, or other attribute or feature that may be optimized, or preference for which may be determined, based on the methods and systems described herein, should be understood, where context permits, to refer to any one of these or similar items. A "selector," as used herein, is one or a group of persons whose input is being considered during the course of the practice of an embodiment. "Selector" may refer either to a collection of entities participating in an exercise, or a single person, or the individual entities participating in an exercise, and the terms "respondent" or "participant" may be used interchangeably with "selector" as context permits. A selector may be a focus group, a working group of designers and/or managers within a company or professional design service organization, a group of people representative of a target demographic group, members of a club or class dedicated to some activity or pursuit, enthusiasts who are potential customers for a given product such as dog owners, golfers, interior decorators, cyclists, homeowners, teen-aged boys, persons who are employed by a company or who work within an industry, etc. Persons acting as selectors have presented to them once or serially groups of, for example, two to a dozen or so different possible design forms. In the aspect of the embodiments referred to herein as the virtual salesperson, the selector is an individual, a purchase agent, or a small group such as a couple or a family.

The selector also may comprise a group of persons engaged in a cooperative design of a product, such as a group of young women designing next spring's fashions, a professional industrial design group designing an automobile seat, a small group of architects designing a home for a client, or a group of musicians composing a piece of music. In this case, once a consensus for a design is reached, the method may include the additional step of producing a plurality of units of a selected product form or a product resembling that form. When the selector is a group of persons, the derived group of product forms presented to a person in the group may be generated using data indicative of the preferences expressed by one or more other persons in the group. Also, embodiments contemplate repeating the presentation of specific product forms within a particular derived group to one or more persons serving as the selector.

In embodiments, a selector may be a group of persons who are selected based on their using a particular mobile device platform, such as using an iPhone®, iPad®, Android®, Samsung Galaxy® or other mobile device, or based on their undertaking participation in the selection process on a mobile platform (or other platform that has different screen size or that has different device capabilities, such as the presence of a touch interface, a camera, or the like, from a conventional desktop computer). Thus, mobile selectors may be pre-selected as a group, or may be defined as a subset within an existing group of selectors, in connection with the various methods and systems disclosed herein.

In embodiments, a selector may be a group of persons who are selected based on an attribute related to a product that is competitive to a concept. For example, selectors may be selected to participate or identified within a pre-existing group as having interest in a competitor product, having knowledge about a competitor product, or having purchased a competitor product, or the like. Thus, a group of selectors may be populated or a sub-group tracked based on recognition of their being competitor-related selectors.

"Preference," which may also be referred to as "affinity," as used herein indicates a selector's favor (or disfavor) for a particular item having a set of attributes. In one embodiment a positive affinity value indicates that the selector favors or likes a particular item while a negative value indicates that the selector disfavors or dislikes that item. In embodiments, preferences may be indicated by selection along a range or scale (discrete or continuous). In embodiments, preferences may be determined by inference, such as by inferring from selector behavior which of a group of concepts is preferred.

In accordance with exemplary and non-limiting embodiments disclosed herein, the proposed designs are presented to the participants, and feedback from the latter is collected via, for example, individual computers connected in a network such as an intranet, a wireless internet, an extranet, or the internet. In embodiments, proposed concepts are presented to a user on a mobile device over a cellular, Wifi, Bluetooth, or other wireless connection. It is accordingly possible to control or limit the interpersonal dynamics among the participants. It is also possible to isolate them completely from one another, so that no one of them is aware of the preferences expressed by the others. It is also possible to allow selective levels of information to be shared among the participants, to initiate a real or virtual group discussion, to control the degree of social pressure they may feel, to satisfy a craving for information about the status or direction of the project, or for information about what products others have purchased. In embodiments, such a virtual group may be formed or conducted using a social networking group, either dedicated to such an activity or included as an activity on an existing network, such as Facebook® or Twitter®. In some embodiments such a virtual group may interact with others via mobile devices, such as by SMS messages managed through the host platform or by Twitter, or the like. Virtual groups could be used to mimic the network externalities that take place in real life, where some people tend to favor the same products that their peers are buying and consuming, while others may choose to take a contrarian attitude. This is important in such products as fashion apparel or accessories, investment instruments or portfolios, computer software, and so on. Furthermore, by connecting participants via a computer network, including a wireless network or a mobile network, it is possible to assemble a group of participants that are located in very different geographical locales. The methods also facilitate time management, as they reduce the need to bring together all participants at the same time by seamlessly integrating data that is received at different points in time (in accordance with certain embodiments). Facilitating participation by mobile users may further facilitate time management, as mobile users may undertake participation in short sessions during down time that is otherwise not useful, such as while waiting in line, or the like. Thus, in embodiments participation sessions may be designed to allow short time-duration sessions. Such short sessions present possible challenges, because the amount of data collected may be less than for longer sessions, such as appropriate for desktop users. Thus, in order to acquire appropriate amounts of data, in some embodiments results from a series of short or partial sessions for a participant may be conducted, and results from such partial sessions may be aggregated to form a full session. Data from such short or partial sessions may be tracked and compared to data for full sessions and data for actual market response to concepts, such as to identify any statistical biases or other effects that arise from using a series of partial sessions instead of one full session. For example, data may be analyzed to determine whether there is a greater tendency toward inconsistent results in a series of short sessions, reflecting intervening factors such as a participant forgetting preferences indicated in earlier sessions.

It may be noted that in embodiments such partial sessions might be considered preferable, as they might reveal participant preferences that are more stable over time, as compared to preferences that may have been influenced by transient effects. In embodiments, a participant may be prompted to provide feedback on the same set of concepts in two separated sessions, in order to assist in determining consistency within an overall session and to evaluate possible transient effects that result from the separation of time between short or partial sessions. Generally, the timing of a series of short or partial sessions may be tracked and stored, allowing consideration and weighting of the overall duration and spacing of the sessions in analysis of results, as well as weighting of the feedback of particular respondents based on the value attributed to having spaced sessions as compared to a single session. In addition, external information may be tracked and stored in connection with session participation, such as information relating to other activities or events occurring between sessions, such as stimulus presented to the user between sessions, user activities between sessions, and external events between sessions. For example, in certain optional embodiments, some users may be presented with a stimulus between sessions, to determine whether a particular stimulus appears to affect reactions to the presentation of particular concepts. In embodiments, such a stimulus could include the presentation of an advertisement on the user's mobile device, such as on a web site or in a mobile application, apparently unrelated to the session. In embodiments, such a stimulus could include an advertisement for a competitor product.

In embodiments, a participant session may be managed by a "pause" and "restart" process, so that a user, such as a mobile user, may pause a session at any time and conveniently restart upon next interacting with the interface, such as a mobile interface, for a participant session. Thus, the state of a session may be stored, such as in a server or other network-connected device, or locally on the mobile device, allowing the state to be retrieved and allowing re-commencement of the session. In embodiments, if a user has paused a session, a reminder may be generated, after a pre-determined interval or upon the user next interacting with the user's mobile device, or the like, so that the user is prompted to continue the session. The duration of each short session, the start and stop time of each short session, and the overall duration of the session, as well as participant responses during each such session, may be stored and used in the various embodiments of the methods and systems disclosed herein. In embodiments a participant session may be presented in an interface suitable for a mobile device, such as using animation or media player capabilities that are conveniently enabled with "play," "pause," and "stop" options. In embodiments, such options may be adapted to react to touch by a user. Similarly, respondent interactions to concepts may be presented with a touch screen interface, such as allowing touch selection of a preferred concept among a group of concepts, touch identification of a zone of interest on a concept, touch interaction with pull-down menus (such as to select an option among feedback options, or to select a comment with which a user agrees), and touch initiation of a typing menu, such as to type a comment related to a particular concept. Similarly, a user may be permitted to expand on regions of a concept by touch, such as a two-finger touch, to swipe between portions of a session by touch, and to move the apparent view of a set of concepts by pressing and moving or similar gesture. Thus, in embodiments a touch interface, optionally allowing pause and restart of a partial session, is provided for engaging respondent feedback in a method or system for optimizing a concept, such a method optionally relating to an evolutionary algorithm for evolving the concept.

"Products", as used herein and explained more fully below, is intended to be a generic term referring to goods, such as objects intended to be mass produced, modularized goods such as personal computers which comprise a plurality of interchangeable parts suitable for mass customization, services, such as mutual funds or travel services, and plans, such as a written list of alternatives for governing future conduct of an individual or organization, such as a business plan or a menu of food items to be consumed by a group. Where context permits, a product may include a process, such as related to a service offering. In certain cases the term product is used herein to refer to a concept itself, and such uses should be understood to include the various items described above related to concepts.

"Attributes" of a product, as used herein, is intended to refer to the structural, functional, stylistic, or economic features of the concept, product, package, service, process, plan or the like and include things such as cost, color or color combination, size, strength, shape, style, pattern, length, weight, content feature, theme, option, choice of material, softness, etc. Attributes may also include factors such as customer benefits, perceived value, membership in a "class" of products (e.g., "luxury" or "low cost"), relationship to a particular lifestyle, theme, or the like. The attributes may be aesthetic or functional. A given product has a series of possible attributes that may be combined using the methods and systems disclosed herein to develop a version of a concept, such as design. Different types of objects of the version of the concept have different groups of possible attributes. Thus, for example, designs for an aesthetically pleasing exterior appearance of a hands-free telephone would have categories of "attributes" such as overall shape, material (e.g., plastic or metal), distribution of materials (e.g., plastic sides with metal top), texture, color, color combination, length, width, thickness, size of controls, shape of control, color of controls, position of controls, position of status lights, speaker grill pattern, etc. Designs for a billboard would have attributes such as dimension, aspect ratio, dominant color, background color, color scheme, size of print, presence or absence of pictorial material, various types of content for pictorial material, number of people in a scene, site of the scene (big city, pastoral setting, domestic setting, dance hall), etc.

The term "attribute" denotes both elements that are absolute, in the sense that they are either present in the product or not, and relative, in the sense that an attribute can have many values, or be broken down into many subtypes. In this respect, the meaning of "attribute" as used herein is broader, and distinct from the term as used in the conjoint analysis literature. An example of the former is the presence or absence of a clock in an auto dashboard design or a collar on a dress design. An example of the latter is the radius or other measure of the degree of curvature on the bow of a boat hull design, or the reflectivity of the glass covering a building.

In embodiments attributes may include, and be tracked as, competitor attributes, such as attributes of a competitor product, service, plan, solution, concept, etc. For example, if a competitor product offers "strawberry flavor," such an attribute may be noted as a competitor attribute in the methods and systems disclosed herein.

Broadly, the methods and systems disclosed herein may involve generating and presenting, typically electronically, a number of design alternatives to persons who are participating in the design, selection, or market research exercise. The participants or selectors transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles. Depending on the purpose of the effort and how the method is designed and run, it can be used in a number of valuable ways. It can serve to design new products or services that are appealing to individual consumers or a targeted group of consumers, to facilitate group design efforts, to conduct market research in a better way than previously possible, e.g., probing the affinity of individual consumers, demographically defined groups of consumers, or consumers with a particular state of mind, for a given product or service. It can also be used to design a product or service that will appeal to a participating group, or to serve as a virtual salesperson, effectively facilitating a shopper's choice of what to buy. Stated differently, exemplary embodiments permit an individual shopper to quickly make a rational selection of a product from a potentially vast number of similar products having various combinations of features and attributes. One advantage of the proposed embodiments is that the participants assess several design candidates over a number of successive iterations. This is particularly helpful in those design situations that involve novel or unusual styles, as is the case with apparel and automobile styling, to name two examples, where the initial exposure to such an unusual design may elicit initial reactions that are inaccurate.

The exemplary embodiments provide evolutionary methods for gathering input from respondents on concept and product attributes in a way that is self-guiding, so that preferred concepts are quickly identified without requiring a lot of preparation. The respondents can suggest new combinations of attributes to suit their preferences. In addition, the respondents can limit the combinations of attributes that they are asked for input on. A flexible user interface is also provided which is based on clicking or touching on diagrams wherein the location of the click or touch is included in the data analysis. Methods for analyzing click or touch related data are provided. Options for modified user interface are provided for a mobile environment. Methods are provided for effectively gathering input data from respondents that relates to competitor's concepts and products.

In accordance with an exemplary and non-limiting embodiment, a method of determining a preferred set of concept attributes by a group of participants comprises the steps of presenting to a group of participants, one or more concepts, wherein each concept is comprised of different sets of concept attributes, enabling the participants to rate the concepts, enabling the participants to identify similarities between concepts, scoring each concept based on a combination of their ratings and similarities with the other concepts and identifying preferred sets of concept attributes based on the respective scores.

In accordance with an exemplary and non-limiting embodiment, a method of gathering input on the preferences of a group of participants for elements of a concept presented on a display including an input device comprises the steps of presenting one or more elements of the concept on associated portions of the display to a group of participants, enabling the participants to express preferences for elements of the concept by indicating with the input device, the portions of the display that are associated with the element and determining the preferences of the group of participants for the elements of the concepts based on the number of indications on different portions of the display as associated with different elements of the concept.

In accordance with an exemplary and non-limiting embodiment, a method of gathering input on the preferences of a group of consumers for aspects of a product form presented on a display including an input device comprises the steps of presenting one or more aspects of the product form on associated portions of the display to one or more consumers, enabling the one or more consumers to express preferences for aspects of the product forms by indicating with the input device the portions of the display that are associated with the aspects, analyzing the portions of the display indicated by the group to identify clusters of indications and determining the preferences of the group for the aspects of the product forms based on the clustered indications and the aspects of the product form displayed on those portions of the display.

In accordance with an exemplary and non-limiting embodiment, a method of gathering input on the preferences of a group of consumers for aspects of a product form presented on a display including an input device comprises the steps of presenting one or more aspects of the product form on associated portions of the display to one or more consumers, enabling the one or more consumers to express preferences for aspects of the product forms by indicating with the input device the portions of the display that are associated with the aspects, analyzing the locations of the indications on the display to identify clusters of indications by analyzing the distance between adjacent indications and determining the preferences of the group for the aspects of the product forms based on the clustered indications and the aspects of the product form displayed on those portions of the display.

In accordance with an exemplary and non-limiting embodiment, a method of determining which of a large number of forms of a product, each of which comprises a plurality of alternative attributes, is preferred by a selector using a mobile device comprises the steps of presenting to the selector a set of product forms that are viewable on the mobile device, each of which has a particular combination of attributes, enabling the selector to express a preference for a subset of the presented product forms using a touchscreen, capturing data indicative of the preferences expressed by the selector, inputting the data into a computer program for generating a derived set of product forms including forms having a new attribute or new combination of attributes, the generation of which is influenced by the captured data, presenting to a selector at least a portion of said derived group of product forms and repeating steps b) through e) until a stopping criterion is met or the selector pauses the presentation.

In accordance with an exemplary and non-limiting embodiment, a method of determining the relative affinity within a group of consumers for a product form comprised of a combination of attributes relative to a product form with one or more product attributes of a competitor's product comprises the steps of presenting to one or more consumers a group of product forms, each of which has a particular combination of attributes, enabling the one or more consumers to express preferences for the group of presented product forms, changing one or more of the product attributes in one or more of the product forms in the presented group to the product attributes of a competitor's product, and enabling the one or more consumers to express preferences for the product forms with the changed attributes.

BRIEF DESCRIPTION OF THE DRAWINGS

The advantages of the embodiments described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the embodiments.

FIG. 4C is a flow diagram depicting an exemplary and non-limiting embodiment of the steps to be taken to compute and entities niching discount.

FIG. 5 is a screenshot depicting an exemplary and non-limiting embodiment of a registration page.

FIG. 7 is a screenshot depicting an exemplary and non-limiting embodiment of a screen.

FIGS. 10 and 11 are screenshots showing the items presented to participants during an exemplary and non-limiting embodiment of a design exercise.

DETAILED DESCRIPTION

Figure 1:
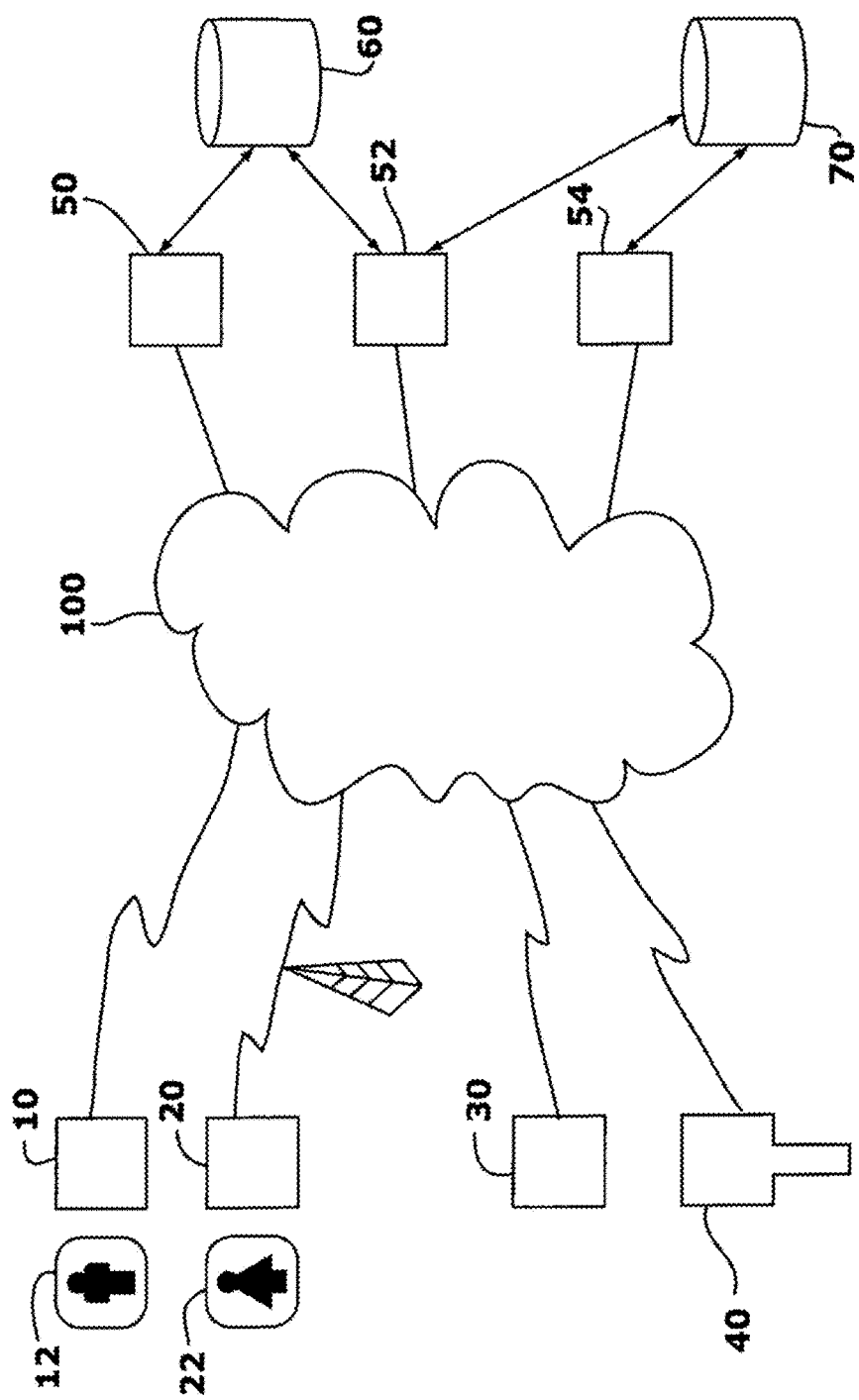
FIG. 1 is a block diagram illustrating one embodiment of the system according to an exemplary and non-limiting embodiment.

FIG. 1 shows one embodiment of an environment in which the present embodiments may be used. Selectors may use one or more client systems 10, 20, 30, 40 to communicate with one or more server computing systems 50, 52, 54 over a network 100. The network 100 may be a local-area network (LAN) such as an Ethernet network or a wide area network (WAN) such as the Internet or the World Wide Web. In embodiments the network 100 may be a mobile network, such as including cellular (2G, 3G, LTE, etc.), PSTN, satellite, and local (e.g., Wifi) components for handling mobile devices, such as handsets, tablets, mobile computers, and the like. The mobile network may include, among other things, components for handling device identifiers, such as mac addresses of cellular-enabled devices, such as to allow identification of a particular device (optionally including device type, device component capabilities, and user identifier). Client systems 10, 20, 30, 40 may be connected to the network 100 through a variety of connections including standard telephone lines, LAN or WAN links (e.g., T1, T3, 56kb, X.25), broadband connections (ISDN, Frame Relay, ATM), and wireless connections as noted above. The connections can be established using a variety of communication protocols (e.g., TCP/IP, IPX, SPX, NetBIOS, Ethernet, RS232, cellular, Wifi, Bluetooth, and direct asynchronous connections). For example, the network 100 may be a corporate intranet connecting decision makers in an organization to a centralized decision engine, or it may be a secure extranet or virtual private network connecting different entities such as a company's suppliers or consultants to the company's design engine. The network 100 may the Internet, with content delivered by conventional web or mobile application content.

As shown in FIG. 1, client systems 10, 20 may be client computing systems typically used by a user, such as any personal computer (e.g., 286-based, 386-based, 486-based, Pentium-based, iTanium-based, Power PC-based), Windows-based terminal, Network Computer, wireless device, information appliance, X-device, workstation, mini computer, mainframe computer, personal digital assistant, or other computing device. In these embodiments, client systems 10, 20 may use any one of a number of windows-oriented operating systems such as Windows 3.x, Windows 95, Windows 98, Windows NT 3.51, Windows NT 4.0, Windows CE, Macintosh, Java, Unix, and Linux. In this embodiment, the selector comprises the user 12, 22 interacting with the system via the client devices 10, 20. In embodiments, client systems 10, 20, 30, 40 may be mobile devices of various types described herein, including conventional device components known to those in the art, such as numeric keypads and/or touch screen displays of varying sizes (but typically smaller than displays used with desktop computers, mobile operating systems (such as IOS®, Android®, Windows® and the like), unique device identifiers, chipsets adapted for handling web browsing, video, animation and mobile applications, GPS or other location systems, and often including one or more integrated cameras, optionally including a lens that faces the user in a typical camera operating mode.

In other embodiments, a client system 40 is an information kiosk located in a retail establishment. In these embodiments, the client nodes 40 may include a touch-sensitive screen or membrane keyboard for receiving consumer input. The touch screen may be associated with a tablet, such as an iPad®. In other embodiments, the client system 40 is a retail point-of-sale terminal that collects consumer reference information from sale transactions. Client system 30 in FIG. 1 depicts an embodiment of a selector that is a proxy for a real person, such as a computer programmed and trained as a neural net, a statistical model, a distribution estimation algorithm, a reinforcement or Q learning method, a learning classifier system, or other machine learning methods or expert systems. In these embodiments, client system 30 may be one or more processes (threaded or otherwise) that implement evaluative models or algorithms, such as neural net models, learning classifier system, statistical models, or an expert system, which emulate the voting preferences of a human and which vote by proxy. These processes may execute on client system 30 and communicate with server systems 50, 52, 54 via network 100. Alternatively, the client system 30 may execute on the server systems 50, 52, 54 and communicate with various server processes using pipes, shared memory, or message-based communication such as remote procedure calls.

In many embodiments, one of the servers 50, 52, 54 may be responsible for presenting to selectors the initial population of product forms, generating the derived product or concept forms to be presented to the selector, and capturing and processing the data that is indicative of the selector's preference. This server is referred to as the "presentation server."

In accordance with exemplary and non-limiting embodiments, the presentation server may be adapted to generate concept presentations that are suitable for particular types of display platforms, such as small screens used on mobile phones, or touch screens used in tablets. The presentation server may be device aware, such as presenting appropriate concept or product displays based on awareness of the type of device on which the concept or product will be presented. The presentation server may be location and mobility aware, such as presenting variations that are believed suitable for a particular geographic area, or presenting versions that are suitable for viewing while in motion.

In embodiments the presentation server may be adapted to generate product or concept forms that represent competitive offerings, either generated as a whole product or concept, or derived from competitive offerings.

An attribute database 60 stores the possible attributes available for generating product forms. Such attributes may include attributes of competitor products.

A voting database 70 stores the preference data obtained from the selector during the course of the process. In some embodiments a single database is used to store both the possible product attributes as well as obtained preference data.

Another of the servers 50, 52, 54 implements generative and evolutionary computation programs that utilize the stored attribute data and the stored preference data to generate representations of the product forms. This server is referred to as the "generate server." The generate server may be adapted to generate representations that are suitable for display on particular platforms, sizes of displays or types of displays as noted herein. The generate server may be adapted to generate representations that are suitable for display in short duration sessions, in particular geographic areas (such as determined by the GPS or other location facility of a mobile device), or in certain contexts, such when a user is detected to be mobile. The generate server may also be adapted to generate representations of competitive products, as well as representations that are derived from competitive products or attributes thereof. The presentation server may process these product form representations to generate product forms that can be presented to the selector.

Yet another of the servers 50, 52, 54 may serve as a vote aggregation analysis server. This server may play several roles: it may capture the preference data coming from the selector and stores it in the voting database 70; it may also analyze the data and transform or condition it into a format that can be used by the generate server; it may also be used to develop models, such as statistical or neural net based models or other machine learning models of the selector preferences, and may use these models to eliminate some of the forms generated by the generate server prior to presenting them to the selector. Additionally, it may provide data indicative of the preference of subsets of the selector, which may be appended to the presented forms by presentation server. Although depicted as separate servers, the generate server, presentation server, and vote aggregation/analysis server may be embodied as any number of physical servers.

For embodiments that allow for or exploit a purchase decision by the selector or subset thereof, one of the servers 50, 52, 54 may be an e-commerce server. For example, a purchase decision may provide one of the stopping conditions for a design exercise, or individuals comprising the selector may be permitted to place a purchase order for one of the intermediate product forms that they find satisfactory. The e-commerce server, which is well understood by those skilled in the art, may use a database containing customer information such as billing information and shipping address. The e-commerce server may be used to obtain the relevant billing and shipping information from the client, process it, store it in the database, and forward the relevant data to the order fulfillment entity. In some such embodiments, one of the servers 50, 52, 54 may be a server adapted to support mobile commerce, such as a server for a mobile e-commerce application, or server adapted to service a point of purchase device, such as a tablet. In embodiments the server may be adapted to track the location and motion of a mobile device on which a selector interacts with the server, such as by taking in GPS location data and/or generating GPS traces indicating movement.

The selector also may comprise one or more computers programmed as a statistical model, neural net, learning classifier system, other machine learning models, or with other appropriate software algorithms "trained" to mimic or simulate a consumer's preference pattern. Such a surrogate selector can, among other things, facilitate the feedback and evaluation process during a computer-driven emergent design cycle. A suitable computer program can facilitate or even eliminate the consumer's participation except perhaps as a supervisor. For instance, after going through a training phase, an evaluation program may express a suggested preference pattern (evaluation) for a given set of alternatives for the consumer to accept or adjust before submission as input to the generation program. After repeated cycles, the consumer may allow his or her personal evaluation program to provide unsupervised input to the generation program for several cycles before pausing to allow the consumer to make adjustments. Ultimately a sense of trust may develop between the consumer and the evaluation program that allows the evaluation program to act as a proxy for the consumer. An advantage of such a method is that the evaluation program and the generation program can interact for several cycles starting from many initial seed evaluation sets (alternatives) in order to scout more fully the fitness landscape between the consumer preferences and particular design alternative. In addition, the neural net, learning classifier system, machine learning system, expert system, or other type of evaluation programs can be trained using a set of emergent design cycles with computer generated alternatives and consumer specified evaluations. The prospect of having a personalized evaluation program available to assist in the future interactions with the emergent design process may be an inducement to the consumer to engage in a large set of design cycles.

In other exemplary embodiments, the selector consists of a single individual, i.e., the system is a single-user system. In this case, there are no multiple votes to be aggregated and analyzed. Therefore, the voting database 70 is used to store the preference data throughout the design exercise or decision-making process for the particular selector. The voting database 70 may also contain preference data from other selectors who may have participated in similar exercises previous to the current one, including data from exercises in which the same selector may have participated previously. One of the servers 50, 52, 54 collects, analyzes and stores the incoming preference data from the selector; it may also be used to provide feedback to the participant by providing data to the presentation server, which is indicative of the evolution of the selector's preferences over the duration of the exercise, or which may provide the selector with a basis for comparing present preferences to data stored in the voting database 70.

This embodiment may be used to implement the virtual salesperson embodiment. It may also be used to implement a one-person design exercise via an application service provider model. Of course, such a system alternatively could be embodied in a single, suitably programmed computer.

Figure 2:
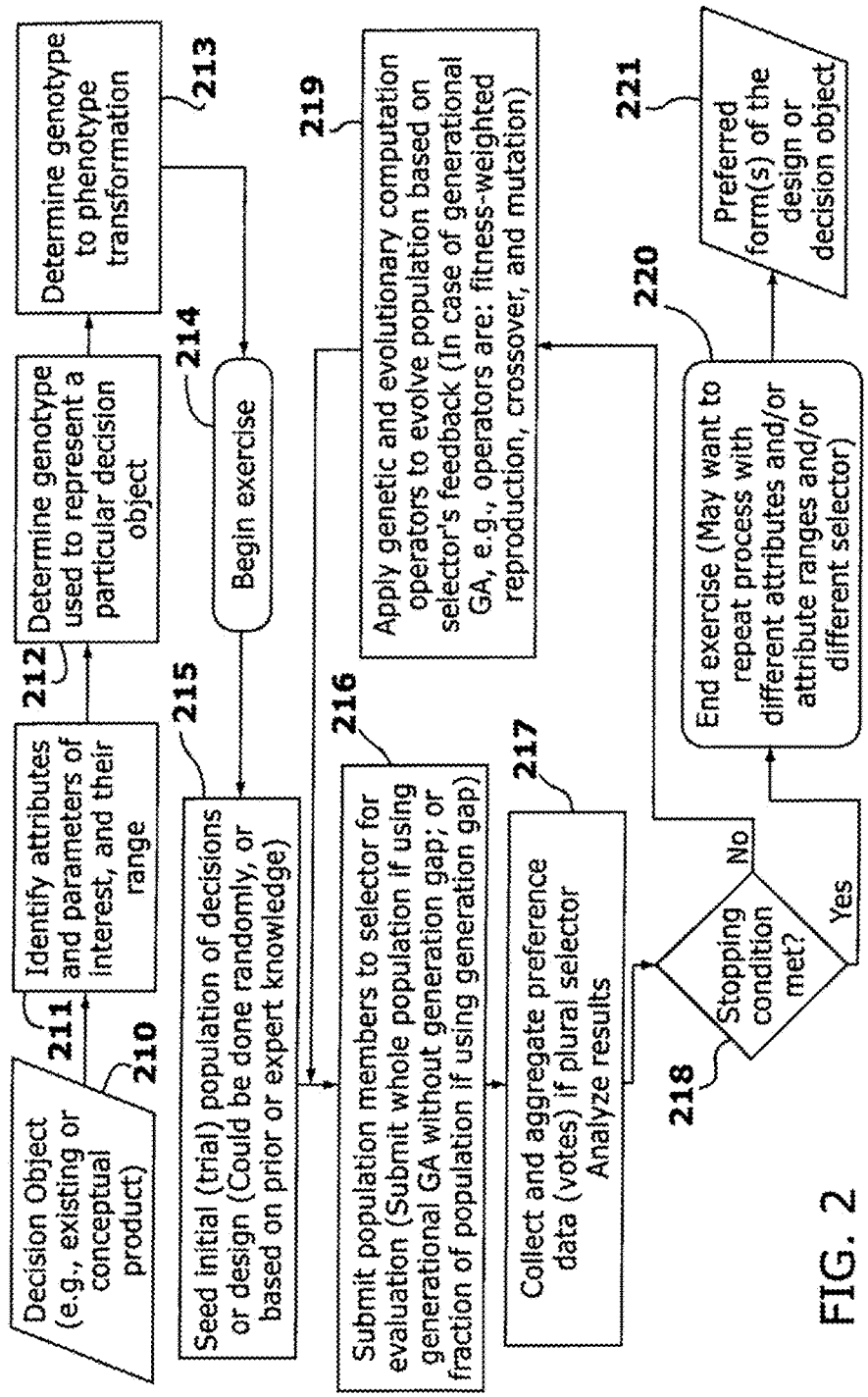
FIG. 2 is a flowchart showing an exemplary and non-limiting embodiment of the process steps of decision-making or design exercises.

FIG. 2 is a process flow diagram for an exemplary decision-making or product design exercise, according to an exemplary and non-limiting embodiment.

In this example, the process starts with identifying the object of the exercise, that is, the decision object or the design object, represented by block 210. At this point, the object is identified in very general terms, such as, "the colors of a tennis shoe," "next week's meeting agenda," "the menu for next month's association meeting." In some embodiments, the step of identifying the object of the exercise 210 is skipped, such as in the "virtual salesperson" embodiment. Next, in step 211, those attributes of the object that will be permitted to change during the exercise are identified, and the different values that they will be permitted to take on are determined. For example, in the case of the colors of the tennis shoe mentioned above, step 211 may involve identifying the individual elements of the shoe which are subject to design variation; the result may be: the vamp color, the eye stay color, the tongue color, the heel color, the sole color, and the laces color. Furthermore, the range of colors that each of these elements may take are established. For example, the laces may have three different colors they can take on, e.g., white, black, and red, or there may be four shades of red, or red attributes with different values. Similarly, there may be eight colors that the vamp may take, e.g., red, blue, white, green, orange, black, yellow, and purple. Furthermore, in other embodiments, certain constraint rules may be implemented that prevent, for example, a certain color of laces to be used with a particular color of the tongue. In other embodiments, an attribute may have a continuous range of values. It should be noted that attribute variants may be selected or constrained based on their suitability for display in particular device platforms. For example, minute details of a structure might not be suitable for presentation on a small screen of a phone, so a constraint might require elements that are above a certain size or scale. Attribute variants might be constrained or promoted based on the location of the user; for example, foreign language variants might be included in regions where a large number of selectors are likely to be multi-lingual. Attribute variants might be constrained based on the likely attentiveness of the user, such as based on whether the user is in motion (as determined for example with accelerometers), or in a loud environment or whether the user is frequently glancing away from the screen (such as detected by a camera of the device, such as the back-facing camera of a mobile phone or tablet). Attribute variants might be tagged as related to a competitor product. For example, the color scheme of a competitor's brand might be allowed in attribute variants, but such attribute variants might be tracked within the methods and systems disclosed herein as potentially competitive attribute variants.

The next step in the process, represented by block 212, involves determining the representation or genotypic coding that will be used to represent the particular design or decision object internally, in the genetic algorithm, genetic program, or other GEC program. In the case where a genetic algorithm, the "genotype" is a data structure that encodes each attribute value, such that a particular instance, combination of attributes, or "value" of that structure represents one particular product form. It is directly tied to the previous step 211, in which the attributes and their possible values are decided, sometimes called "featurization." Continuing with the example of the tennis shoe colors, an appropriate genotype might consist of six integers strung together, each of which can be thought of as a gene representing one of the identified features such as the laces color. That integer in turn would be limited to taking on distinct integer values, here, as an example, three, say 0, 1, and 2, each of which is used to represent one of the three predetermined, allowable colors for the laces. This example genotype structure is shown schematically below.

| Integer 1 | Integer 2 | Integer 3 | Integer 4 | Integer 5 | Integer 6 |
|---|---|---|---|---|---|
| Represents vamp color | Represents eye stay color | Represents tongue color | Represents heel color | Represents sole color | Represents lace color |
| Range: 0-7 | ... | ... | ... | ... | Range: 0-2 |

In another example, it may be that the values that a gene can take on are not indices for predefined attributes, but rather represent a physical parameter. For example, if one of the design parameters identified in 211 was the height of the heel of the shoe, then a gene coding it might be a real number allowed to take on values, for example, between 0.5 and 1.5, where the number represents the actual height in inches. In another case, the integers or real values by the genotype may represent parameters that are used in a complex computer-aided design program that generates different forms based on these parameters; for example, the parameters may represent the dimensions and radii of curvature of certain shapes, and/or the parameters of Bezier curves that make up the shape.

In one embodiment, products may be described as models in a CAD/CAM system, and design features may be extracted from the CAD/CAM model of the product automatically by the CAD/CAM system. For example, a product may be represented in a CAD/CAM system by a table linking model attributes and the specific value of an attribute. The model attributes may be thought of as the respective "genes" for a product and the specific values of the variables as the "chromosome" values or specific "alleles". The attribute values can be manipulated by making API calls to the CAD/CAM system.

In embodiments, the range of attribute values, or alleles, for a given gene may be defined such that a gene, when expressed in one of a different set of presentation environments, such as a desktop platform, a mobile phone, or a tablet, takes on an appropriate range suitable for useful presentation in that environment. For example, features that are difficult to see on a mobile phone might be omitted from the set of dynamic features (ones that vary) for that presentation (effectively making the features either locked in or locked out of the representation), while such features might remain dynamic for a full screen environment.

In embodiments, one or more genes may be defined based on an attribute of a competitor's product. Such genes may be varied based on the location of the selector, such that a different competitor product or set of products is presented in different regions of the country, based on the location of the selector as determined from an address of the selector, or based on the location of the selector's mobile device. Thus, methods and systems may include location aware evolution of concepts.

The next step in the flowchart, represented by block 213, involves determining a mapping or transformation from the genotype representation described above, a data structure internal to the evolutionary algorithm, to the phenotype which is the corresponding form representation that can be presented to the selector. In the example of the tennis shoe color, this mapping is trivial, as there is a simple correspondence between a particular feature color and its index value. In other cases, this mapping may be more complex. For example, in a case where genetic programming is used, the genotype may encode a program or set of instructions that generate a product form, say a geometric shape, or determining the parametric computer aided design model of a shape, the parameters of which are encoded by the genome. In embodiments the mapping may account for the characteristics of the device on which it will be displayed, such that once the device characteristics are known (e.g., whether the device supports animation, the screen size and type of the device, whether the device supports touch interaction, the location of the device, the mobility of the device, and the like) the appropriate mapping is selected and an appropriate phenotype is delivered for a given genotype. In embodiments, a phenotype may include a competitor gene, such that a mapping may account for the expression of a feature identified in a competitor product in combination with other features, such as features of a client product. Thus, the program may explore genotypes and resulting phenotypes that correspond to the adoption of a competitor feature in a client's product. Similarly, a client feature, such as a new feature under consideration, may be introduced as a gene in a genotype that otherwise corresponds to a competitor product, so that the effects of a competitor adopting a client feature can be explored.

The preceding steps, 210 through 213, are preparatory steps for the iterative part of the process, which begins at step 214. In step 215, an initial population of possible solutions—possible designs, possible decisions, possible menus—is generated. In the language of Genetic and Evolutionary Computation, this initial population is often referred to as a seed population or trial population. Typical population sizes may range from 2 to 100,000. In some embodiments, typical population sizes range from 3 to 50,000. In more preferred embodiments, typical population sizes range from 4 to 10,000. In still more preferred embodiments, typical population sizes range from 5 to 1,000. In a most preferred embodiment, the typical population size ranges from less than 50 to 600. Each member of the population is an instance of the genotype described earlier, that is, a data structure where each field or "gene" takes on one of its allowable values; these are also referred to as chromosomes. The seed population may be generated by picking random values from the allowable ranges for each field in the chromosome. Other possible ways to populate the initial set of possible solutions is to use chromosomes that are the result of a previous exercise, ones that represent product forms designed by people using other (more traditional) means, or among other methods which depend in part on the goals of the process. In embodiments, the seed population is intentionally seeded or confirmed to contain a threshold degree of representation of certain types of genotypes; for example, ensuring that at least some genotypes that are suitable for presentation in a mobile environment are present within the seed population. In embodiments, the seed population is intentionally seeded or confirmed to contain a representation of a competitive product. In embodiments, such as to explore new market entry, the seed population is intentionally seeded to contain a set of competitive products that represent current products in a given market, and the trial population is weighted to correspond to the current market shares held by such competitive products, so that evolution after inclusion of a seed introduction of different genotypes of a new product can be considered, both as to the success of one or more new genotypes (i.e., which is the best in a given market) and as to the impact of new genotypes on the competitive population). The feedback function for evolution can be adjusted over time based on comparison of the results of such evolution exercises and actual market dynamics. Such seeding may vary based on the location of the selector, such as determined by the location of the selector's mobile device, so that the mix of competitive products may account for the market share within a particular geographic market.

In embodiments, a user interface for a selector may include presenting proposed designs in context, such as presenting the designs in the UI as if they are on a shelf, with packaging for competitor offerings being presented adjacently, such if on a shelf with a proposed design or a design concept being evaluated. In embodiments, selection is then allowed via paired comparison, with dual thumbnail magnification (for selecting one of the two proposed designs, and for zooming the selected design in and out of context). It may be noted that such an interface may be used in EA, and in particular GA-based methods, but it may also be used in methods where a selector's choices are evaluated directly, such as in conventional surveying methods.

Once the initial population is generated, it is presented to the selector for evaluation. This step is represented at 216. Presenting the possible solutions may require using the genotype to phenotype transformation scheme that was determined in 213. Step 216 may involve presenting the whole population of possible solutions to the selector, or it might involve presenting a subset of that population. In some particular embodiments, the selector is presented with subsets of, or "windows" onto, the global (in this case, the initial) population. For embodiments involving CAD/CAM systems, step 216 requires the CAD/CAM system to render the respective members of the population. At a minimum, two of the possible solutions are presented to the selector. At 216, along with the presentation of the product forms, the selector also is presented with means for expressing a preference among them. This can be implemented in any number of ways, from clicking on the ones that are deemed good, to moving the assigning grades to the various forms presented, ordering the forms by order of preference, and so on. In embodiments, a respondent may express a preference using a touch screen interface, such as by touching a preferred representation or using a gesture to swipe away a disfavored representation. In embodiments, a respondent may respond using a mobile phone or other mobile device. Each of these methods results in particular types of preference data that is captured and used in the next step. In particular, one way a selector may indicate his or her preference is by issuing a purchase request for one of the forms presented, one that is presumably deemed satisfactory. A selector may also indicate preference by a duration of interaction, such as by watching a version of video or animation content for a measured duration that indicates a preference for that content. Thus, where a short or partial session allows for pause and re-start capability, the duration of the short or partial sessions may be used as an indicator of preference or engagement. In embodiments where short or partial sessions are enabled, a selector may indicate preference by virtue of undertaking longer duration partial sessions in which the selector interacts with particular versions of a representation; that is, the duration of the session itself may be considered as part of the selector's input. In embodiments the presentation for a selector may allow switching between modes, such as between a click and comment mode suitable for a keyboard/mouse-enabled device and a touch mode suitable for a touch screen device. In embodiments, a session may be managed based on the detected bandwidth and processing power of a device, such as presenting lower-resolution versions of representations or shorter sessions of input for respondents who have lower network bandwidth, higher latency or slower devices. In embodiments a selector may engage in a dual screen experience, such as reviewing concepts on one device (desktop, tablet or phone) and providing feedback on another device; for example, a user may review concepts on an HD television screen, while providing feedback on a mobile phone or tablet. To manage such a system, methods and systems may include server-side synchronization and identity tracking components and processes, so that a selector's simultaneous or sequential actions with respect to two screens can be considered within the context of a single selection process. Such a dual screen experience may be used for representation in various embodiments disclosed herein, as well as for respondent action.

In step 217, the preference data from the selector is collected and analyzed, typically electronically. In the case where the selector comprises more than one individual, the preference data from the different individuals may be aggregated and conditioned to make it usable in the subsequent steps of the process. In this step, any number of vote aggregation methods may be used. It should be noted that the vote aggregation method and the method provided to the selector to express their preference are technically related. In embodiments, the group of selectors may be determined (the study "fielded") based at least in part on the location of the selectors (such as determined in some cases using a location facility of a mobile device or the address) and on the mix of selectors using particular types of devices (such as ensuring an adequate representation of selectors using mobile phones, tablets, and desktop computers, as well as an appropriate mix of selectors who are engaging in a dual screen experience).

In some cases, selectors, who are often compensated in some way, either via cash or some other form of reward, such as free use of a product, may seek to "game" or "cheat" the system by providing input carelessly, or with minimal attention. Thus, the extent of engagement or attentiveness of a selector is an important factor in determining whether the selector's input is valid or valuable. In embodiments, attentiveness can be determined by evaluating the input of the selector, including measuring the time spent on each selection, as well as patterns in selection, such as indicating inconsistent selection (e.g., upon being presented with the same comparison, making a different choice, as the presentation server may be configured to provide the same choices repeatedly in order to test such consistency), random selection (showing no discernible pattern of preference for any type of attribute), or making the same selection every time (e.g., selecting the representation on the right side of the screen in all instances). Such methods allow detection of "cheaters," or uses who are looking to game the system and acquire a reward without providing attentive, careful selection. In embodiments, detection of attentiveness may use capabilities of the device platform on which selection is made; for example, a web camera of a computer, or the user-facing/back-facing camera of a mobile device such as a smart phone or tablet may be used to watch the user, determining whether the user is in fact watching the screen during selection or frequently looking away, such as indicating the user is in fact paying attention to other items, rather than selection. Thus, methods and systems herein may include components and systems for capturing images or video of a user's eye, and automatically, or by human interaction, evaluating the direction of attention and/or movement of the eye, thus identifying and tracking eye movements. Eye tracking may involve using a camera component of a device, as well as client programs and/or server-side processing to enable such eye tracking. In embodiments, a camera may undertake more complex processing of images of a user, such as by using facial analysis software to assess the effect of the user. The affect may indicate a degree of attentiveness, or it may indicate pleasure, displeasure, disgust, or other emotional reaction to a representation. Thus, image or video analysis, such as from a user-facing camera of a device, whether automatically using affect-analysis computing or by human evaluation, may be used as a factor of selection, indicating a preference of a selector that is expressed through emotion, rather than by clicking or touching on a user interface.

The voting systems useful in the practice of the embodiments may be generally classified into at least five categories: (1) majority rule and majoritarian methods; (2) positional methods; (3) multi-stage methods; (4) utilitarian methods; (5) and proportional methods.

Majority Rule and majoritarian methods rely only on information from binary comparisons between alternatives. Perhaps the most familiar example of a majority rule is the presidential election process in the United States, which is often a choice between two candidates. The winner of a majority rule election scheme is the alternative (or candidate) preferred by more than half of the voters. For cases in which more than two alternatives are presented, then some other procedure, such runoff elections, are needed to whittle the number of alternatives down to two (or to group the alternatives into two groups). Simple majority rule can be applied to more than two alternatives by performing pairwise comparisons and eliminating the alternatives that lose out in these comparisons. In this method, the winner may depend on the order in which the pairwise comparisons are performed. Other majoritarian systems include the Amendment Procedure, the Successive Procedure, The Copeland Rule (which uses pairwise comparisons and counts losses as well as wins), and the Schwartz rule, among others.

Positional Methods utilize more information about voters' preference ordering than majoritarian methods (but not the whole ordering necessarily.) In plurality voting (also known as first past the post) every voter votes for his or her most preferred n alternatives, where n is the number of candidates to be elected. The alternatives with the most votes win. Unlike majoritarian methods, due to vote splitting in plurality voting, it is possible for two similar candidates both to lose to a third candidate that is different enough, even though it is less preferred by the overall electorate. Positional methods are particularly relevant to several preferred embodiments, as these involve presenting a number of alternatives to the participants in the exercise, and asking them to rank the alternatives by order of preference.

In Approval voting, voters can pick as many of the alternatives as they wish (all the ones they "approve of" or like. The winner is generally the alternative that receives a plurality of votes (more votes than the others).

In Borda Count voting, which is an example of a "scoring" or "point" method, each voter gives a number of points to each alternative, as follows: the most preferred of the n alternatives is given n−1 points, the next most preferred is given n−2 points, all the way to n−n or 0 points to the least preferred alternative. The winning alternative is the one that receives the most votes.

Multi-Stage Methods use different functions or mechanisms at different stages of the voting process; they may also use the same mechanism iteratively on a decreasing number of alternatives. One advantage of these methods is that a voter need not fear wasting his or her vote if they choose an alternative that is unlikely to win. One such method is Black's method, which selects the Condorcet winner if one exists (through successive pairwise comparisons); if a Condorcet winner cannot be found, it selects the Borda count winner. Another multi-stage method is the runoff procedure, briefly mentioned earlier, in which, absent a majority winner in the first round of balloting, a runoff simple majority election is held between the two alternatives that received the most votes. Another multi-stage method is Nanson's Borda-Elimination procedure, which applies the Borda method successively, eliminating the lowest scoring alternative at each round, until the winner remains. An advantage of this approach is that, unlike the regular Borda method, it will never pick the Condorcet loser.

Single-Transferable Voting (SVT) or Hare's procedure is popular in England. In this method, voters submit their preference ranking over all candidates. Any candidate who receives more than a threshold number of first places is elected. If the elected candidates receive more votes than are necessary for election, the excess votes they have received are redistributed over the remaining candidates based on the second-choice preferences of the voters. And again, any voter who receives more than the necessary number of votes, following the redistribution of the excess votes, is elected, and a new round of redistribution is carried out. If no more excess winning votes are available, and the necessary number of winners has not been reached, the lowest scoring candidate is eliminated and the votes for that candidates are redistributed.

There are many variations on the SVT procedure, depending on the threshold needed to win, depending on the procedure used to redistribute the freed votes, and depending on the method used to resolve ties. One method for redistributing the votes involves "controlled randomness." SVT can be used to elect only one alternative, in which case redistribution involves votes from eliminated candidates only. (This method is also known as Alternate Vote or Majority Preference.)

Coomb's procedure is similar to SVT, except that the alternatives that garner the most last places are eliminated (and their votes redistributed.) Whereas STV tends to select the most intensely liked alternative, Coomb's procedure tends to select the alternative that is least disliked by the majority.

Utilitarian Methods. Unlike the methods discussed so far, which only required the voter to provide an ordinal ranking of the alternatives, Utilitarian methods require a cardinal rating. The voters are asked to assign utility values to each of the alternatives presented to them. These utility values are intended to reflect the amount of happiness or satisfaction the voters expect to derive from each alternative, using a finite scale (commonly used scales are those that go from 1 to 5, 1 to 7, 0 to 10, or from 0 to 100.) A distinction should be made between interval scales, and ratio scales; in the former, the zero has no meaning, and it is only the difference between values that is meaningful; in the latter, the zero does mean absence of the characteristic that is being measured. The outcomes in utilitarian methods is based on the aggregation of the utility values given by the voters for the various alternatives.

To further clarify the difference between the methods presented so far and the present utilitarian methods, it has been noted that majoritarian methods base decisions on how many times x is ahead of one other alternative. Positional methods base decisions on how many times x is ahead of all other alternatives. Neither of these methods bases decision on the voters' direct valuation of the alternatives (although positional methods are sometimes mistakenly so interpreted.) Utilitarian methods account for the intensity of judgment, that is, for how much an alternative x is ahead of another alternative y. The following methods are described by Riker and Mueller.

Direct Aggregation of Cardinal Utility, such as may be used in one of the preferred embodiments described herein, is the simple Summation of Cardinal Utility method. In this method, the utility values for each alternative are added and the alternative receiving the largest sum wins. Another method involves the multiplication of utilities, where the utility values are multiplied instead of being summed. Variations on these methods involve normalizing the utility values before using them (by fitting them to some normal scale). One problem with these voting methods is the tendency voters have to inflate the utility value they assign to their favorite alternative (to increase its chances of winning), and to deflate the utility they assign to the alternatives they dislike.

One variation may exploit is the case where different voters or groups or voters are given more or less voting power than others, through the use of weighting factors in the summation or the multiplication of the utilities. This amounts to a "super voter" scheme, e.g., a manager or designer could be given more voting power than others constituting the selector. Note that in the ordinal voting schemes described before, super voter status would involve giving the super voter more than one voice.

Demand-Revealing Methods.

This method attempts to prevent the problem with direct aggregation discussed above, where voters inflate their valuation for their preferred outcome. The idea is to have voters vote by offering to pay a certain amount of money m in order to obtain a preferred alternative. The amounts of money offered for each alternative are summed, and the alternative that garners the largest sum wins. Voters whose offers for the winning alternative exceed the margin of victory must pay a tax equal to their contribution to the victory. The tax is not supposed to go to anyone involved in the voting system, in order not to corrupt their behavior. One downside of such a system is that the tax may not effectively deter those voters with a greater endowment of money. In the context of the embodiments, typically some token of value would be used; and the tax would consist of some form of penalty that may involve the tokens or something else of value to the participants in the context of the exercise.

In one aspect the embodiment contemplates switching of voting scheme from one system to another as the design exercise progresses. As will be apparent from the list of voting methods noted above, some are better on certain measures of fairness, such as maximizing participation, while others are better at quickly finding an alternative that potentially only a small part of the persons making up the selector feel strongly about. In other words, the voting system in use during an exercise conducted in accordance with the embodiments at any given point during the exercise may help exploration, for example, when exploiting the market research embodiment, or help reach rapid optimization, or convergence to a particular design favored by a person or set of person comprising the selector's representative, for example, of a particular market segment. Thus, for example, the embodiments may be practiced by switching between voting paradigms during the course of the exercise to help exploration early on and then drive toward a solution in a later stage. This general concept has been recognized as having value of certain standard techniques used in genetic algorithms for preventing premature convergence and allowing exploration early on. These have to do with the scaling of the fitness data that's fed back to the genetic algorithm from the evaluation function. Of course, this can be done in accordance with the practice of the disclosed embodiments. Alternatively, the selection and change of voting schemes are used to effectively accomplish the same thing.

Still another aspect the embodiment contemplates running simple voting systems in parallel and, for example, comparing the output at each generation or at assigned posts during the course of the exercise. A decision-making scheme or rule or supervisor then may decide which one to use or possibly to use some combination of their outcomes to drive the next iteration in the process. Such a decision could be based not only on the current voting data at the time the assessment is made but also on the outcomes of different vote or data aggregations schemes and voting history or earlier iterations. Of course, this technique may be used by the computer program generating the derived product alternatives. However, again, a similar result may be achieved by running several voting systems in parallel.

In embodiments, voting methods may take into account the platform on which or type of session in which an action leading to a vote was undertaken. For example, actions taken on a mobile phone or during a short or partial session may be weighted less (or more) than actions taken on a tablet or desktop, or actions taken in a dual screen experience. Weighting may take into account the relationship of the platform or the type of session to the type of concept being explored. For example, a concept for a new mobile application might provide greater weight to votes that result from selectors who are using a mobile platform, while a concept involving a large work of art or very high quality graphics might ascribe greater weight to selectors who have high performance graphics cards on their machines. Thus, a voting scheme may account for platform type, device capabilities and performance characteristics, with which a session was conducted, as well as the type of session. Weights ascribed in voting methods may also account for the location of the selector, the mobility of the selector, the emotional reaction of the selector, and/or the attentiveness of the selector, as determined using the components described above. For example, selections of a highly reactive selector, as measured by affect-based analysis, or a highly attentive selector, as indicated by eye tracking, may be provided more weight than those of a typical selector, and data from non-reactive or inattentive selectors may be discarded or provided with minimal weight.

In step 218, the preference data as well as other parameters of the exercise (such as the time elapsed, the number of iterations run, etc.) is tested to see whether a stopping condition has been met. If a stopping condition has not yet been met, the process moves on to step 219. In this step, the genetic computation operations are performed on the population of possible solutions, in order to generate a "new" or derived population of solutions. The algorithms used at this stage may vary widely as noted above. In one preferred form, the operation is a genetic algorithm with real and integer-valued genes. The operators that are typical in most implementations of genetic and evolutionary computation include selection or reproduction operators, recombination or crossover operators, and mutation operators. Reproduction operators basically create copies of the members of the current generation of solutions as a function of their fitness. Those possible solutions that were preferred by the selector, that is, that were found by the selector to have a high degree of fitness, are more likely to be selected and reproduced than the ones that were found to be less desirable. It should be noted that most implementations of reproduction operators are not deterministic, but involve an element of randomness.

In other words, it is the likelihood that a possible solution will be reproduced that varies in accordance with its fitness. It should also be noted that a highly fit solution may result in several copies of that solution showing up at this intermediate stage of reproduction.

Another operator is the crossover operator, which acts on the intermediate population of solutions that is the outcome of the reproduction operation. In crossover, members of the intermediate population are paired, and the two chromosomes of each pairing are split and the different parts cross-combined, resulting in a pair of offsprings, i.e., new pair of possible solutions. The schematic below represents the case of single point crossover.

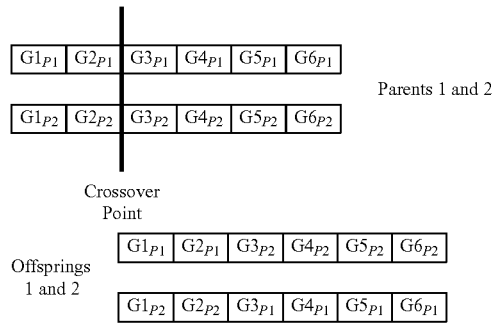

The resulting two chromosomes, following single point crossover between genes 2 and 3.

It should be noted that the pairing process could be performed at random, or it could be based on the fitness or desirability of the different chromosomes. In addition, certain schemes may pair parents according to their genetic similarity or dissimilarity (we describe a more complex assortative mating scheme later herein.) Furthermore, a decision to effect a crossover operation on any given pair may involve an element of randomness. In single point crossover, the crossover location may be determined at random as well. (Some of the embodiments described later result in a single offspring for each pair of parents.) In embodiments, a crossover operator could be specifically programmed to re-insert competitor product genes, so that competitor products continue to be represented throughout evolution, regardless of the results of earlier stages.

A number of crossover operators have been developed by researchers and practitioners in the field of genetic computation; these include multipoint crossover and uniform crossover, each offering different performance (in terms of convergence, or the exploration/exploitation trade-off) under different conditions. In the case of real-valued genes, the crossover operator may involve both interpolation and extrapolation between the values of the corresponding genes in the parent chromosomes.

Following crossover, a mutation operator is applied to the offsprings, that is, the results of crossover. Mutation may be a random operation intended to increase the exploration of the space of possible solutions. The implementation depends on the particular representation used. In the case where a binary valued genetic algorithm is used, the genotype consists of a string of 0s and 1s; in that case mutation involves flipping a bit (from 0 to 1, or vice versa) at random, at a given probability. For example, if the mutation rate is 0.1%, then, on average, one in every 1000 bits encountered in the population of chromosomes, one will be selected at random and flipped. In the case where a gene takes on an integer value, then, at the appropriate mutation probability (say, every one in 1000 genes on average), the integer is replaced by another one selected at random from the range of allowable values for that gene, or from a certain neighborhood of the current value of that gene.

At that point, after all genetic computations are applied to the population of possible forms or solutions, a derived population is obtained, and step 219 is effectively complete. (There may be an additional operation applied, sometimes referred to as "monster killing" whereby non-allowable chromosomes that may have been generated are eliminated and replacements generated.) Thus, the various constraints described herein may be enforced as this stage. Similarly, a population may be evaluated for the presence of a desired subset, such as a subset representative of a competitor product, or a subset that satisfies conditions necessary for appropriate presentation to a particular region of users, or users that have particular types of devices, and further crossover operation, or seeding of the population, may occur in order to address such issues.

The derived population is now ready to be presented to the selector for evaluation at step 216, thus completing an iteration of the loop.

If, at block 218, one of the stopping conditions obtains, the process proceeds to block 220, which represents the end of the exercise. At 220, a preferred form or several preferred forms 221 have been found. It is possible at this point to repeat the exercise with a different selector, or with the same selector but with a different initial population of solutions, or both. It is also possible to perform a related exercise, using different attributes or different attribute ranges for the same design or decision object (i.e., step 211 is repeated to obtain different attributes, although 210 is unchanged.) This may be the case if a hierarchical design process is being undertaken, whereby one aspect of the product is designed first, then another aspect. For example, design the shape of a shoe in one phase, followed by choosing the color palette for it.

Embodiments described above may be referred to as "generational evolutionary algorithms," where a considerable percentage of the population is replaced by offsprings. Steady-state evolutionary algorithms, in contrast, typically create only one or two offspring per iteration of the algorithm. Parents are usually chosen with a stochastic process that is biased in favor of more fit individuals. Once the one or two offsprings are made, individuals from the population must be selected for removal in order to make room for the new offsprings. A great variety of removal methods exist for steady-state algorithms.

For example, the individual with the worst fitness may be replaced by an offspring. Alternatively, the member to be replaced may be chosen using a stochastic process that is biased in favor of less fit individuals. Alternatively, removal may be effected at random, such that each individual has an equal chance of being removed. Crowding methods represent yet another set of replacement schemes. In these methods, offspring replace the most similar individual from some subset of the population. Known crowding methods differ on how this subset is selected and how comparisons are made. However, because steady-state algorithms change the population contents gradually, they can provide better diversity maintenance than ordinary generational algorithms.

Figure 3A:
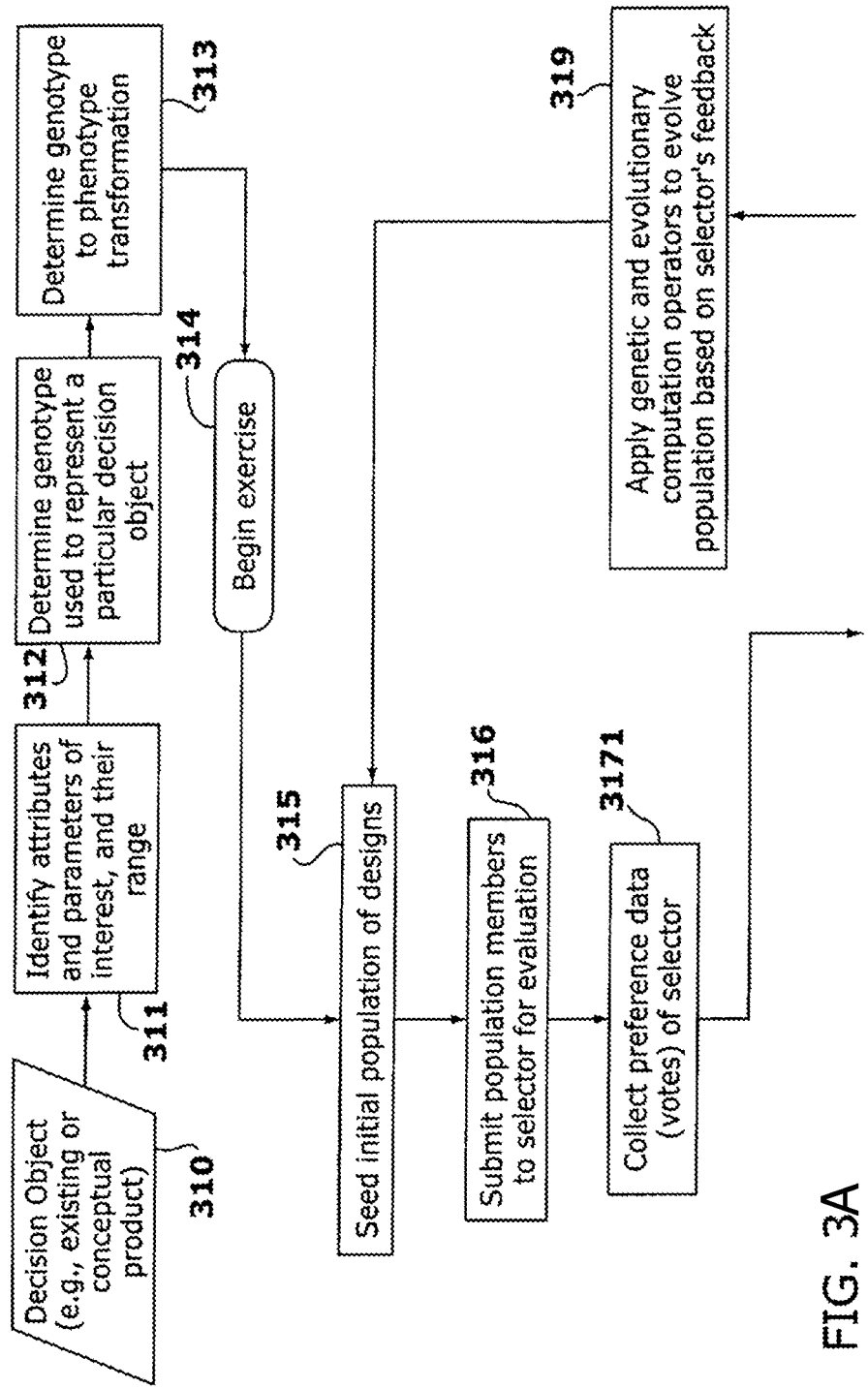
FIGS. 3A-3B are a flowchart showing an exemplary and non-limiting embodiment of the steps to be taken in an exercise involving a multipurpose selector entity with purchase decisions as the outcome.
Figure 3B:
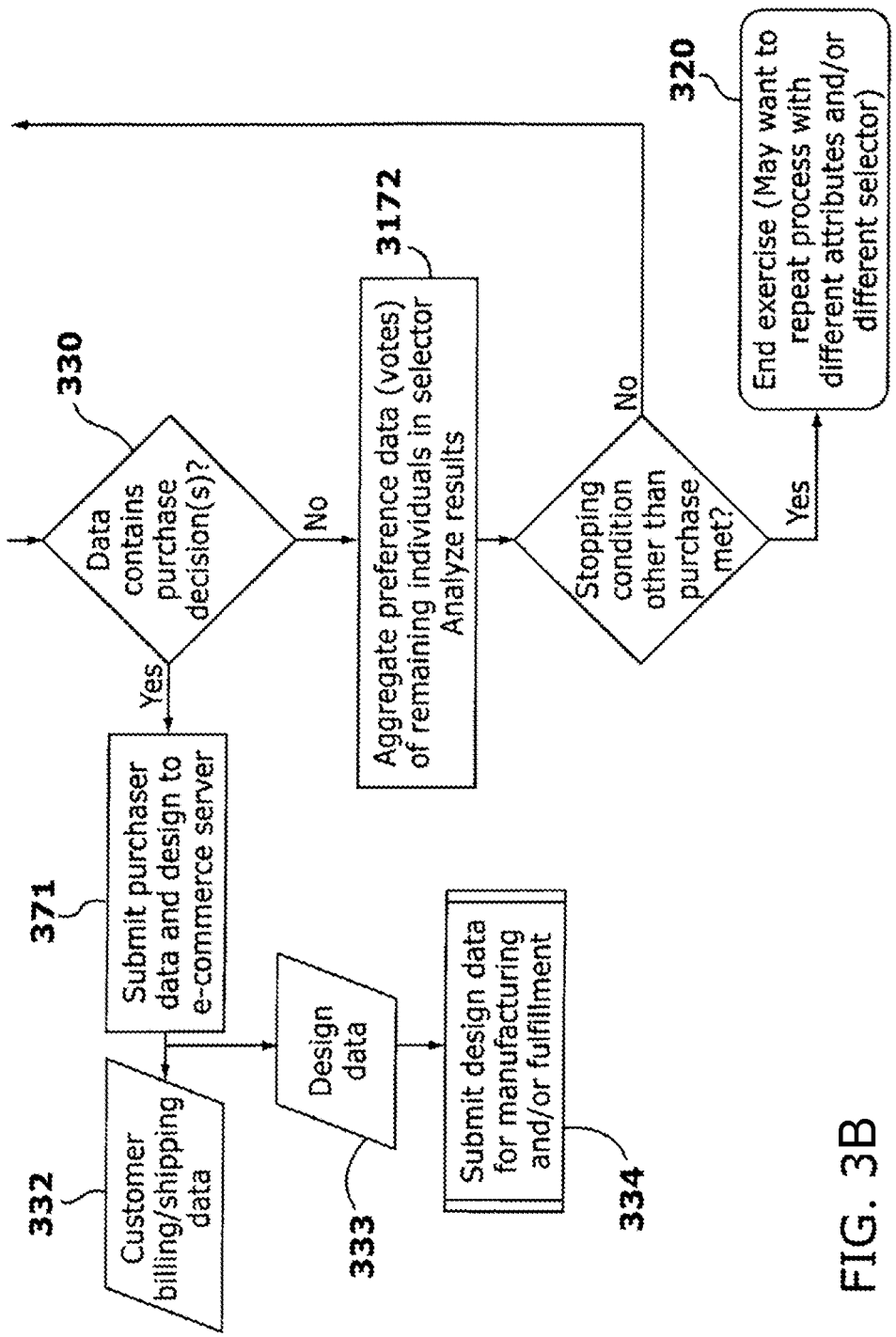

FIG. 3 represents the process flow for an example product design exercise with purchases as allowed outcomes. Blocks 310 through 316 as well as blocks 318 through 320 are the same as described previously for FIG. 2. In this embodiment, after preference data is collected from the selector in block 317I, it is checked for the presence of any purchase requests from any member of the selector for one of the product forms presented in 316. If the preference data includes such a purchase request or requests, the member of the selector, along with the information identifying the selected product form are directed to an e-commerce server where the needed shipping and billing information 332 is obtained from the individual(s). The information about the selected product form is sent forwarded in 333 to a fulfillment center, or to a manufacturing and fulfillment operation 334 that is outside the described process.

Figure 4:
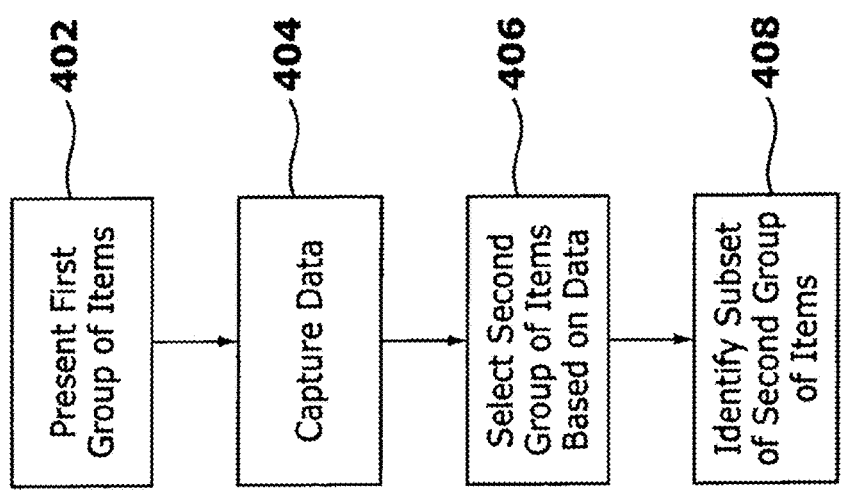
FIG. 4 is a flowchart showing an exemplary and non-limiting embodiment of the steps to be taken to identify market segments in an evolutionary design exercise.

Referring now to FIG. 4, and in brief overview, a method of dynamically identifying a set of items for which a plurality of selectors have a similar affinity includes the steps of: presenting for display to a group of selectors a first group of items (step 402); capturing data indicative of an item preference expressed by a least some of the group of selectors (step 404); selecting a second group of items responsive to the captured data (step 406); and identifying a subset of the second group of items having similarity among respective attributes (step 408).

Still referring to FIG. 4 and in more detail, a first group of items is presented for display to a group of selectors as described above in connection with step 216 of FIG. 2. For example, the items may be presented graphically, that is, a graphic representation such as a drawing or a photograph of the item is displayed to one or more selectors. In other embodiments, display of the items refers to the provision of a data file such as a computer-aided design (CAD) file or computer-aided manufacturing (CAM) file representing one or more items. In still other embodiments, items may be presented aurally. The items may be presented by the server computing nodes 30, 32, 34 or the client computing nodes 10, 20. Selection of items to be presented for display may be performed by the client nodes 10, 20, the server nodes 30, 32, 34, or some combination of client nodes and server nodes, including display adapted for and based on the display type, device capabilities, location, mobility, and the like of a selector's device.

Data indicative of item preferences is captured (step 404) as described above in connection with step 217 of FIG. 2. Item preferences may be captured at each client node 10, 20 in response to the display of items in step 202. There exist many ways in which a selector may express preference across k entities of the population. The selector may rank the entities according to preference, for example, where the favorite entity (or entities, in case of a tie) receives a score of k, the next favorite a score of k−1, and so on. Alternatively, the selector may rate each entity on a scale of zero to one hundred, or merely indicate which entities are acceptable and which unacceptable. The selector may react and be tracked by automated or human evaluation, such as of images or video of the selector, such as captured by an on-device camera. Regardless of the manner in which voter feedback is given, the feedback from all voters is subsequently appropriately scaled such that responses are directly comparable. Scaling may take into account demographic information, device type, session type and duration, selector location, selector attentiveness or other factors.

Scaling selector responses removes inconsistencies resulting from the case where the selector responds by rating entities on some scale (say, [0, 100]). If one selector is highly enthusiastic about all of the k entities, while another is very unenthusiastic, then the scales of the two sets of responses will not be comparable. As a result, the scores given by the enthusiastic selector will have more influence over the trajectory of the evolutionary system.

The scaling problem is solved through the use of normalization. Let $u_j^i$ be the "raw" response, or score, given by voter i to entity j. Vector $u_i$ is normalized to create vector $g_i$:

$$g_j^i = \frac{u_j^i}{\sum_{m=1}^{k} u_m^i}$$

where $$g_j^i \in [0, 1]$$

and $$\sum_j g_j^i = 1.0$$

The score of entity j is given by:

$$s_j = \sum_i g_j^i$$

Clearly, this step is unnecessary if voters respond by ranking entities, since ranking cannot produce a scaling problem. Where scaling problems do not exist, normalization may nonetheless be performed, since it does no harm to the voting data.

Assembling a second group of items responsive to the captured data (step 406) involves determining the "fitness" of the members of the population, selecting, based on fitness, a subset of the population for mating, selecting "mates" for them, and allowing the resulting parent pairs to "reproduce," as described above.

Figure 4A:
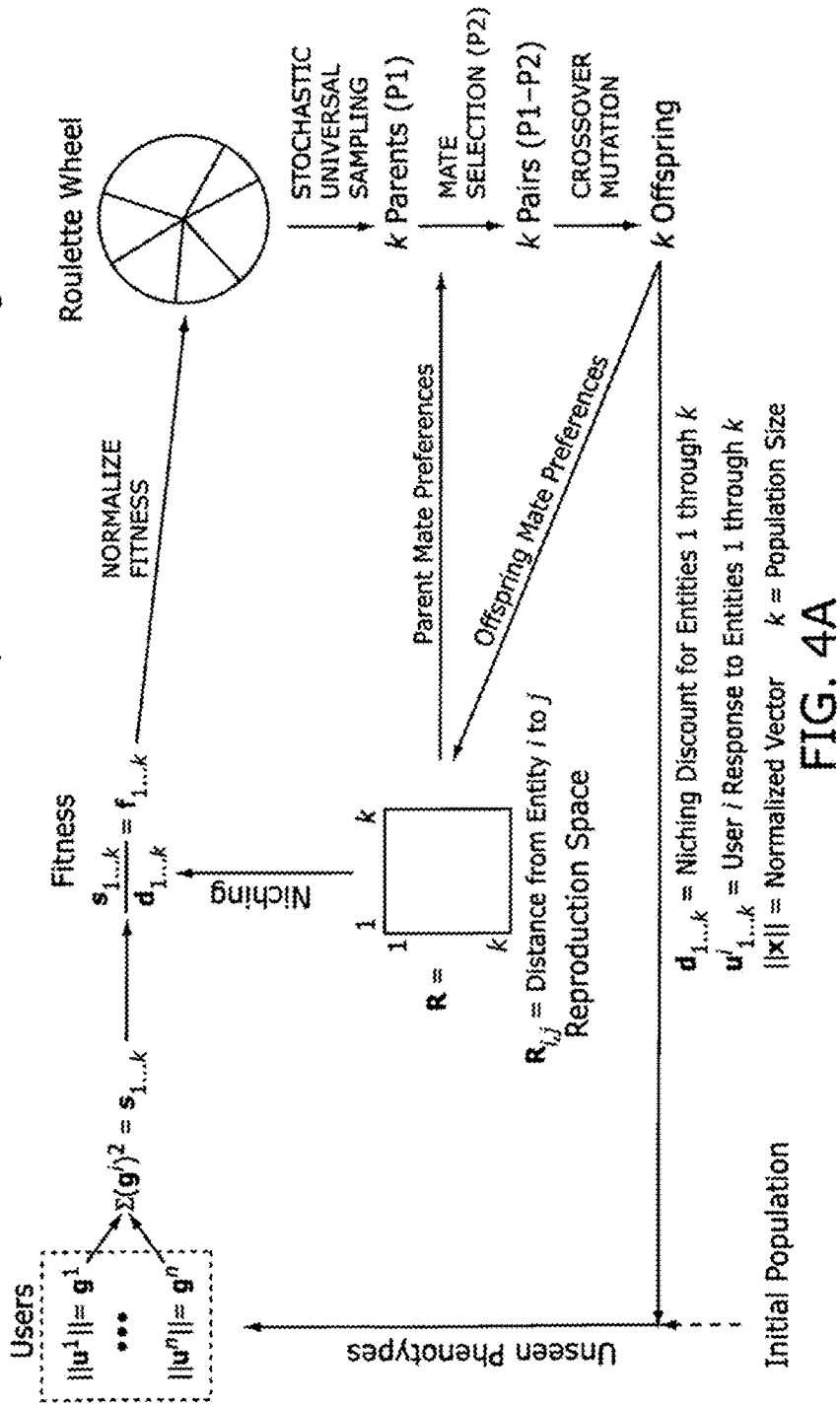
FIG. 4A is a flow diagram depicting an exemplary and non-limiting embodiment of evolutionary algorithm featuring speciation and niching.

As shown in FIG. 4A, the fitness $f_j$ of an entity j is defined to be its score ($s_j$ given above) divided by its niching discount. The niching discount, described in detail below, is a quantity that reflects the degree to which an entity adds redundancy to the population. By making the discount a positively correlated function of redundancy, we create a pressure to maintain genetic (and, presumably, phenotypic) diversity. Diversity maintenance is essential to successfully achieve and maintain distinct species, which can be viewed as separate preference profiles and/or market segments. Such species may correspond, for example, to different types of offerings, such as offerings corresponding to versions of a product that appeal to different target segments within a population (e.g., users in a geography or in a demographic segment), or offerings corresponding to the offerings of competitors, such as ones that take up share in a current market of interest.

The fitness vector, f, is normalized to obtain the probabilities with which each entity will be selected to parent an offspring. Such a scheme is referred to as fitness-proportionate selection. Typically, fitness-proportionate selection is implemented by a simple "roulette wheel" algorithm, where each entity has a slice of the roulette "pie" that is proportionate in size to its probability of being selected. The wheel is "spun" once each time we wish to select a parent. If the probability of an entity being selected is p, and we spin the wheel k times, then the expected number of times the entity will be selected is pk.

This roulette wheel implementation yields a multinomial distribution. Thus, if the number of spins is large, the observed behavior will closely match the expected behavior. But if the number of spins is small, the observed behavior has a high probability of deviating from expected behavior. For any finite number k of spins, there exists a non-zero probability that an entity having probability 0<p<1.0 of being selected will be selected anywhere from zero to k times.

Baker's Stochastic Universal Sampling is an alternative to the simple roulette wheel that is shown to have better statistical properties. The roulette wheel is divided as before, but rather than a single pointer that is spun k times, k equally-spaced pointers are spun only once. If an entity has probability p of being selected, then SUS guarantees that it will be selected no less than $\lfloor pk \rfloor$ times and no more than $\lceil pk \rceil$ times. In this embodiment, the "slices" on the roulette wheel are arranged randomly. For example, if the slices were arranged such that the smallest ones (where p<1/k) were next to each other, then no two neighbors could be simultaneously selected, as one of them would necessarily fall between a pair of the k equally-spaced pointers. (Other selection methods are described in the literature.)

For embodiments using recombinative variational operators (i.e., crossover), the creation of k offspring requires k pairs of parents. Rather than use fitness information to select the mates, mating preferences are used. Each entity that evolves has a genome composed of two distinct parts. One part of the genome determines the merit traits of an entity—the characteristics that are evaluated by human voters and ultimately lead to the entity's fitness. The other part of the genome determines the reproductive traits of an entity—the characteristics that express the entity's mating preferences. Reproductive traits do not affect an entity's fitness.

The precise structure of an entity's merit traits—the types and ranges of allele values—is domain dependent. In contrast, reproductive traits are defined to be real numbers and are not limited to fall into a particular range. All entities have the same number of reproductive traits—q real-valued genes. We interpret an entity's q reproductive traits as a point in q-dimensional Euclidean space. An entity prefers to mate with other entities that are closer to it in this q-dimensional "reproduction" space (R-space) than those that are farther.

Figure 4B:
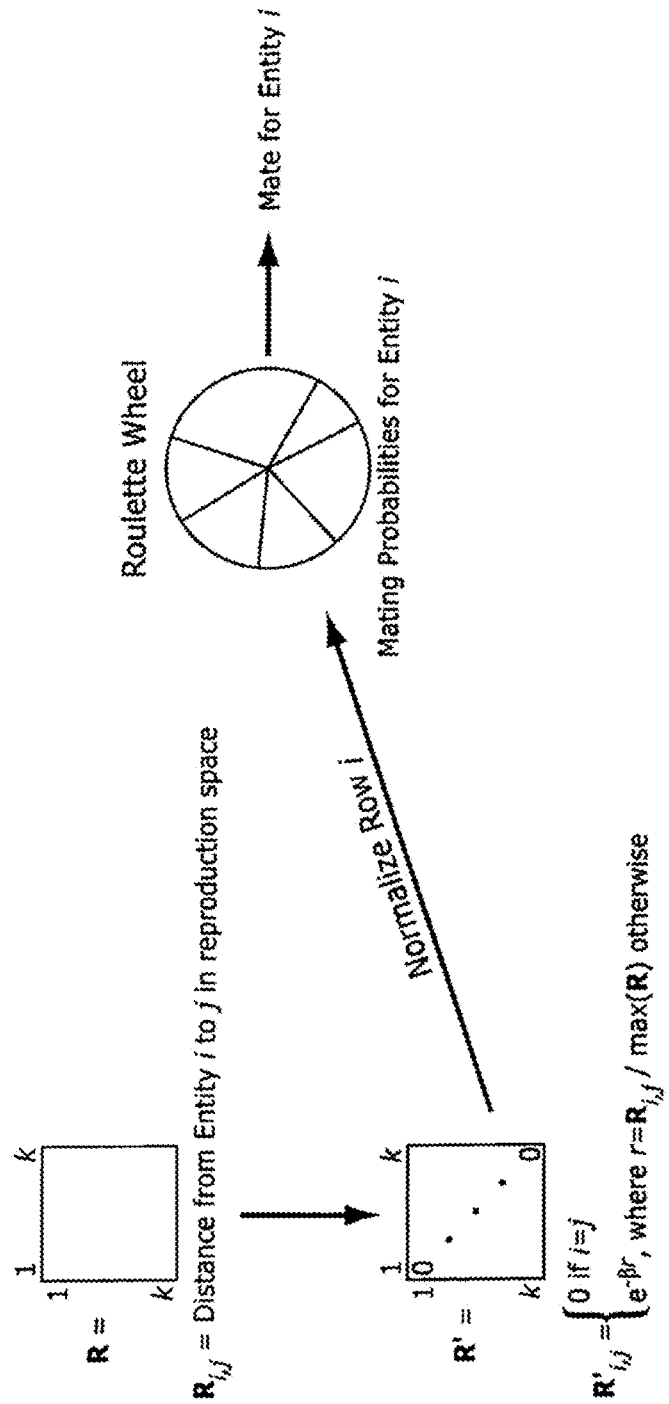
FIG. 4B is a flow diagram depicting an exemplary and non-limiting embodiment of the steps to be taken to compute mating probabilities.

FIG. 4B details how an entity picks a mate. A symmetric matrix R is computed where entry $R_{ij}$ is the Euclidean distance between entities i and j. Our next step in computing mating preference is to derive matrix R' from R, as defined below. The larger the value of entry $R'_{i,j}$, the more entity i is willing to mate with entity j. An entity may not mate with itself, so the diagonal is composed of zeros. Specifically, the willingness for entity i to mate with entity j is:

$$R'_{ij} = \begin{cases} 0 & \text{if } i = j \\ e^{-\beta r} & \text{otherwise} \end{cases}$$

where $$r = \frac{R_{ij}}{\max(R)}$$

Thus, willingness to mate drops exponentially with Euclidean distance. This drop may be scaled using a coefficient, β. If β=0, then the entities have no mating preferences and will mate randomly (though self-mating will still not occur.) If entity i has been selected because of its fitness, we pick a mate for it by normalizing row i of matrix R' to obtain probabilities of mate selection. These probabilities are used to construct a roulette wheel, which is spun once to select a desired mate. This process is repeated for every entity seeking a mate.

In this implementation, when two parent entities mate, a single offspring is produced. The recombination operators applied to merit traits are dependent upon the types and ranges of allele values allowed, and thus vary from domain to domain. The recombination operator applied to the parents' reproduction traits computes the arithmetic mean of their locations in reproduction space—the offspring is located midway between its parents in reproduction space. In one embodiment, after the offspring's location is computed, as small amount of Gaussian noise is added. In one particular embodiment, the added noise has a mean of zero and standard deviation of 2.0.

As discussed above, an entity's fitness is defined to be its score divided by a discount factor that correlates to the amount of redundancy the entity brings to the population. While genotypic similarity is generally easy to measure, it is not necessarily an accurate predictor of phenotypic similarity, which is the space in which diversity is sought. Further, phenotypic similarity can be very difficult or impossible to determine, depending upon the nature of the problem domain and genotype-phenotype mapping. In embodiments, respondents, rather than indicating preferences for certain representations or phenotypes, may provide feedback on the similarity of different representations, thus assisting in the process of grouping similar phenotypes. A species may be defined as a group of entities that is reproductively isolated from other groups of entities; entities within a species can reproduce with each other. The speciation process may be driven by user or selector feedback, which may occur through selection, or through direct feedback as to what phenotypes or representations appear similar to each other. If the collection of human aesthetic opinions clusters into two incompatible, or divergent groups of designs, such that no entity belonging to the first group tends to produce a viable (high fitness) offspring by mating with an entity belonging to the second group, then two species will form. Niching facilitates the speciation process and allows species to more stably persist. Therefore, we can compute the redundancy an entity brings to the population by measuring its proximity to other entities in reproduction space. If one species begins to overpopulate the population, its members will begin to receive larger discounts than entities that belong to other (smaller sized) species. (An alternative embodiment, described later, uses genotypic similarity as the basis for computing the fitness discount.)

FIG. 4C shows how the niching discount is computed. As with the mate selection procedure, we begin with a matrix R where entry $R_{i,j}$ is the Euclidean distance between entities i and j in reproduction space. From this matrix we derive matrix R' where entry $R'_{i,j}$ signifies the amount of discount generated with respect to entity j to be applied to entity i. Given our similarity metric, we use a triangular method of computing similarity-based discounts:

$$R'_{ij} = \max\left(\frac{-1}{s_{threshold}} \frac{R_{i,j}}{\max(R)} + 1, 0\right)$$

where $s_{threshold} \in [0,1]$ is a parameter that determines the minimal amount of similarity (or, maximal amount of dissimilarity) that will generate some amount of discount.

Larger values of $S_{threshold}$ decreases the minimal amount of similarity between entities i and j needed to generate a non-zero discount.

Figure 5:
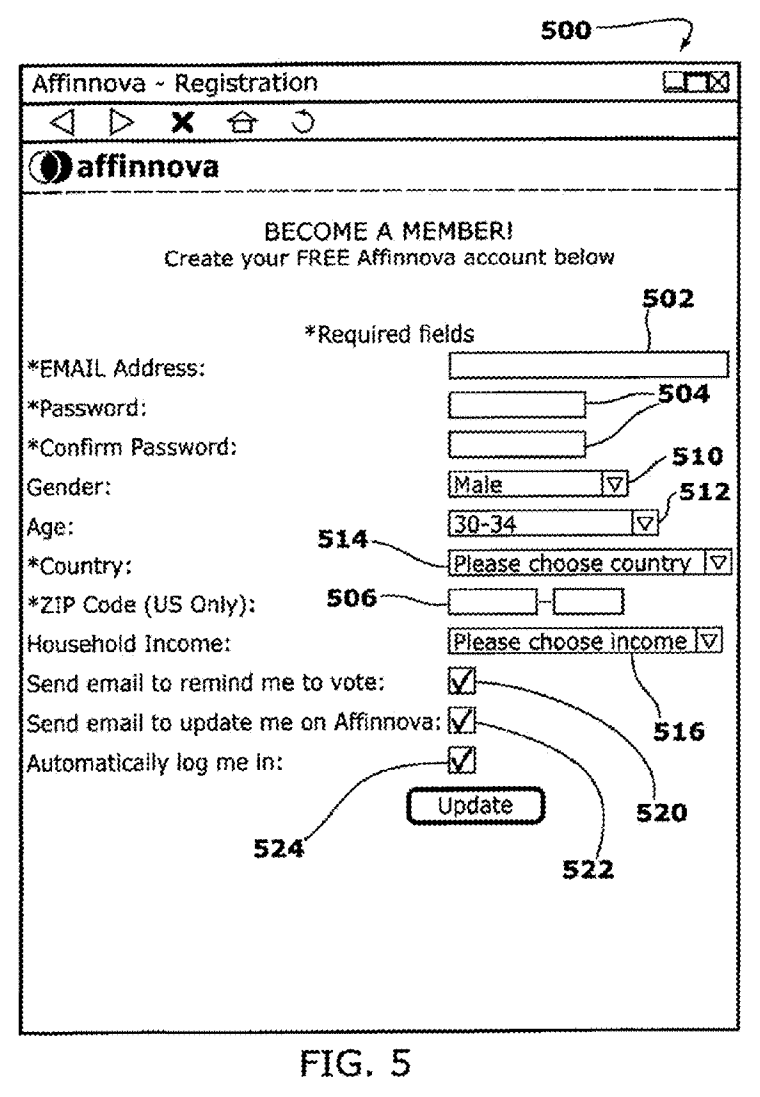

In another embodiment, participants are recruited or invited to participate in the design or market research exercise using any number of methods. These may include, but would not be limited to, postal or electronic mail invitations, telephone calls, print or electronic advertisements, SMS messages, recruitment through a an application store (such as by offering an exchange of free use of a mobile app for participation in an exercise), or word of mouth. These participants may have been selected based on any number of factors or none at all, such factors including, but not limited to, belonging to particular user groups, fan clubs, demographic groups, organizations, categories of device type, location, etc. A selected subgroup would be directed to a location, which could be a physical location where one or more computer terminals may be set up for the participants to interact with, to a Uniform Resource Locator Address (URL) over the internet, or to a mobile application (app) that is configured to enable representation, selection and feedback on similarity, as well as other capabilities indicated herein. In embodiments, a mobile app may embody a user interface, adapted for effective usage of animation, touch interface, high quality video and other engaging aspects of a mobile device operating system, user interface and platform, such as to enable presentation, selection, comment (by click and comment, touch, or the like), reaction (including as measured by camera), indication of similarity of species, feedback, and the like. Each participant may either be pre-registered or may be asked to sign up to participate in the exercise, through a dialogue page 500 similar to the one shown in FIG. 5. At that point, additional information may be collected about the participant, such as demographic or preference information, which may be used subsequently, either during the exercise to bias the choice presented to that particular participant, or in analyzing the data obtained during the exercise, and in presenting those results at the end of the exercise. In the embodiment shown in FIG. 5, a user's e-mail address, desired password, and zip code are entered in text entry boxes 502, 504, 506. Information about a user's location may also be determined based on the GPS location of a user's mobile device, whether the device is used for location or as a second device in a dual-device embodiment. Demographic information such as gender, age, country of origin and income range may be entered using pull-down minus 510, 512, 514, 516. Other information may be entered using check boxes 520, 522, 524, or, in a mobile environment, using pull down menus, sliders, or touch interfaces. Other graphical user interface techniques may be used, such as radio buttons and sliders.

Figure 6:
FIG. 6 is a screenshot depicting an exemplary and non-limiting embodiment of a dialogue screen.

After the preliminaries described in the previous paragraph, the participant is led to the exercise. In some cases, there may be more than one exercise in which the person has been invited to participate; in those cases, the participant is led to the different exercises, either in a controlled or prespecified fashion, or through a dialogue screen that allows the participant to select the exercise he or she wishes to work on. FIG. 6 shows such a dialogue. In the embodiment shown in FIG. 6, three design exercises are presented to the user: a polo shirt design exercise; a tee shirt design exercise, and a "demo" exercise.

Figure 7:
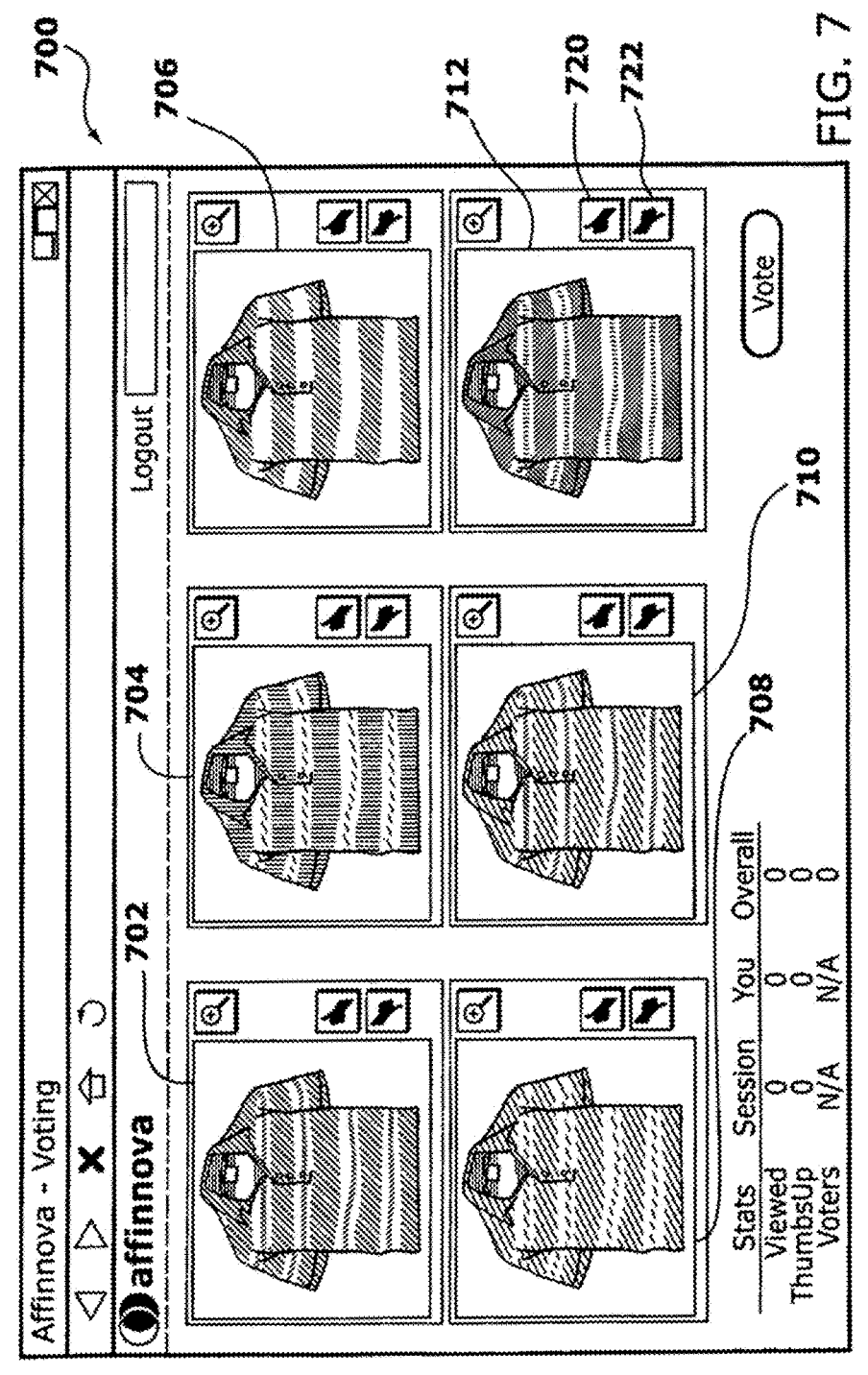
Figure 7A:
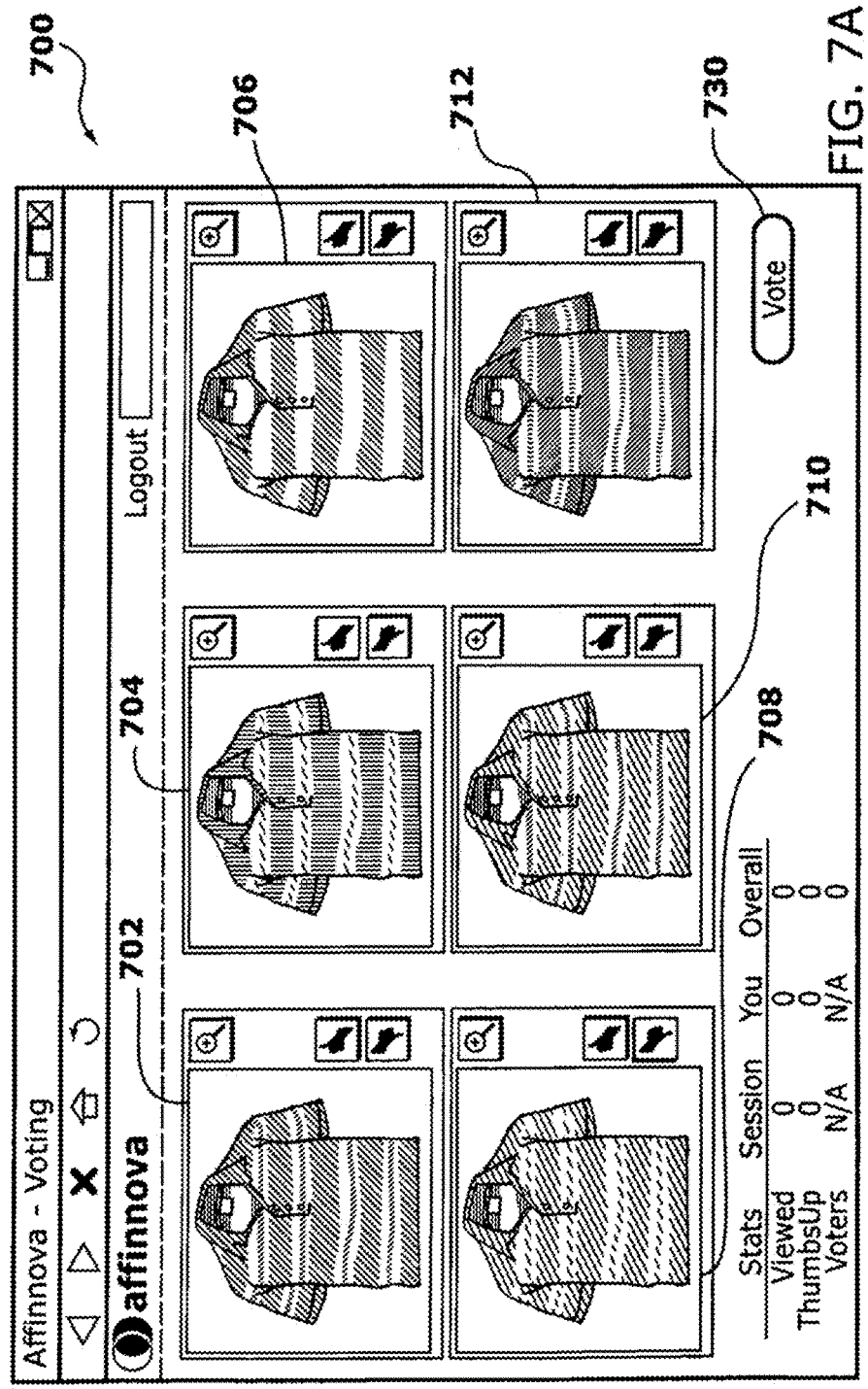
FIG. 7A is a screenshot depicting a particular preference assessment prior to vote submission according to an exemplary and non-limiting embodiment.

FIG. 7 shows a typical screen 700 that would be seen by a participant once he or she reaches the exercise proper. Such a screen presents the participant with a number of alternative choices for the design (or decision) object 702, 704, 706, 708, 710, 712. In this figure, the design object is a polo shirt, and the number of alternatives presented in this particular screen is six. Next to each design alternative, a "thumbs up" 720 button and a "thumbs down" 722 button are provided as means for the participant (also referred to as "voter") to express their respective like or dislike opinions about the design alternative in question. FIG. 7A shows the same screen after the participant has given the design alternative 704 a positive or like vote, and design alternative 708 a negative or dislike vote. In some embodiments, green and red borders may be used as a visual feedback mechanism to remind the participant of their assessment for the corresponding alternatives. In this figure, the remaining four design alternatives 702, 706, 710, 712 have received neither a positive nor a negative assessment, meaning that the participant is neutral or ambivalent towards them, neither liking nor disliking them. Once the participant has input his or her assessments, votes are submitted by clicking on the "Vote" button 730, which might involve touching a similar button in a smart phone or tablet interface. This results in a new set of design alternatives being presented for assessment to the participant, triggering a new iteration in the process described above.

Figure 7B:
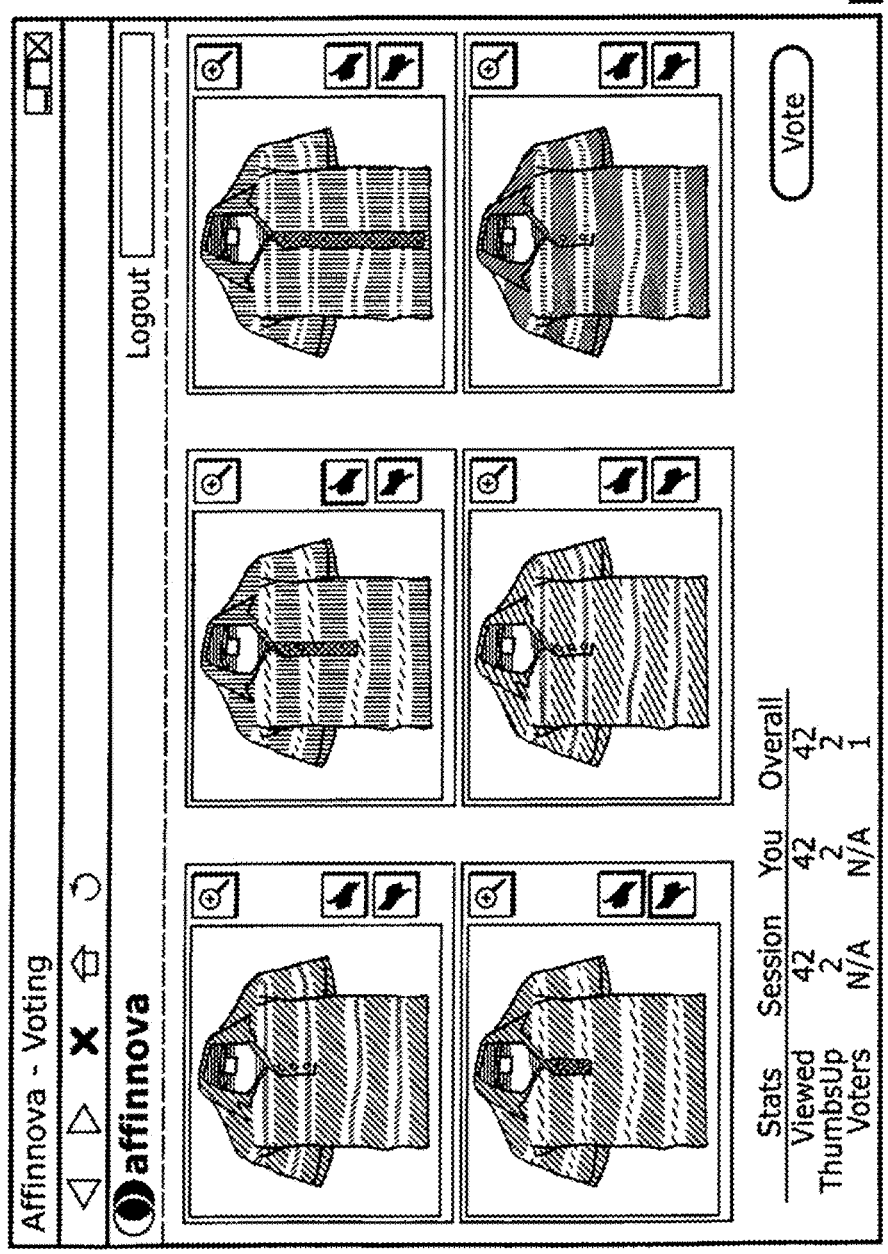
FIG. 7B is a screenshot depicting an exemplary and non-limiting embodiment of a second voting screen following vote submission.

FIG. 7B shows a screen containing one such set of derived alternative designs. In the particular implementation described in this section, the assessment or voting information provided by the participant at each iteration is used in a number of ways, which are described throughout this disclosure. Before that, however, the next paragraph describes the particular product featurization used in this example.

The design object used in this exercise represents one particular product featurization. A polo shirt could be featurized in an infinite number of ways. In this particular example, a simplified featurization is used, consisting of the following design elements: the color of the body of the shirt, the style and color of the collar, and in the case of a particular collar type—the tab collar—the length of the tab. Each of these design elements or design attributes can take on any of a set of values. In the case of the body color, there could be, for example twelve discrete colors. In the case of the collars, there could be, for example four possible styles, each of which has a fixed color. Finally, in the case of the tab collar, the tab length could take on any real numeric value within a specified range (which is chosen so that the tab length cannot exceed the length of the body of the shirt.) A specific design candidate corresponds to a particular triplet of body color, collar style, and collar tab length (although the latter value may go unused if not needed.)

Evolutionary Algorithm

In accordance with an exemplary and non-limiting embodiment, an evolutionary algorithm is used to evolve the designs towards ones that are more fit, that is, to generate designs that are more in line with the preferences expressed by the voters. The genotype used to represent each design candidate consists of variables or genes representing the three design attributes described in the previous paragraph, along with additional variables that are used to control the way in which different design candidates are selected for mating (an operation, described in more detail below, in which attributes from two "parent" designs are combined to generate a new "offspring" design.) The first set of genes, G1, G2, and G3, are referred to as the "merit" genes or variables (also, "feature" genes or "attribute" genes), since they are directly responsible for determining what a design candidate looks like, and therefore the degree of approval it gets. The second set of genes are hidden, in the sense that the way in which a design candidate looks to the participant is unaffected by the value of these genes. These genes are referred to as "reproduction" genes or variables, for the role they play in mating and mate selection, as described later. In this particular implementation, these genes are real-valued and they represent the orthogonal dimensions of a Euclidean space, referred to as the "reproduction" space. Table 1 below represents the genotype for the polo shirt exercise under discussion. In this case two reproduction genes, R1 and R2, are used.

TABLE 1

Schematic representation of genotype

| G1 (Collar Style) | G2 (Body Style) | G3 (Collar tab length) | R1 (Reproduction variable 1) | R2 (Reproduction variable 2) |
|---|---|---|---|---|

The evolutionary algorithm is a population-based search and optimization algorithm. In the present embodiment, the algorithm works with a population of designs of size N, where N typically ranges from 50 to several hundred. At the start of the exercise, this population is seeded at random, that is, by selecting allele values at random for each gene from the allowed range for that gene. Alternatively, the current embodiment allows for deterministic seeding, in order to reflect a particular desired starting population.

When a participant submits a vote after assessing a first screen of candidates, the information is used to generate new designs and to populate the subsequent screen that is presented to him or her, based on the following procedure. Every design candidate in the first screen that received a thumbs-up vote is immediately selected for breeding; in other words, it selected to be a parent, call it P1. Next, a suitable mate is selected for it from among the larger population of designs. That mate becomes parent P2. If less than half of the displayed candidates receive thumbs ups, the current implementation can be, and usually is, set so that each of the selected candidates is bred twice. In this particular embodiment, mate selection is done stochastically based on the Euclidean distance in reproduction space between P1 and all other members of the population at that point in time. More specifically, the probability that any of the N−1 members of the population (or "entities") will be selected as a mate for P1 is computed based on the following formula:

$$P(j \mid i) = \frac{f(d_{ij})}{\sum_{j \neq i} f(d_{ij})}$$

where Pr(j|i) is the probability that entity j will be selected as a mate for entity i (with Pr(i|i)=0,) and where $f(d_{ij})$ is a function of the Euclidean distance between entities j and i in the reproduction space, i.e.:

$$d_{ij} = \sqrt{(R1_i - R1_j)^2 + (R2_i - R2_j)^2}$$

The particular function used in this case decreases monotonically with distance; specifically (Eq. 3):

$$f(d_{ij}) = e^{-\beta(d_{ij}/d_{max})}$$

where β is a real valued parameter that determines the strength of proximity bias in mating, and $d_{max}$ is the maximum distance in reproduction space between any two entities at that point in time:

$$d_{max} = \MAX_{i,j}(d_{ij})$$

The value of β is in the range [0, ∞], where a value of zero results in no mating bias and larger values give an increasingly more restrictive mating bias.

Another version of function $f(D_{ij})$, also used in this embodiment, is given by (Eq. 5):

$$f(d_{ij}) = \frac{1}{\sqrt{\gamma \pi}} e^{-d_{ij}^2/\gamma}$$

In this case, γ is a real valued parameter that determines the strength of distance bias in mating. The value of γ is in the range (0, ∞), where smaller numbers give an increasingly more restrictive mating bias.

The distance-weighted probabilities thus computed are used to load a "roulette wheel", or are used in a Stochastic Universal Sampling scheme. Once a mate is selected for P1, that entity becomes the second parent, P2, for the offspring about to be created. This is done through a crossover operation, optionally followed by a mutation operation.

In one alternative method for mate selection a genetic algorithm is used in which the bit string representation includes a set of functional genes (which correspond to our feature genes) and two other sets of genes that control mating (which correspond to our reproduction genes). One set of mating genes is called a mating template and the other set is called a tag. Both sets must have the same number of genes. The template and tag genes evolve along side the functional genes and are subject to crossover and mutation. A template gene can take on one of three values: 0, 1, or a wild-card symbol. A tag gene will be either a 0 or 1. Two individuals are allowed to mate if the template of one matches the tag of the other. If a 0 or 1 is specified for a particular template gene of one individual, then the same value must appear in the corresponding tag gene of the other individual. If the wild card appears in a particular template gene, then any value of the corresponding tag gene will match. One mating scheme requires that the template of one individual match the tag of the other; an alternative scheme requires that each individual's template match the tag of the other for mating to occur. In either case, if no matches are found, partial matches may be allowed.

An Alternative to R-Space

In accordance with an alternative and non-limiting embodiment, an assortative mating mechanism determines mate selection based upon genealogical distance, as opposed to the R-space distance scheme described above. Specifically, the likelihood of two individuals $P_i$ and $P_j$ mating is related to the length of the shortest path that connects them in the "family tree." Individuals in the initial population are considered siblings, that is, we assume the existence of a "primary" parent that creates the initial population. The family tree is represented as a graph, where vertices correspond to individuals, and edges represent parent/child relations. Thus, an edge will exist between two individuals if and only if one of them is a parent of the other. Each individual records the identities of its parents, of which there are exactly two, so the graph is easily constructed. The only exception to this rule applies to individuals in the initial population, which all have an edge to a single parent vertex (the "primary" parent) that is inserted into the graph. The distance $d_{ij}$ between two individuals $P_i$ and $P_j$ (neither of which are the "primary" vertex) is the length of the shortest path between them on the graph. In the current implementation, the length of a path is measured by the number of distinct edges (or parent-child relationships) traversed to go from one individual to the other individual (as opposed to the Euclidian distance which is used in the R-space implementation described earlier.) In embodiments the ancestry of a particular set of individuals may be attributed to a parent that is a competitor product or that expresses a competitor gene.

The probability of individual $P_j$ being selected as a mate for $P_i$ is:

$$p_{j|i} = \frac{f(d_{ij})}{\sum_j f(d_{ij})} \quad (6)$$

where:

$$f(d_{ij}) = \max(d_{max} - d_{ij}, v_{min}) \quad (7)$$

and where $d_{ij}$ is the length of the shortest path connecting vertices $p_i$ and $p_j$, $d_{max}$ is the maximum over all $d_{ij}$ (also known as the diameter of the graph), and $v_{min}$ (a parameter $<d_{max}$) is the minimal value that function $f$ will return, to provide a non-zero minimum probability of mating for individual designs that are very far from each other.

Over time, the weaker branches of the family tree become extinct, leaving other branches that may possibly be distantly related. If so, then the different branches are reproductively isolated and therefore distinct species. The branches that go extinct are genetic combinations that are poor relative to the genetic combinations that survive. Thus, this method provides another approach to assortative mating.

Crossover operations are represented schematically below:

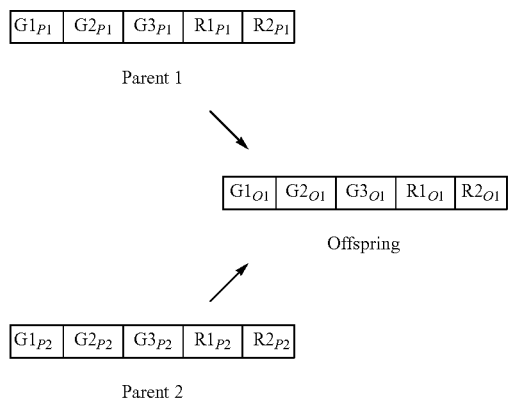

Parent 1

Offspring

Parent 2

In the implementation described here, the parent genomes are crossed on a gene-by-gene basis. In other words, the genes for the body style, G1, from parent P1 and parent P2 are "combined" or "crossed" by themselves, followed by the G2 genes representing the collar style, then the G3 genes representing tab length. The reproduction space genes, R1 and R2 are also crossed, again individually. The particular crossover operation used depends on the nature of the gene in question. For example, in the case of gene G1, which represents a categorical variable, the allele value from one of the parents is selected at random. Similarly for gene G2. This is shown schematically below:

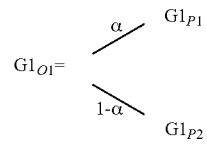

Where $\alpha$ is a random variable picked from a uniform distribution:

$$\alpha \sim U[0,1]$$

Gene G3 represents an integer value, which makes it possible to use different crossover operators, as an alternative to the "random pick from one parent" scheme. One possibility is to compute interpolated and extrapolated values using the two values from the parents, and then to select one of these two possibilities at random. The process is described below. First, a Bernoulli trial (a "coin flip") is performed to decide whether to interpolate or extrapolate a value for the offspring gene, from the two values of parent genes.

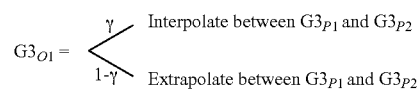

Where $\gamma$ is either a deterministic real value between 0 and 1, or a randomly generated variable within that range, for example one from a uniform distribution:

$$\gamma \in (0,1)$$

or $$\gamma \sim U[0,1]$$

If the decision is interpolation, a formula such as the one below is used:

$$G3_{O1} = \text{Round}(\mu \cdot G3_{P1} + (1-\mu) \cdot G3_{P2})$$

where $\mu$ is a real value between 0 and 1, either selected deterministically or drawn at random, at the beginning of an exercise, or at every breeding. Alternatively, different deterministic values or different distributions (in the case of variables drawn randomly) could be used at different points in the exercise. Since G3 is an integer gene, the value obtained by interpolation is rounded to the nearest integer.

If extrapolation is selected instead of interpolation, one of parent values is picked to determine the direction of such extrapolation; this is done at random. If P1's is picked, then a formula like the following one can be used:

$$G3_{O1} = \text{Round}(v \cdot ((1+\mu) \cdot G3_{P1} - \mu \cdot G3_{P2}))$$

where v is a (possibly random) real valued parameter, typically less than 1.0, chosen to scale down the size of the extrapolation step taken. An additional step not reflected in the formula above involves checking that the value thus computed does not exceed the allowable range for gene G3, and setting it equal to that limit if it does.

If P2 is picked as the extrapolation direction, then the following can be used:

$$G3_{O1} = \text{Round}(v \cdot ((1+\mu) \cdot G3_{P2} - \mu \cdot G3_{P1}))$$

The reproduction space genes, R1 and R2, being real-valued, can be treated similarly, except that the rounding operation is not needed. In the present implementation, a modified averaging operation is used, as follows:

$$R1_{O1} = \frac{1}{2} \cdot (R1_{P1} + R1_{P2}) + \varepsilon$$

where $\varepsilon$ is a Gaussian noise:

$$\varepsilon \sim N(0,2)$$

The calculation of $R2_{O2}$ proceeds similarly.

Many other schemes are within the knowledge of those of ordinary skill in the art.

Mutation

In addition to the crossover operation, or concurrent with it, a mutation operation is applied, to introduce occasional random variation in the design candidates that are generated. In the current implementation, this is done on a gene-by-gene basis again. For each gene, a determination is made, either before of following the crossover operation, as to whether a mutation is going to be applied. This is based on Bernoulli trial with a relatively low probability of success, around 0.01 typically. In the case of categorical genes, the mutation involves selecting, at random, one of the allowable allele values, typically a value that is different from those of the two parents. In the case of integer and real-valued genes, a Gaussian noise is added to the gene value obtained after the crossover operation is complete. Again, a check is performed to make sure that the mutated value is within the allowable range; if it falls outside that range, it is set equal to the upper or lower limit, as appropriate. Another case, not used in this example (the polo shirt) is where a gene is encoded as a binary bit or string. An example would be a design feature such as a logo or rings around the sleeves, which are turned on or off, depending on whether that bit is enabled or not. In that case, a mutation would simply involve a bit flip.

Replacement/Removal Policies

Once one or more new design candidates (the offsprings) are created, they are introduced into the population. In order to do that, a corresponding number of current members of the population must be selected for replacement. Various strategies are employed for that purpose, ranging from purely random selection, to relatively intricate schemes based on fitness (or lack thereof), redundancy and/or specified requirements for population membership (e.g., related to maintaining enough members that can be evaluated by mobile users on their devices, or maintaining species that represent competitor products or contain competitor genes). (Various ways used to measure redundancy and diversity are described later.) In the simple case, a population member is chosen at random: a random integer i uniformly distributed between 1 and N (the size of the population of design candidates) is generated, and the $i^{th}$ member of the population is removed and replaced by the offspring. This is repeated as many times as the number of offsprings created by a mating event. Another option in the current implementation is to bias the removal by fitness, or rather, lack of fitness. In that case, a misfitness score is maintained for each member of the population, and that score is either used deterministically to remove the member(s) with the highest misfitness score(s), or stochastically by loading a "roulette wheel" with slices proportional to these misfitness scores. A very simple algorithm for computing misfitness scores, one which only relies on "thumbs-up" votes, is the following. First, any members of the population of N designs that have not been assessed yet, and that therefore have received no votes, are set aside and are not candidates for removal. This is to avoid the premature loss of design candidates, unless absolutely needed (at which point we pick uniformly at random). Next, for each of the remaining members of the population, the rate of "thumbs-ups" is computed as the ratio of "thumbs-up" votes received by that entity divided by the total number of votes received by it (i.e., the sum of "thumbs-up", "thumbs-down", and "neutral" votes.) Next, the average rate of "thumbs-up" for all members of the population is computed, and the population of designs is divided into two groups, those that have a "thumbs-up" rate greater then average, and those that have a rate equal to or lower than the average rate. Members of the latter group are selected at random for removal, as needed.

A more discriminating removal scheme that uses all three types of votes—thumbs-up, neutral, and thumbs-down—is sometimes used in the current implementation. In that case, the misfitness $m_i$ for the $i^{th}$ member of the population is computed as a weighted sum of that member's thumbs-up, neutral, and thumbs-down rates, as follows:

$$m_i = w^{down} \cdot R_i^{down} + w^{neutral} \cdot R_i^{neutral} + w^{up} \cdot R_i^{up}$$

where the $w^{type}$ terms are the weights for the particular type of vote, and $R_i^{type}$ terms are the vote rates of the given type for the $i^{th}$ member, with $w^{down} > 0$, $w^{up} < 0$ and $w^{neutral}$ generally positive. For example:

$$m_i = 3 \cdot R_i^{down} + 1 \cdot R_i^{neutral} - 4 \cdot R_i^{up}$$

Again, design candidates that have not been seen by any of the participants are set aside, to prevent their premature elimination (unless absolutely necessary, for example in some cases early on in an exercise.) Similarly, candidates that represent competitor products, such as ones that are in fact successful in the marketplace, may also be set side or prohibited from removal, to further consider reactions to them after a set of new candidate products begins to emerge.

Another variation on the removal policy modifies the contribution to the misfitness rating of similar votes, based on whether they were all cast by the same participant or by different participants. The idea behind this version is to penalize a design candidate more if it disliked by a number of different participants, that is, if different participants gave it thumbs-down for example, as compared to when it gets the same number of thumbs-down from only one participant. In this version, the individual votes for each entity are tracked, and the misfitness is computed based on declining weighting function or schedule for each participant's votes, as in the equation that follows:

$$m_i = \frac{1}{V_i} \left[ w^{down} \cdot \sum_j \sum_{n=1}^{V_{i,j}^{down}} e^{-\gamma(n-1)} + w^{neutral} \cdot \sum_j \sum_{n=1}^{V_{i,j}^{neutral}} e^{-\gamma(n-1)} + w^{up} \cdot \sum_j \sum_{n=1}^{V_{i,j}^{up}} e^{-\gamma(N-1)} \right]$$

where $m_i$ is the misfitness score of entity i, $V_i$ is the total number of votes received up to that point by entity i, $V_{i,j}^{type}$ is the number of votes of the given type cast by voter j for element i, $$\sum_j$$

represents the summation over all voters j, and γ is a real parameter that determines the steepness of an exponentially decreasing weighting function that reduces the impact of additional votes cast by the same participant.

Another class of removal schemes takes into account how redundant a particular member of the population is, in addition to its misfitness. The idea there is the following: given two entities that are equally unfit, it is preferable to remove the one that is genotypically similar to many other members of the population, in order to minimize the loss of genotypic diversity in the population. The redundancy computation can be based either on the reproduction genes, the feature genes, or both. These computations are described in the next section. Given a redundancy value $R(P_i)$ for a member of the population $P_i$, its adjusted misfitness value $m'_i$ is computed, as:

$$m'_i = R(P_i) \cdot m_i$$

Attribute Level Feedback

In a further exemplary embodiment, techniques are provided such that the participant has a more engaging experience through increased control over the evolutionary algorithm, while maintaining the efficiency and effectiveness of the search and optimization process and the integrity of its outcome. In this case, a participating respondent is presented with two product alternatives in a choice page, and asked to choose the preferred alternative. Having made his choice (referred to from now on as C1 for Choice 1, with no loss of generality, with the second alternative referred to as C2), the respondent is then asked whether he sees an attribute variant in the alternative that was not chosen, which he would prefer to the corresponding one in the chosen alternative. The participant is then given the ability to identify, using a pointing device such as a computer mouse, or by touching a touch screen interface, at least one such alternate attribute. The alternate attribute is then used to modify or bias the behavior of one or more of the operators described in the previous sections. This method is known as Respondent-Directed Breeding or RDB. In alternative embodiments, breeding may be directed by another user of the system, such as a person responsible for conducting a market study or for developing a product design. In such embodiments, the techniques described below may allow user-directed breeding that results in promotion of, for example, particular features, or the features of particular offerings, such as certain selected offerings. Thus, directed breeding, described below in connection with RDB, may, in alternative embodiments, involve directed breeding by other users, such as the creators or managers of a study.

In one version of RDB, the alternate attribute information is used to select a breeding mate for the chosen alternative C1, such that said mate carries the preferred variant from C2, thus increasing the chances that an offspring of that pairing will carry the preferred attribute variant.

In another version of RDB, the information about the preferred attribute variant from the non-chosen alternative (C2) is used in a "repair" operation carried out at the end of the breeding operations (after crossover and mutation), whereby the attribute in question in the offspring is mutated in a controlled fashion to the alternate attribute from C2. Since the offspring of the breeding operation are likely to be presented to the respondent in a subsequent choice set, this results in an experience that feels more responsive to his choices and feedback, and gives him a sense of greater control over the evolution, and of contributing more directly to the creation or evolution of the preferred product.

In order to balance the competing needs in the GA for exploration more broadly of the search space, and exploitation of the available fitness information, the controlled mutation or repair operation described above could be carried out probabilistically, with a probability of being carried out ranging from 0.3 to 1.0, with a value of 0.6 or greater being used typically.

In a variation on the above embodiment, the respondent is given the opportunity to indicate more than one attribute, the variants of which as instantiated in C2 are preferred to those present in C1. In this version the controlled mutation based repair operation described above is carried out on all the attributes involved, or only an a subset of said attributes, said subset having been selected either at random, or based on an attribute importance, either stated or revealed, or another strategy.

In yet another variation on this embodiment, the choice set contains more than two alternatives, possibly 3 or 4. Again, the respondent is asked to choose the preferred product alternative from among the 3 or 4 alternatives presented, and then to indicate more preferred attribute variants present in one or more of the non-chosen alternatives. The respondent is able to select the more preferred attribute variants in the non-chosen alternatives C1 to C4, by identifying them using the computer pointing device or touch screen. In order to facilitate that process, the elements that differ between C1 and the C2-C 4 are highlighted for easy identification. As described earlier, the additional attribute-level preference information can be used either for mate selection, or in a post-breeding controlled mutation or repair operation. In case of redundant attribute selections from C2-C4, e.g., if the respondent identifies more than one variant for a given attribute, from more than one non-chosen product alternative, the decision regarding which variant to use in the mate selection or post-breeding controlled mutation or repair phase could be made at random, or based on information available to that point about previous revealed preferences regarding one variant or another, either on the part of the respondent in question, or based on all respondents who have participated to-date, or based on a subset of respondents identified as having similar preferences for that attribute variant. Where previously revealed preferences are estimated based on previous choices made by the participant(s), using statistical techniques that would be well-understood by practitioners in the field of conjoint analysis and choice modeling.

In yet another version of RDB, the participating respondent having made a choice from among the alternative product forms presented to him is asked which particular attribute or attributes he really cares for or which contributed the most to his initial selection of C1. To help the respondent provide this feedback, the graphical user interface may provide for highlighting those attributes differing among the various product forms presented in the choice set, as well as the means for selecting one of the highlighted attributes on the selected choice C1. This additional, attribute-level, preference information may be used in the GA, or more generally an EA, to modify or bias one or more operations. In one version of the GA, the information is used to bias the mate selection process, whereby the mate selected for breeding with C1 would be chosen so that it carries the same attribute as C1, thus resulting in an offspring with a maximum likelihood of having the same attribute. In a different version of the algorithm, a post-breeding controlled mutation or repair operation would be carried out after the crossover and mutation operations, to give the offspring the attribute carried by C1, in case the breeding operation did not result in such offspring. The two techniques (as well as others) could also be combined. Although that may seem redundant, it is not: by selecting a high-fitness mate that carries the attribute variant of interest, the likelihood is increased this mate will also carry other attributes that perform well in combination with the one of interest. This will increase the likelihood that interaction effects between attributes, which contribute to high fitness, will be increasingly reflected in the GA population makeup. The controlled mutation or repair operation, in that case, would be an additional guarantee against the vagaries of crossover and mutation, and it may be carried out only probabilistically, to balance the breadth and depth of the search process.

In a variation on the above version of RDB, the respondent is asked instead to indicate, an attribute (or attributes) associated with C1 hat he does not care for, or which did not contribute to his choice. This additional information would then be used to select a mate for C1 that differs from it on that dimension; i.e., one that carries a different variant for the attribute in question. Again, choice-modeling information may be additionally used in this step, to identify those variants of the attribute in question that seem most preferred by this and/or other respondents. A variation on the above embodiment would involve a controlled mutation or repair at the end of the breeding operation, to change the attribute in question to a different variant in case the offspring ended up with the original, non-preferred attribute from C1.

As indicated earlier, RDB or other directed breeding techniques have the tendency to increase the degree of exploitation of specific respondent feedback in the GA, to the detriment of broader, more comprehensive exploration of the search space. To compensate for this tendency, exemplary embodiments rely on a number of mechanisms. Some of these are known to practitioners well versed in the art of evolutionary computation and genetic algorithms. These include using higher mutation rates and lower repair probabilities, as well as changing these and other GA parameters over the duration of the optimization process.

Other compensating mechanisms are specific to this disclosure. One compensating approach involves controlling when and for how long to enable this attribute-level preference feedback functionality in the system, both across the overall optimization process (such as including directed breeding by a marketing manager, for example), and across individual respondents' sessions. In one version of the methods and systems disclosed herein, this functionality is not enabled until a certain number of respondents have gone through the process, or until a certain number of GA population turnovers (e.g., generational replacements) have occurred, or until a certain degree of convergence has been achieved, or until a certain level of average fitness has been reached in the GA population or subset thereof.

In another compensating approach, attribute-level preference feedback is only enabled for a given respondent after said respondent has completed a number of choice sets, or used only with a subset of the total choice sets scheduled for that respondent. For example, if a participant is scheduled to be presented with 15 choice sets, this functionality would be enabled only for the $7^{th}$ (or $10^{th}$) and subsequent choice sets. This last approach has the additional benefit of ensuring that the respondent has been exposed to a greater range of alternatives from the available space of alternatives, and the different attribute variants available, and is therefore in a better position to make better-informed attribute-level preference decisions.

As an alternative, the functionality may also be enabled for random periods across a respondent's session or across the overall optimization process.

The set of available alternatives presented to the respondent may be the entire set of attribute variants available in the search space, but preferably a subset thereof. That subset is selected based on a number of different rules, including: a) avoiding presenting attribute variants that would result in an illegal genome if one of these variants were to be substituted for the current one in C1; b) eliminating those variants that have performed poorly to that point in the optimization, assuming enough data is available to make such an assessment; b c) finally, if necessary, trimming the set of remaining variants at random, in order not to overwhelm the respondent with too many options (3 to 10 options is generally an appropriate range, depending on the nature of these variants—for example single words for brand names, or expandable graphical images for product imagery or logos, versus longer text paragraphs for benefit statements.)

Attribute-level preference information can also be used to modify R-space values for the product alternatives being investigated. In this case, by changing the R-space values, the breeding process is modified so that the likelihood of certain matings is increased and the chance that the preferred attributes will be passed on to offspring is increased.

Other exemplary embodiments operate to give the participating respondents an even greater sense of "co-creation", that is, a sense of actively being involved in specifying the attribute variants that will appear in the outcome of the search and optimization process. The key difference between this set of embodiments and the ones described earlier, lies in that respondents are provided the ability to provide attribute-level preference input not only from among those attribute variants present as alternatives in the choice set, but from a list of attribute variants available in the broader search space. This method is known as Respondent-Directed Mutation (RDM). As with directed breeding, directed mutation may include mutation directed by non-respondents, such as product design and marketing professionals, and embodiments described herein should be understood to include such alternatives.

In one version of RDM, the respondent is presented, as usual, with a set of alternative product forms and asked to choose a preferred one. After making a choice of C1, the respondent is asked whether there is an attribute in this chosen product alternative which he does not particularly care for and would change if given the opportunity. If the participant answers in the affirmative, he is guided to select the attribute in question, using the pointing device. At that point, a list of available alternatives is presented, such as through a pop-up menu, and the participant is given the opportunity to select a different variant for the attribute in question. This additional preference information is then used in the GA in the different ways already described earlier, that is, either to bias the mate selection operation, or to perform a post-breeding controlled mutation or repair operation, or both.

As with RDB the set of available alternatives presented to the respondent in RDM may be the entire set of attribute variants available in the search space, but preferably a subset thereof. That subset is selected based on a number of different rules, including: a) avoiding presenting attribute variants that would result in an illegal genome if one of these variants were to be substituted for the current one in C1; b) eliminating those variants that have performed poorly to that point in the optimization, assuming enough data is available to make such an assessment; c) finally, if necessary, trimming the set of remaining variants at random, in order not to overwhelm the respondent with too many options (3 to 10 options is generally an appropriate range, depending on the nature of these variants—for example single words for brand names, or expandable graphical images for product imagery or logos, versus longer text paragraphs for benefit statements.)

With RDB and RDM, it can be important to provide the respondent with visual feedback of the results so the respondent feels involved with the selection of the attributes that are included in the set of alternative product forms. This can include visual representations of the alternative product forms as originally presented and after RDB or RDM. An option for the respondent to change the input after being presented with the visual representation can also be provided if the respondent doesn't care for the result.

Diversity Measurement

The next section describes various ways of measuring redundancy, or its opposite, diversity. Diversity measurement techniques are applied to both feature genes as well as reproduction genes. We use measures of diversity to dynamically control various parameters of the evolutionary algorithm, such as the mutation rate (mutation probability), as well as various strategies used in the system, such as the removal (or replacement) strategy and the strategies used to populate a participant's voting window (which are described later.)

Redundancy

Diversity in the evolving population of N designs may be measured using a metric of genotypic (or phenotypic) similarity between pairs of evolving designs ("individuals"). A pair-wise similarity metric $S(P_i, P_j)$ is defined, which returns a value between 0 and 1, where 1 signifies that $P_i$ and $P_j$ are genotypically (or, alternatively, phenotypically) identical. This metric may be used to compute the redundancy of each individual in the evolving population with respect to the population as a whole, as follows:

$$R(P_i) = \sum_{j=1}^{N} S(P_i, P_j)$$

An individual with a high redundancy value is relatively common, in the sense that there exist many other individuals in the population that are similar to it. These redundancy values are used to help maintain diversity by biasing removal policies towards more redundant individuals, as explained in more detail below. Redundancy values are also used to provide a graphical visualization of genetic (or phenotypic) diversity.

Two similarity functions are used in the current implementation. One is based on the feature genes, the other on the reproduction genes. In the case of the polo shirt, the first one uses the first three genes of the genotype. (The first two are categorical genes and the third an integer-valued gene.) We define our function S as follows:

$$S(P_i, P_j) = \frac{1}{k} \cdot \sum_k S'(P_i^k, P_j^k)$$

where $P_i^k$ denotes the $k^{th}$ gene of an individual i in the population.

In the case of the categorical genes, G1 and G2, S' is given by:

$$S'(P_i^{1,2}, P_j^{1,2}) = \begin{cases} 1 & \text{iff } P_i^{1,2} == P_j^{1,2} \\ 0 & \text{otherwise} \end{cases}$$

In the case of gene 3, which is an integer gene, S' is computed as follows:

$$S'(P_i^3, P_j^3) = 1 - \frac{|P_i^3 - P_j^3|}{\text{Max}\Delta^3}$$

where $\text{Max}\Delta^3$ is the range of gene G3, that is, the difference between the maximum and minimum values it is allowed to take.

In the case of real-valued genes such as those used for the reproduction variables, redundancy or density is computed using the Euclidean distance $d_{ij}$ (described earlier) in R-space between the different population members, as follows. The redundancy or density of the $i^{th}$ population member is given by:

$$R(P_i) = \sum_j f(d_{ij})$$

where $d_{ij}$ is the distance in R-Space between individuals i and j, and $$f(x) = \max\left(1 - \frac{x}{\text{threshold} \cdot d_{max}}, 0\right)$$

where threshold is a constant in the interval (0, 1] and $$d_{max} = \max_{ij}(d_{ij})$$

Entropy

Population diversity is also measured by computing the Shannon entropy of the genotypic (or phenotypic) values in the population. A high entropy value suggests a high level of diversity. Entropy-based diversity measurement does not require a metric of similarity. We calculate the entropy of each gene independently and also combine the results using weighted averaging. To compute the entropy of a gene, we first count the frequency with which each possible allele value for that gene appears in the population. These frequencies are then plugged into the standard Shannon entropy equation:

$$h_{G_k} = \sum_i \frac{M_i}{N} \cdot \log_3\left(\frac{M_i}{N}\right)$$

where $H(G_k)$ is the entropy of gene $G_k$, $$\sum_i$$

is the sum over all the different values or alleles that $G_k$ can take, $M_i$ is the number of occurrences in the population of the $i^{th}$ allele for that gene, and N is the population size. This can be applied directly to genes G1 and G2. For genes that are similar to G1 and G2, but that span a range of many possible discrete (but ordered) values, we apply a coarse quantization to obtain a smaller set of discrete values. For genes such as gene G3 above, which span a continuous space, we convert the continuum into a set of symbols by quantizing the continuum to obtain a set of discrete bins and counting the $M_i$ occurrences of values that fall in each of these bins.

In another possible embodiment, we may compute entropy based upon higher-order effects that occur between genes. To do this, we calculate entropy based upon the frequency with which each possible n-tuple of allele values appears in the population across the n selected genes.

Entropy, being a population-wide measure, is not conventionally used when a particular member of the population is sought, as in replacement or when populating a voting window. Rather, it may be used to track the evolution process, and to adjust global parameters such as the mutation probability.

Clustering

In this section, there is described the subject of clustering, which relies on similarity measurements, and which is used at different times in the embodiment described here, as discussed later. If the function $S(P_i,P_j)$, described above, indicates the similarity between individuals $P_i$ and $P_j$, then we can define a new function $$D(P_i,P_j)=1-S(P_i,P_j)$$

to indicate the dissimilarity between these two individuals. With the function D, we can compute a dissimilarity matrix M, where each entry $M_{ij}$ is the dissimilarity between individuals $P_i$ and $P_j$. This matrix is symmetric and has zeros on the diagonal.

With the matrix M, we can apply any number of known clustering techniques to group the individuals either according to genotypic similarity or proximity in R-space, such as the K-medoid clustering algorithm. The K-medoid algorithm must be told the number of clusters to find. If the number of clusters that would best fit the data is not known, then the silhouette value of a clustering, can be used to decide how many clusters should be sought.

We may also cluster the human users based upon their voting behaviors. In this case, we measure the correlation in the voting records of any pair of users $V_i$ and $V_j$ and derive an entry $M_{ij}$ in matrix M, as follows:

$$M_{ij} = 1 - \frac{1 + \text{correlation}(V_i, V_j)}{2}$$

Strategies for Populating the Voting Window

The voting window, also referred to as the focus window, is the window presented to each voter for the purpose of displaying a set of design candidates and collecting that voter's assessment of them. The various policies used to populate the focus window at each voting iteration are described in this section. Generally speaking, these policies seek to achieve a number of sometimes conflicting goals: a) giving the participant an opportunity to explore as much of the design space as possible, b) giving the participant a sense that the system is responsive to his or her votes, and c) ensuring that the participant explores certain aspects of a design space, such as the space of phenotypes that include genes extracted from competitor offerings.

Voting Window Mixture Policy

The voting or focus window mixture policy examines the votes that are submitted from a first focus window and determines the number of slots in the next focus window (for the participant whose votes the system is currently processing) that will be filled with: a) offspring of design candidates shown in said first focus window, and b) samples of design candidates from the general population of design candidates.

In the present embodiment, all individuals in the focus window that receive a thumbs-up vote will parent at least one, but no more than two, offspring. If the number of thumbs-up votes is less than the number of focus window slots, then the individuals that have received a thumbs-up vote will be used to produce a second offspring until each has produced a second offspring, or until the slots of the new focus window are filled, whichever comes first. For example, if the focus window has six slots, and two individuals are given a thumbs-up, then both will parent two offspring, which will fill four of the six slots of the new focus window. If, instead, four individuals are given a thumbs-up, then the first two individuals will each parent two offspring, while the last two will each parent one, thus entirely filling the six slots of the focus window.

If, once all the thumbs-up votes are acted upon, any slots remain empty, then they are filled by sampling the general population of individuals, as described in the next section.

The policy described above is modified slightly when only one offspring is allowed for each candidate that receives a thumbs-up (see breeding section above.)

An alternative mixture policy used in the current implementation introduces the notion of elitism—well known in the Evolutionary Computation literature—into the focus window, such that some or all of the individuals that receive a thumbs-up are retained in the next focus window. Typically, elitism is used in generational versions of evolutionary algorithms in order to avoid the disappearance of highly fit members of the population across subsequent generations. In this case, we use a similar notion in the focus window or voter window. The motivation behind that policy is to provide a sense of continuity for the participant who might be uncomfortable with the disappearance from the focus window of previously preferred design candidates. When thumbs-up voting is used, as described in this example, if more entities received thumbs-up than there are elite slots in the next window, random picks are made among those entities that received thumbs-up, until the elite slots are filled. It may be noted that certain variants or representations may be declared as elite by virtue of past commercial success, such as leading offerings within a current market segment, i.e., offerings that have established market share.

Yet another alternative policy in the current embodiment fixes the minimum and maximum number of focus window slots that will be allocated for: a) elites (individuals that have received a thumbs up and that are carried over or are otherwise declared as elite in the manner disclosed herein), b) offspring of those individuals that have received a thumbs up, and c) samples of the general population. If the number of thumbs-up votes exceeds the number of slots allocated for offspring, then a sampling method is invoked such that only some of the recipients of thumbs-up votes are able to parent an offspring. Alternatively, we can limit the number of thumbs-up votes that a user is allowed to make per focus window. Yet another alternative is to create offspring for every individual receiving a thumbs up, but not include all the offspring in the subsequent focus window (those not appearing in the focus window will still be in the general population).

Focus Window Sampling

For focus window slots that are available for samples from the population at large, a policy is needed to decide how these candidates are chosen. In the current implementation, the simplest policy used is one where we sample randomly, uniformly across the population of individuals. This sampling takes place after all offspring (parented by the individuals that received a thumbs up) have been inserted into the population. The sampling procedure does not attempt to prevent the same individual from appearing twice in the focus window, nor does it attempt to prevent two distinct individuals that are genotypically identical from appearing together in the focus window.

An alternative approach is to bias the sampling away from regions of high redundancy (redundancy being computed as described in a previous section.) The advantage of these policies is to allow for greater exploration of the design space by the participants, by affording greater diversity in their focus windows. One such policy, used in this embodiment, utilizes R-space redundancy to discount how likely a particular population member is to be selected. More specifically, roulette wheel selection is used, with the slice given to each of the N members of the population being inversely proportional to the redundancy of that member:

$$Pr(P_i) = \frac{1}{N \cdot R(P_i)} \bigg/ \sum_i \frac{1}{N \cdot R(P_i)}$$

Another policy uses feature space redundancy (calculated on the basis of the feature genes) to bias the sampling, again using the same formula as above.

An alternative policy embodied in the present system performs a cluster analysis (described above) of the individuals in the population, either with respect to their positions in R-space, their genotypic characteristics, or both. Once the clusters are determined, the random sampling is conducted such that each cluster is equally likely to provide an individual for the open focus window slots, regardless of the number of individuals in each cluster. The advantage of this scheme is to allow the participant to sample equally from the different species or preference clusters (or aesthetic clusters) that are emerging during the exercise (speciation is discussed later.) This is in contrast to uniform sampling where, in effect, we sample from every cluster in proportion to the cluster size. A related approach is one where we select the representative design candidate for each cluster (the centroid or medoid of that cluster.)

In yet another policy, we bias the sampling in favor of individuals that have been infrequently viewed by that participant. In this case, the probability of a member of the population being selected is inversely related to the number of times it has appeared in his or her focus window. The probabilities used to load the roulette wheel are given by:

$$Pr(P_i) = \frac{1}{f(m_{ij})} \bigg/ \sum_i \frac{1}{f(m_{ij})}$$

where $m_{ij}$ is the number of times that design candidate $P_i$ has appeared in the focus window of participant j, and $f(x)$ is a monotonic function. For example:

$$f(m_{ij}) = m_{ij}^2$$

In a related policy, we bias the selection in favor of individuals with feature properties that have been infrequently viewed (based on feature similarity), or in favor of individuals in regions of R-space that have been infrequently viewed in the focus window. Here too, the probabilities used to load the roulette wheel for selection are given by:

$$Pr(P_i) = \frac{1}{R(P_i | W^t)} \bigg/ \sum_i \frac{1}{R(P_i | W^t)}$$

where $R(P_i \setminus W^t)$, the redundancy of population member $P_i$ with respect to the $i^{th}$ focus window $W^t$ ($W^1$ being the current window, $W^2$ the previous window, etc.) of the given participant is given by:

$$R(P_i | W^t) = \sum_q S(P_i, W_q^t)$$

where $$\sum_q$$

is the summation over all q members or design candidates in the focus window, and $S(P_i, W_q^t)$ is the similarity between entity $P_i$ and the $q^{th}$ member of focus window $W^t$. Finally, $S(x)$, the similarity function, is computed using any of the methods given in the previous section on redundancy and similarity, as appropriate.

A variation on this policy is one where we track not only the last focus window, but the last few or n focus windows and where we either give all of them equal weight or give the content of the more recent focus windows greater importance in the redundancy calculations. One particular version of this looks at the last n focus windows (n=3, e.g.), and weights them differentially. The slices or shares used in the roulette wheel in this case are given by:

$$Q(P_i) = \sum_{t=1}^{n} \omega_t \cdot \left( \frac{1}{R(P_i | W^t)} \bigg/ \sum_i \frac{1}{R(P_i | W^t)} \right)$$

with the weighting factors $\omega_t$ decreasing with $$\omega_t = \frac{1}{t}$$

as an example.

In yet another sampling policy, used with in this implementation, we bias the sample away from individuals that are redundant (either based on feature space similarity or on reproduction space similarity, or both) with respect to individuals that have been given a thumbs-down vote by the participant whose focus window is being populated. This is intended to minimize the chances of subjecting that participant to design candidates that he or she already voted down. This is done in a manner similar to the ones described in the previous policy, except in this case, the redundancy used is not $R(P_i \backslash W^t)$ but $R(P_i \backslash W^{down,t})$ which is computed only with respect to those focus window members that received a negative vote from the participant in question. A related policy is one where we bias the sample towards individuals that are redundant (either in feature space, reproduction space, or both) with respect to individuals that have been given a thumbs-up vote (alternatively, a neutral vote) by the user whose focus window is being populated. In that case, $R(P_i \backslash W^{up,t})$ is used, the probabilities or shares used in the roulette wheel are directly proportional to redundancy, as opposed to inversely proportional; for example:

$$Pr(P_i) = \frac{R(P_i \mid W^t)}{\sum_i R(P_i \mid W^t)}$$

Yet another policy attempts to maximize the diversity in the focus window with respect to the genetic content of design candidates (either based on feature genes, reproduction genes, or both) with each subsequent sample being biased away from the properties of the individuals placed into the focus window up to that moment. The rationale is to increase diversity in the participant's focus window.

Evolutionary Open Ends

Figure 23:
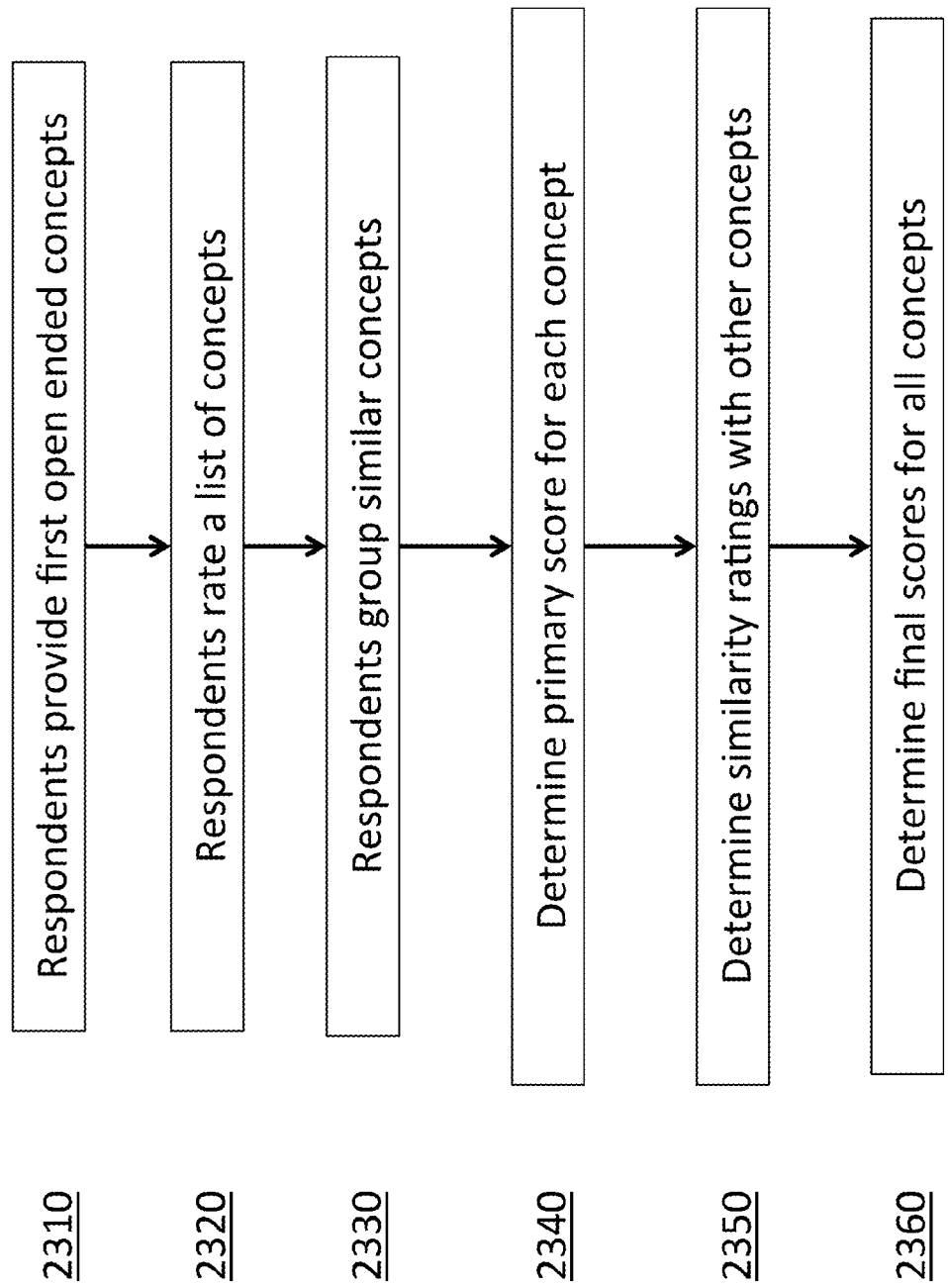
FIG. 23 is a flowchart of a method of a scoring process for concepts according to an exemplary and non-limiting embodiment.

In another embodiment, there is provided a novel method for soliciting new open ended concepts from a group of respondents, scoring those ideas, and structuring them so that the most promising concepts are identified. The identified promising concepts can be combined with other appropriate concepts for evaluation by groups of respondents as is discussed in other exemplary embodiments. The purpose of the method provided in this embodiment is to generate new concepts based on the unconstrained input from a group of respondents and then to identify the most promising concepts. The method provided can be conducted under many conditions—online (such as on Facebook or as a Google pop-up), in a central location, in some hybrid situation, in a paid contest, and so forth. Mechanisms to motivate respondents can be integrated into the innovation to improve attention and effort by incenting respondents. For example, a respondent could be given a reward depending on how well their suggestion scored, or even depending on how much their similarity assessments agreed with the similarity assessments of others. These techniques (broadly called incentivization techniques) should be considered complementary to this innovation, and many specific techniques could be developed that could improve response quality throughout the exercise. A flowchart for the method is provided in FIG. 23.

In step 2310, a group of respondents (e.g. 20-30 respondents) are asked to submit a series of concepts such as 2-3 concepts each. These concepts will be seed ideas. The ideas could be suggestions, associations, or any other response type. For example, they could be suggestions for a new product, suggestions for a new product slogan, associations for an image or a brand logo, thoughts about a popular figure, strategies for a campaign, suggested policies for law, descriptions of feelings or experiences, graphical concepts such as photos, drawings or CAD models, etc. Alternatively (or in conjunction), one or more seed ideas could be entered by someone organizing the exercise prior to its exposure to respondents.

Once enough seed ideas exist, a group of respondents, which can be different from the previous group, are asked to rate items or rank groups (e.g. 12 concepts) of concepts, Step 2320. This requires that concepts are selected for rating or ranking, since eventually enough items will accumulate that it's impossible for each respondent to rank or rate all of them. Alternately, portions of the rating or ranking can be done by a computer using a rating or ranking algorithm. Ranking has an advantage over rating in that it avoids scale bias and many other known challenges with rating systems, however either system could be used (or some combination of systems). Ranking can be done by simply dragging concepts from one list in arbitrary order to another ranked list where the concepts are in ranked order. If rankings are used, these must be translated into an underlying rating system through one of many algorithmic or statistical methods such as the order in ranked list. The display of concepts to be ranked can be determined in part based on the item scores or rankings.

In addition to rating or ranking concepts, respondents can be asked to submit additional concepts. These submissions can occur before and/or after exposure to concepts provided by other respondents.

In addition to rating or ranking concepts and suggesting new concepts, respondents can be asked to indicate which concepts are similar to other concepts, and possibly how similar they are, Step 2330. Alternately, aspects of the rating or ranking process can be done by automated data processing and analysis with a computer. There are many methods of evaluating concept similarity, but one method that is simple and avoids scaling issues is to group concepts into 'buckets' of similarity. For example, a respondent could be asked to group 12 concepts into 3 or 4 buckets of similar concepts. The number of buckets could be fixed or indeterminate. Respondents could further be asked to indicate how similar concepts within the buckets are to other concepts. There are innumerable variations upon this technique, including pairwise comparisons, iterative single links (pairing two concepts that are the most similar in the set of 12, then pairing the next two concepts that are the most similar, and so forth), multiple links (indicating for each concept how similar every other concept in the set is), etc. The disclosure is intended to cover all of these methods of soliciting similarity information.

In additional to similarity information that is submitted by respondents, additional machine derived similarity information can be weighted into the mix. For example, in the case of textual content one approach would be to apply text analysis software such as that provided by Clarabridge to assess category reference or sentiment, and impute similarity measures between concepts. Another approach would be to conduct simple word or expression sharing analysis, with or without the assistance of linguistic software (such as a digital thesaurus). More involved textual content analysis, possibly including the use of general indexes or lexicons, or domain-specific ones, may also be used, either to develop initial similarity estimates, before similarity information is collected from respondents, or to complement such respondent input. Specialized indexes may be specific to such domains as medical devices, Rx drugs, food products, consumer electronics, household products, and so on. The indexes may also be specialized for such areas of interest as product innovation or user experience.

In the case of graphical content, various machine-based content analysis may be used. These include image analysis, feature extraction and identification, and pattern matching techniques and algorithms. Multiple such algorithms may be applied in various sequences, possibly iteratively, and to different areas of the submitted image or design. Some of these techniques and ways to apply them are described below, as they may be applied to a set of designs submitted for a business card or an online ad. The general approach is to build a similarity matrix (a triangular matrix with zero diagonal), with an initial entry (for example 0.5) for each pair of concepts submitted. As entries are analyzed and compared, the initial entry for a given pair of concepts is updated, it is either incremented if the two concepts are found to have similar elements as described below, or decremented as points of difference are identified. The range of values attainable range from 0 for maximally different concepts, to 1 for identical or highly similar concepts. Note that the size of the similarity matrix grows as more concepts are submitted by respondents.

The similarity update process may involve the use of weighting factors applied to the different elements of similarity or difference described below; it may also involve rescaling the similarity matrix entries based on the observed number of elements that can be compared across designs, and weights assigned to each of them (i.e., based on the observed maximum values of similarity increments during the ongoing comparison process). Similar rescaling may also be carried out as new entries are added to the matrix, in response to new submissions.

A first analysis of a submitted image would be to identify the presence of textual blocks and graphical elements. For example, a design submitted for a business card with company logo would have both. Identifying these elements makes it possible to apply the appropriate technique or algorithm to each type of element, for purposes of building similarity estimates between different such submitted concepts. Similar high-level analysis is also performed to identify colors.

One component of similarity between two graphical concepts can be the proportion of the design occupied by text and that occupied by graphics or images. (In the case of text art, the distinction may require feature extraction techniques as described later.)

For textual elements, such as an address block or company tagline on a business card, or an offer on an online ad, the next level of analysis is to identify the number and length of these text blocks, the font type, font size, font style and font color used, all of which would be used in estimating similarity between two items. For example, two designs that contain a similar number of similarly sized text blocks would be considered closer than two items with very different numbers of text blocks, and/or very different amounts of text in these blocks. Similarly, two items that share the same or similar font size would have their similarity value incremented if other items in the pool have comprise significantly different font sizes. Similarly for the other aspects of font attributes. Font color comparison however is a involved process, and is covered separately below. A simple analysis however is contrast between font color and background color. Contrast can be calculated easily using functions available in various programming languages, such as PHP or JavaScript (getContrastYIQ( ) e.g.). The calculation is typically based on a comparison of brightness or luminance between the two colors (typically starting with the RGB values of the two colors in question). The difference in color itself may also be used. Items with similar contrast values compared to other concepts in the pool would see their similarity value incremented, all else being equal.

The contribution of textual elements to the similarity estimate between two designs is weighted to reflect the proportion of the design that the text elements cover. A further weighting adjustment may be applied, to reflect the prominence of certain textual elements; for example, text blocks that occupy the same surface areas may be treated differently depending on the font size or font style used, to reflect the fact that the element with larger type or bolder type may be more prominent and should be given more weight in the distance calculation.

For the case of images in the concept being evaluated, a first level of analysis is to identify whether the image in question involves simple line art, as may be the case with a simple product outline on product concept image, a photorealistic product rendering, or a rich photo of something in nature, e.g. This identification can be accomplished by analyzing the spatial distribution of contrast ratio and the spatial distribution of color (the color histogram of the image), using RGB, CMYK, or preferably HSV values. Depending on how a graphic element is classified, different rules will be used to match it to similar graphic elements with different designs, and to assess the similarity between the elements thus matched. If similar graphic elements cannot be identified across designs, general comparisons that take into account all images within a design are performed, with the appropriate averaging. This analysis may also involve segmenting a given picture (see, e.g., U.S. Pat. No. 6,718,063 granted to Lennon and Wu, Method and Apparatus for Computing Similarity Between Images).

In order to perform similarity comparisons involving color, a color model and related color difference metric must first be selected. A simple model is the RGB (Red Green Blue) model, and a simple related color distance between two pixels in an image or across images would be the Euclidian distance in that space:

$$\Delta ColorRGB = [(r_2 - r_1)^2 + (g_2 - g_1)^2 + (b_2 - b_1)^2]^{\frac{1}{2}}$$

where $(r_1, g_1, b_1)$ and $(r_2, g_2, b_2)$ are the RGB values of the two pixels being compared. This distance can be normalized and subtracted from 1 to arrive at a color similarity measure. Similar formulas exist when different color models are used, such as HSV or HSL, which are transformations of the RGB model.

A more sophisticated approach to estimating color difference takes into account the different sensitivity of the human eye to different colors. These approaches compute color distance in perceptually uniform (or nearly so) color spaces, such as the CIE's (Commission Internationale de l'Eclairage) L*a*b or L*u*v color spaces, or their derivatives as is known to those in the art.

Given a color model and distance metric, more refined color histograms can be generated for the images being compared, and image similarity can be computed as a distance between histograms (typically binned or quantized). Examples of such calculations can be found in, e.g., Stricker, M., & Orengo, M. (1995). Similarity of Color Images. In *Proc. SPIE Storage and Retrieval for Image and Video Databases* (Vol. 2420, pp. 381-392. Also, in Missaoui, R., Sarifuddin, M., & Vaillancourt, J. (2005). An Effective Approach Towards Content-Based Image Retrieval. *Image and Video Retrieval*, 2060-2061.

The similarity between images on two designs is used to contribute, positively or negatively, to the similarity rating of these designs. This contribution may be weighted by the proportion of the design covered by the images in question (possibly using the average proportion across the two designs). A further weight adjustment may be applied to the similarity calculation, to give more importance to images that have more prominence, based on average luminance or color saturation. The idea is that given two images, on each of two designs that are being compared, if the more prominent images are very similar, and the less prominent two are less so, the two designs should be pulled closer together than if the inverse were true.

Aside from color-based analysis, image similarity can also be assessed using structure and texture. A simplistic way of thinking about this type of analysis is that it is based on the "outlines" and "shapes" present in the images, what would be left if the images were decolorized and the contrast increased. Various mathematical techniques have been developed to carry out this type of analysis, and embodiments may use any one or combination of these. These include intensity-based approaches, structural similarity based approaches, as well as more complex approaches using wavelets. (See, e.g., Sampat, M. P., Wang, Z., Gupta, S., Bovik, A. C. & Markey, M. K. (2009). Complex Wavelet Structural Similarity: A New Image Similarity Index. *IEEE Transactions on Image Processing*, 18 (11), 2385-2401.) Exemplary embodiments foresee using these techniques to identify features such as logo shapes on business cards or product representations on ads.

A designer submitting different designs for a business card may use variations on a given logo design, involving minor shape transformations of fundamentally the same design. Similarly, different versions of an online ad for a product may show that product from different angles or perspectives. In these situations, it is useful to have a similarity metric that takes this type of transformation and distortion into account, as described, e.g., in Bai, X., Yang, X., Latecki, L. J., Liu, W., & Tu, Z. (2010). Learning context-sensitive shape similarity by graph transduction. *Pattern Analysis and Machine Intelligence, IEEE Transactions on*, 32(5), 861-874.

Exemplary embodiments also foresee using a combination of color-based and texture-based image similarity assessment, for the purpose of grouping, scoring, and sampling from the pool of design submissions, as described elsewhere. One such approach is described by Zujovic, J., Pappas, T. N., & Neuhoff, D. L. (2009, November). Structural similarity metrics for texture analysis and retrieval. In Image Processing (ICIP), 2009 16th IEEE International Conference on (pp. 2225-2228). IEEE. Zujovic, J., Pappas, T. N., & Neuhoff, D. L. (2009, November). Structural similarity metrics for texture analysis and retrieval. In *Image Processing (ICIP), 2009 16th IEEE International Conference on* (pp. 2225-2228). IEEE.

Exemplary embodiments also foresee the use of OCR (optical character recognition) to convert the text image to actual text, which can then be analyzed for content as described earlier in the sections on textual analysis. In this way, the similarity between two designs would include the similarity of the textual content present in these designs. This would be useful in the case of advertisements, new product concepts images that include textual descriptions of the features and benefits of the proposed product, and so on.

As another example, concepts which are liked by the same people tend to be similar to one another (an assumption frequently made in collaborative filtering engines such as the many movie-recommendation or product-recommendation engines that are currently used by online retailers) then similarity estimates can be derived from scoring or ranking information.

Any or all of these methods, and various other methods, can be used to improve similarity assessment among concepts within the scope of the embodiments.

Methods are now provided for a process of obtaining new suggestions, rating those suggestions, and assessing similarity. To improve upon these, it further requires a method for selecting which items, from the growing pool of submissions, to display to respondents for future assessment. This mechanism can be based on various objectives, a preferred one being to select a set of items that appear to be most preferred (strongest), subject to some diversity or dissimilarity requirement. Thus, rather than simply selecting the top 12 ideas for display to rank, rate, or assess for similarity, a superior method involves selecting a set of ideas that are both highly rated as well as representative of the major groupings of ideas submitted to-date. This selection would use both the similarity and rating information, and could use any number of mechanisms to group the items (e.g. clustering techniques, distribution fitting, latent class analysis, etc.) and any number of mechanisms to identify the strongest items (real time genetic algorithms, support vector machines, distribution fitting, regression methods, neural networks, simple algorithmic rating, etc.).

Once the exercise has gathered and rated enough items, it can be halted, and subsequent analysis can be conducted to identify and group the data. This could be the same analysis that was run in real time (or near real time) during the exercise, or could involve more complex and time consuming analysis (with or without the aid of humans).

After enough (n) concepts have been gathered and ranked, analysis can be conducted to identify and group the data to identify the most promising concepts by scoring the concepts. In Step 2340 the n gathered concepts are each given a primary score ($S_n$) using the equation below.

$$S_n = (X_n / (T * N_n)) * N_n^R$$

Where X is the sum of all the rankings provided for that concept; N is the total number of times the concept was provided for ranking; T is the maximum ranking that can be given; and R is a factor to give more weight to concepts that have been provided more often for ranking so they have more data behind them (as an example R=0.3).

Similarities scores ($Similarity_{n,j}$) are then calculated between concept n and all other available concepts j in Step 2350 such as between each pair of concepts as follows.

$$Similarity_{n,j} = ((P_{n,j} * M_{n,j}) + A) / (M_{n,j} + B)$$

Where P is the proportion of times that the concepts in the pair were grouped together as being similar; M is the number of times the concepts were provided together in a group of concepts for evaluation of similarity by respondents; A is a factor (e.g. start with A=0.5); and B is a factor (e.g. start with B=1.5). The scores for similarity range from 0 for disparate concepts to 1 for identical concepts. One aspect of similarity could be the portion of the concept that contains text. Other aspects of similarity could be the portion of the concept that contains color or the hue of the color.

Similarity scores can also be generated using some of the automated comparison approaches described previously wherein numerical values for the similarity of certain traits come from measured values such as color (L,a,b), contrast, % areas of text or images or shapes.

In addition, the above similarity formula can easily be generalized to account for multiple prior similarity estimates, including similarity priors derived from image or content analysis, as described earlier. In this case, the similarity could be a fixed weighted composition (or some other non-linear composition), or could be updated to give the respondent-derived similarity more weight as more observations are obtained. An example is given below.

$$Similarity_{I,J} = \frac{M_{I,J} P_{I,J} + K_0 priorSim_0 + K_1 (M_{I,J} + V_1)^\alpha priorSim_1 + K_2 (M_{I,J} + V_2)^\beta priorSim_2 + \ldots}{M_{I,J} + K_0 + K_1 + K_2 + \ldots}$$

Where P is the proportion of times that both statements were grouped together; M is the number of times that both statements appeared together in a grouping task; K parameters are constant weights; Alpha and Beta parameters are constant exponents; and the V values are constants (for example, 1). The prior similarities (between 0 and 1) are either fixed values, or derived from specific machine-based methods for comparing two different images or concepts. (For example, one may be a fixed value, one could be based on color theme similarity, one could be based on similarity derived from text based analysis, etc. . . . ). Clearly, this more general formula embodies the first formula. If $K_0$ were equal to 1, $Sim_0$ were equal to a/b, and the other K values were equal to 0, we would arrive at the simpler formula for Similarity given above. One simple special case is using a weighted average between the prior similarities and the respondent-derived similarity by setting alpha and beta to 0, for example. Although this provides a useful and practical example, many other methods are available to combine the prior similarities (fixed and/or derived from automated content comparison) with the respondent derived similarities. The methods are readily available in the literature, and easily accessible to someone skilled in the art.

Finally in Step 2360, final scores ($S_n$) are determined for each of the n concepts as follows.

$$S_n = \Sigma S_{n,j} * S_n$$

Where the notion behind the scoring is to give each concept a score equal to its own primary score, plus a portion of the score of every other concept based on the similarity to the concept.

This very simplistic technique offers tremendous advantages over simple scoring.

With hundreds of concepts, the score contribution from concepts other than the primary concept will often far exceed the score contribution of the primary concept.

In addition, the similarity data offers improvements over methods that merely rely on correlation in scores to assess similarity. That's because Similarity is generally more stable that preference.

For example, if respondents are shown six cars (Porsche, Ferrari, Lamborghini, Chevy truck, Chrysler truck, Ford truck), the vast majority of respondents (perhaps all of them) will group the trucks together and the sports cars together. Getting this data would require only one screen of questioning. Assessing similarity based on preference, however, would require multiple screens across multiple people. Moreover, the derived similarity would rely on consistency in preference, which is almost certain to be less stable (some respondents will like Porsche and Ford trucks, but not Chevy trucks or Ferraris, which would indicate the former pair are more similar).

Many more sophisticated and efficient algorithms can be developed along this principle by innovating on currently available mathematical approaches. However the core advantage relies on fully utilizing both preference and similarity based information. The above approach can easily be extended using techniques that make efficient global use of information, such as Monte Carlo imputation techniques to fill out the full similarity matrix assuming a structured covariance matrix describes the distribution of similarities.

Item sampling needs to be biased further, to get more information on newer items, since those items have less robust information attached to them. For example, the following exemplary rules may be used.

Any concepts in the database that have been seen fewer than 8 times might get preference in being selected into a sample set for review.

If there are 12 or more concepts, choose 12 concepts randomly from these concepts to show If there are fewer than 12 concepts, show all of these and fill in remaining slots with scored items To populate the remaining slots, calculate the Final Score for all other concepts and exponentiate these scores.

The necessary number of items needed to fill the remaining slots are chosen from among the top K items with highest exponentiated CurrentScores.

For example, K could have a value of 30, and the necessary number of items may be selected probabilistically from that set of 30, each in proportion to its CurrentScore.

More complex methods can be deployed that rely on Bayesian updating to assess confidence in item performance, or other algorithmic or statistical methodologies Concept selection can be biased to include differentiated items Concepts already assessed can be grouped (clustered) into K sets, based on their similarity, and one of the best concepts from each set (based on a metric derived from the item score) may be chosen.

Concepts can be grouped into fewer than K sets, and multiple concepts could be chosen from some of the resulting sets.

Concept choice can be directly biased based on the dissimilarity of that concept to other concepts; for example, a first high scoring concept may be selected, followed by the least similar concept from the next (lower) band of scores, and so on. Alternatively, a threshold of dissimilarity may be established, as a proportion of the range of observed dissimilarities within the pool of available concepts, and the highest scoring concept that meets the threshold of dissimilarity may be selected as the second concept, and so on.

In practice, any number of other techniques can be used, borrowing from mathematical techniques to find groups in data and/or measure uniqueness of dimensionality (e.g. factor analysis).

The process described above can be iterated for any number of respondents. The method can be combined with other standard crowd-sourcing techniques. For example, methods to detect profanity can easily be integrated. Such methods may draw from a library and/or they may rely on respondent feedback to "flag" inappropriate suggestions (with too many, or an excessively high proportion of views flagged, indicating the item is profane or inappropriate).

The exemplary embodiments described above can be deployed on a stable website, or can be integrated with online survey mechanisms to solicit and direct traffic toward a target page running the process. Multiple such processes, or variations of this process, can be run simultaneously. Such processes can be independent, or can be structured to interact. For example, the processes can share data, share suggestions, and/or share winning items. In addition, one or more processes can utilize multiple interfaces or data input types. For example, a process can deploy a screen to rank 12 items at a time on a standard web browser, but only 6 items at a time on a portable device with a smaller screen. Various methods can combine different data sources and types into a single scoring structure. The process described above can also be run asynchronously or synchronously in multiple languages, using automated or human-assisted translation mechanisms.

Crowd Sourcing

As pure machine learning and algorithm-based methods for text coding or text understanding have matured, the possibility of gaining input from large unconnected groups of people through the internet becomes possible known as, crowd sourcing. Typically crowd sourcing utilizes software to combine responses or work from several human coders in an efficient way, thus leveraging small amounts of work in parallel (or sequence) from many people, rather than large amounts of work from one or a few people. For product development and the evaluation of a broad range of concepts in a crowd sourcing environment where large amounts of diverse input can be rapidly generated, it becomes important to be able to automatically process both text and graphics related input.

Figure 24:
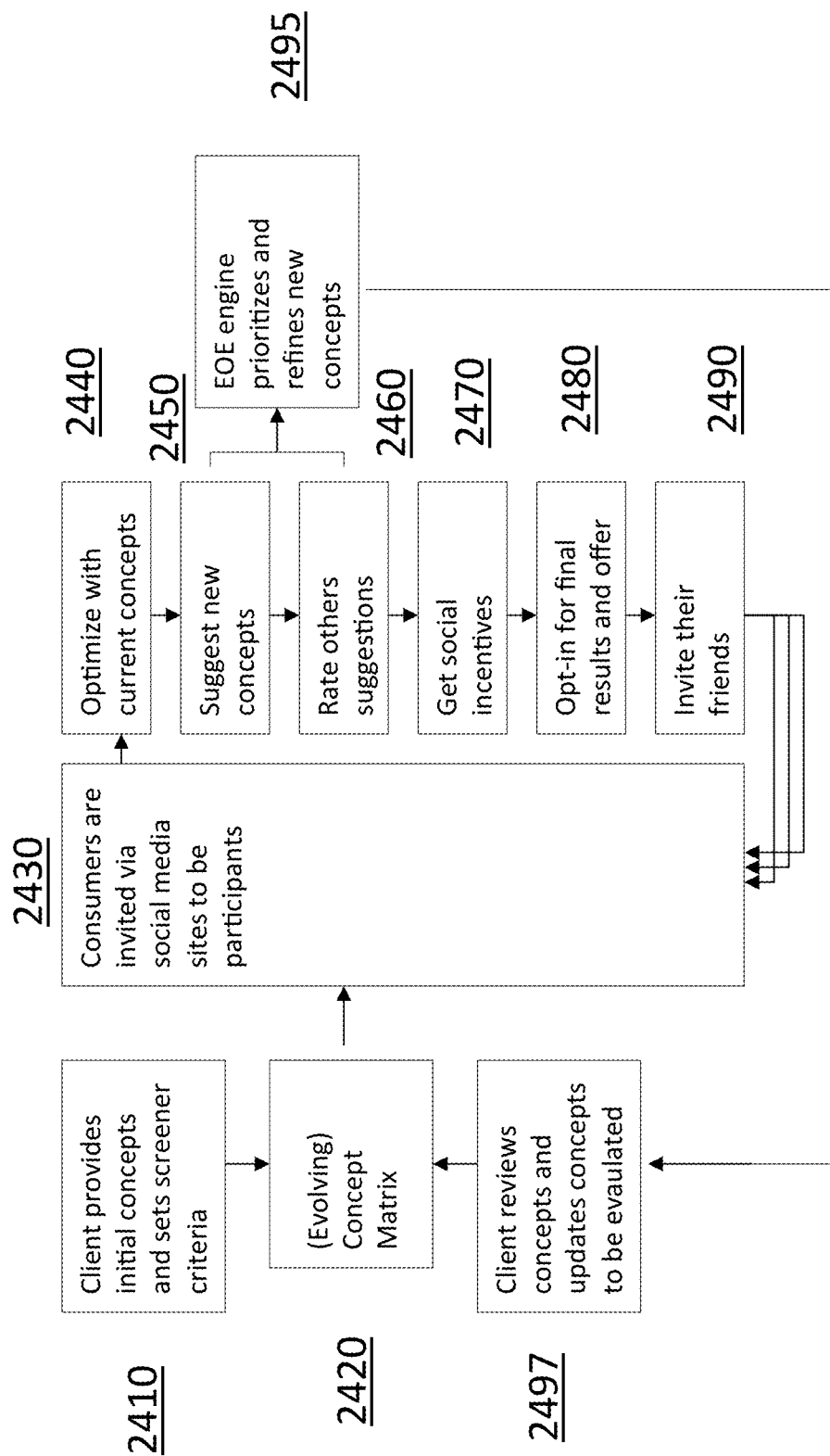
FIG. 24 is a flowchart of a method of an evaluation system that includes crowd sourced evaluation of concepts according to an exemplary and non-limiting embodiment.

A crowd based process for generating user rated concepts in a social media environment is shown in FIG. 24. In this embodiment, evolutionary content dynamically evolves with user generated and rated concepts where the evolution runs over an extended period of time to maximize idea generation and grassroots reach. The process starts with content provided by the client in Step 2410. The client also sets any screener criteria that would limit participation or limit concepts that will be carried through the evolution process. In Step 2420, a concept matrix may be established containing the concepts to be presented for evaluation by a group of participants. This matrix evolves as new concepts are provided. In Step 2430, consumers may be invited via social media sites (or other) to be participants. Incentives such as social incentives including for example, being listed as being on the team that developed a winning concept can be offered to encourage participation as was discussed previously. In Step 2440, the participants can optimize the current concepts using processes such as that shown in FIG. 2 or FIG. 23. Then in Step 2450, the participants can suggest new concepts, which are provided to the Evolutionary Optimization Engine (EOE) in Step 2495, in addition the new concepts are provided along with the current concepts to other participants for rating in Step 2460. The participants then receive appropriate social incentives in Step 2470 for their initial participation. In Step 2480, the participants may opt-in for further participation and further incentives. In Step 2490, the participants may invite their friends to be participants to provide new participants and increase the number of participants. The participants then loop back to Step 2430 for more evaluation of concepts. In Step 2495, the EOE prioritizes and refines the new concepts, using in part, the screener criteria provided by the client in Step 2410. The prioritized and refined concepts are then provided to the client in Step 2497. The client reviews the concepts in Step 2497 and updates the list of concepts to be evaluated. The list of concepts to be evaluated is then passed into the concept matrix in Step 2420 and the evolved Concept matrix then loops back to the participants for further evaluation. In this way, a wide range of concepts can be evaluated and optimized by a large diverse group of participants while a flexible level of control of the outcomes is maintained by the client review at Step 2497 and by the screener criteria established at Step 2410. As previously discussed, aspects of the process can be automated including Steps 2495, 2460, 2410, 2420, 2430 and 2497 to increase the efficiency of the process and to make the process faster so it can be more interactive with the participants.

Populating the Voting Window

Figure 7C:
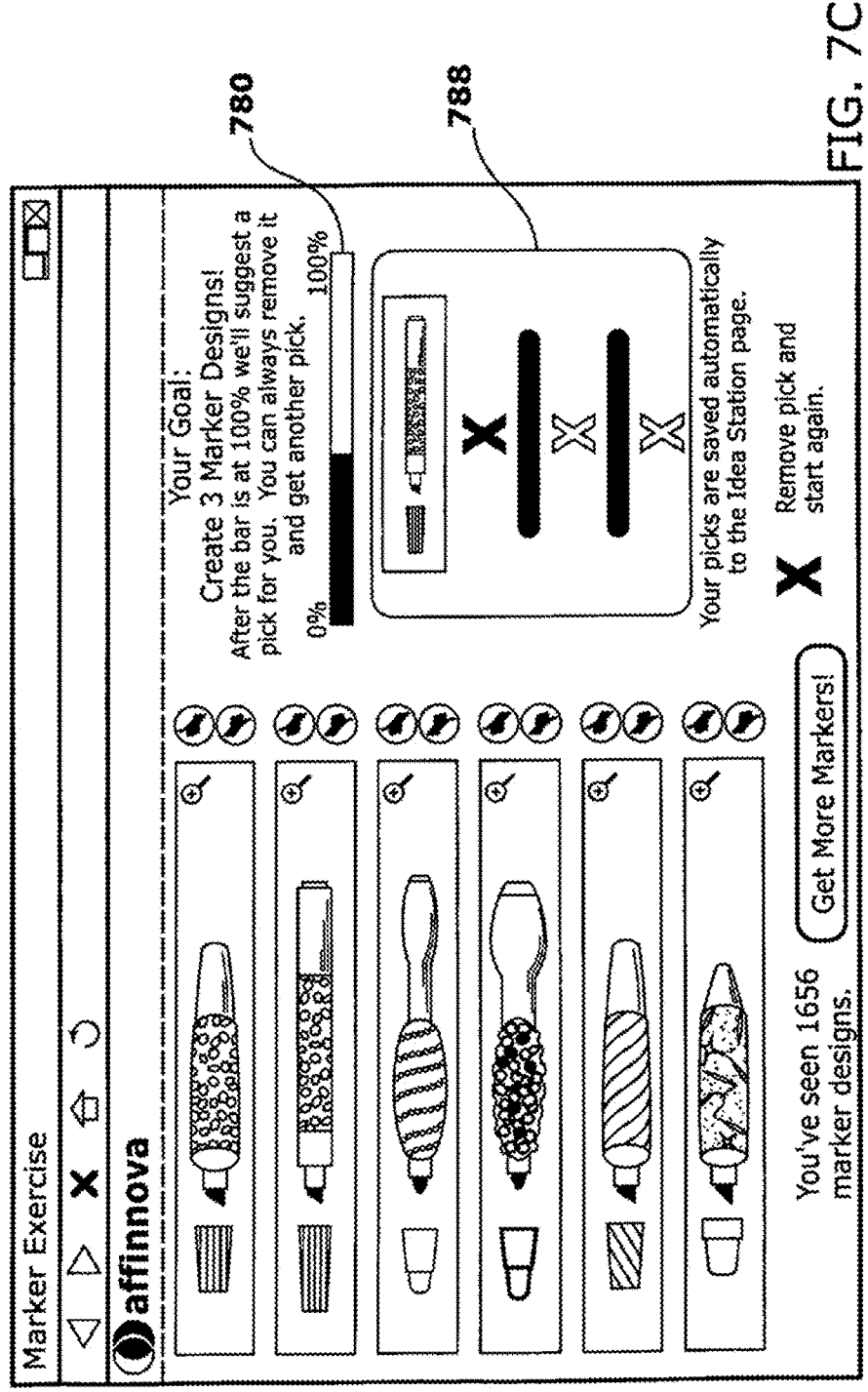
FIG. 7C is a screenshot showing an exemplary and non-limiting embodiment of a voting screen featuring a "pick panel" and a "progress bar."
Figure 8:
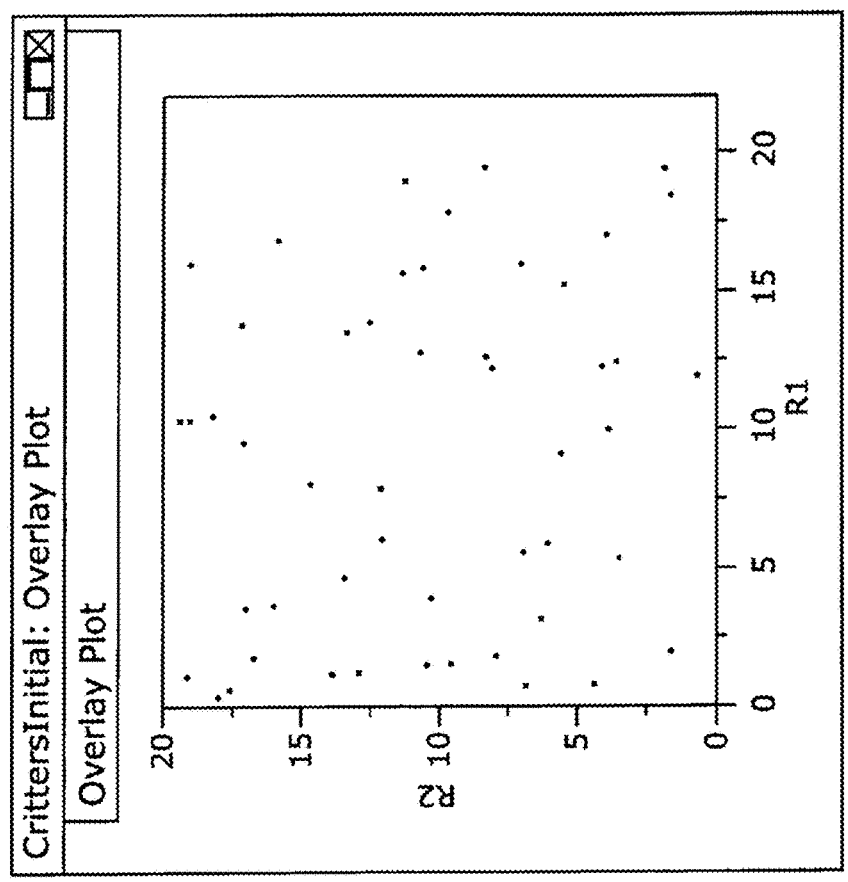
FIG. 8 is a screenshot depicting an exemplary and non-limiting embodiment of a display of items based on their R-space representation.
Figure 9:
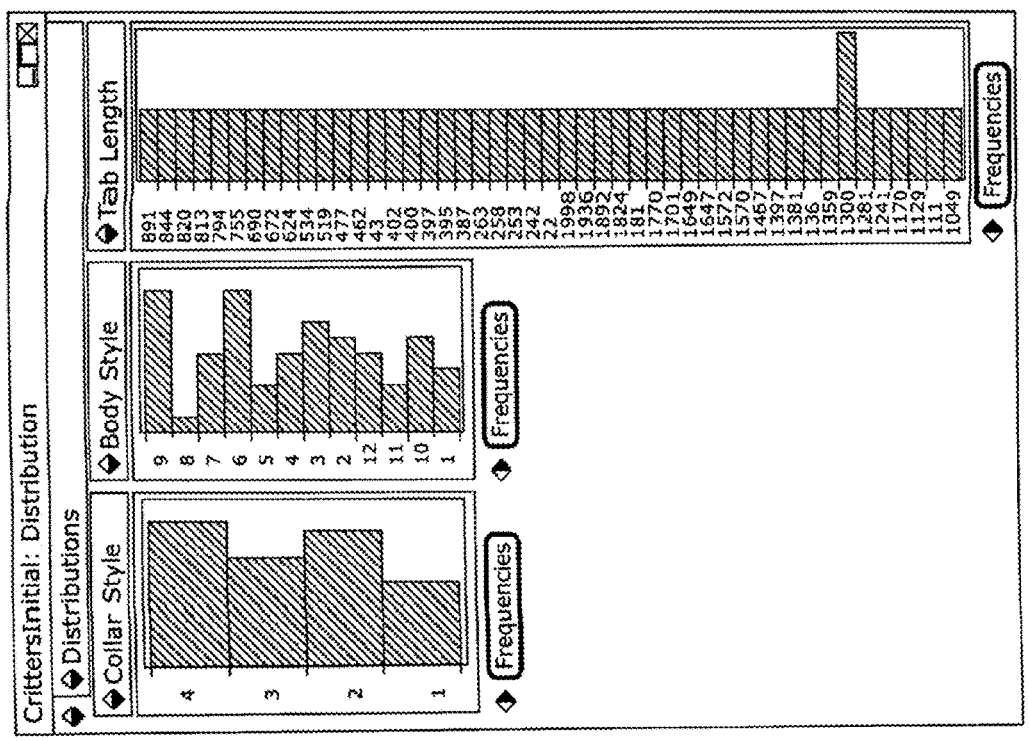
FIG. 9 is a screenshot depicting an exemplary and non-limiting embodiment of a display of items based on their feature representation.

Any of the policies mentioned above, or variations thereof, can be employed to populate a participant's window for evaluation of concepts. In one exemplary embodiment certain refinements are added to the voting window, which are intended to provide the participant with some or all of the following: a) a measure or indication of progress during the exercise; b) a sense of accomplishment as goal posts are reached during the exercise; c) more direct control over the evolution process; d) a sense of membership in a community of co-participants in the design process. FIG. 7C shows a voting window with two of these refinements on the right hand side. These include a progress bar 780 that covers a range from 0% to 100%, and that indicates the level of progress with a colored section. The other refinement shown in the same figure is the "pick panel" 788, which is the panel on the right hand side of the voting window, under the progress bar, labeled "Marker Designs". In the figure, the picks panel shows three thumbnails arranged vertically, one of them with a selection in it, and the other two still blank. The picks panel displays particular design candidates at certain points during the exercise, based on one of the strategies described below. In the case shown, an "X" mark under the selected pick allows the participant to remove said pick and to restart that part of the exercise that resulted in that particular pick.

If the participant interrupts the exercise or pauses, a returning participant's window can be reloaded with the same candidates that were present in his or her last focus window when they last logged off. This policy is often problematic however, as these candidates are likely to have been removed from the population, necessitating that they be recreated and re-inserted in the population. An alternative is to present the participant with as broad a sampling of the current design population as possible. This is done by sampling form cluster representatives as described earlier. This policy is also used in the case of a participant who joins the exercise after it has been ongoing for some time, and who is not identified with any particular preference segment.

Four classes of voting strategies may be used in this embodiment. The first class of strategies relies on a fixed number of votes submitted by the participant; a second class depends on the degree of similarity among the candidates that are showing up in the participant's last few voting windows, and therefore may involve a variable number of voting submittals by the participant in question. A third class allows the participant to directly select one of the design candidates in the voting windows a pick, by using a special button next to the thumbs-up and thumbs-down button (not shown in this figure.) Finally, a fourth class of strategies are intended to use the pick panel to show the participant how other participants are voting.

Strategy I: Analyze a Preset Number of Votes and Pick

In this strategy, the system is set to allow each participant to view and assess a preset number n of voting windows, with typical values of n ranging between 6 and 40. In this case, the progress bar increases in proportion to the ratio of voting windows viewed by the participant up to that point, to the preset number n. After the n vote submittals, a pick is automatically made on behalf of the participant based on his voting patterns, as described below, and the progress bar is reset to zero, a new voting window populated at random from the population of designs at large, and a new set of n vote submittals is started. The voting window shown in FIG. 7C corresponds to a case where the participant is asked to go through three sets of n vote submittals, resulting in three picks.

After the preset number n of voting windows, an analysis is performed on that participant's votes on these n windows (all the votes may be examined or only the last 80% of the n submittals may be examined to remove any "training" or accommodation effects.) In one scheme, the analysis involves counting the thumbs-up votes received by each allele, and using the counts to generate the most "selected" combination of attributes values. At that point, a design candidate is assembled using these most selected attribute values, and it becomes the pick. This approach works well when there are few or no dependencies between genes. A more refined analysis that works well even if there are dependencies involves the following steps: After the n vote submittals have been received, all candidates in these voting windows that have received a positive vote (thumbs-up) are collected. Then, a first positive-vote-candidate is selected, and, starting with the first gene of that candidate, a count of how many of the other positive-vote-candidates share the same allele for that gene is performed. This is repeated for all the genes of the selected candidates, and these k counts (k being the number of genes) are added up; this count is the "representativeness" score for that candidate. This process is repeated for every one of the positive-vote-candidates, and these are ranked on the basis of their score. Of those, the top-ranking positive-vote-candidate is selected as a pick.

In one variation, the participant is given a chance to reject the chosen pick, in which case the next highest scoring one is selected as a pick, and so on. If several (for example, three) are rejected, that set of n iterations is restarted. In another variation, the participant is presented with a panel showing the three highest scoring pick candidates, and he is given the opportunity of choosing the one he deems closest to what he had been voting for.

Strategy II: Focus Window Convergence Pick

In the second class of progress indication strategies, the progress bar does not increase monotonically, but it might regress depending on the behavior of the participant. If a voter votes consistently, then it is more likely that his successive voting windows will be populated with increasingly similar design candidates; in that case, a progress bar tied to the similarity of the contents of these successive voting windows will increase. In this case, the number of vote submittals prior to a pick selection is variable. As some fraction (say, ¾) of the design candidates in the voting window became identical or very similar, the most duplicated candidate is chosen as a pick. Having made the pick, and if the pick is not rejected by the participant, a new focus window is populated (e.g., at random), and the participant starts the next phase of the process that will yield the next pick. If the pick is rejected, alternatives similar to the ones presented above under Strategy I are followed.

Strategy III: Direct Selection

In this case, after a certain number of voting submittals have been made by the participant, an additional button is enabled next to each of the design candidates in the focus window. That button is a direct pick button, which allows the participant to select the corresponding candidate to become a pick. Alternatively, when direct picks are enabled, the participant is allowed to drag the desired candidate from its location in the voting window onto the picks panel area, which will place a copy of it there. Once the participant makes a direct pick, the direct pick buttons are again disabled for a preset number of voting iterations. The pick panel has a fixed number of slots to hold the picks, and when a new pick is inserted by clicking its direct pick button, it gets placed at the top of the Pick Panel, while everything else moves down one slot, the design occupying the bottom slot being discarded. If the pick is made by dragging it onto the pick panel, then the picked design either replaces the item in the slot onto which it is dragged and dropped, or the items at that slot and below are shifted down one slot (item in bottom slot again discarded). No matter how the pick panel is managed, the history of all picks is recorded for subsequent analysis.

A variation on this scheme also allows the participant to reinsert one or more of the picks in the pick panel back into the population of design candidates (and therefore in his focus of voting window as well) later in the exercise, if the participant gets the impression that that design candidate may have been lost. In that case, the R-space values of that candidate are updated to reflect the changes that may have taken place in R-space in the interim. One cannot rely on that candidate's previous R-space coordinates to be compatible with the current configuration of R-space, since R-space is constantly in flux. A new R-space location can be chosen in one of the following ways:

1) A region of R-space that contains the designs that are most similar to the design we wish to re-insert is located, based on feature gene similarity; the re-inserted design is given new R-space coordinates that place it in that neighborhood. If no designs in the population are sufficiently similar to the design to be reinserted then:
   a) Pick R-space coordinates at random, but within the bounding box of the current population (optionally expanded by some amount);
   b) Place the re-inserted individual in the least dense region of R-space.
   c) Place the re-inserted individual at the periphery of the populated regions of R-space at a distance from the periphery determined by the average distance between cluster representatives.

Strategy IV: Social Network Effect Schemes

This is a family of strategies that involve showing the participant, in a pick window, not only the pick candidates estimated based on his voting patterns, but also the picks (candidates or actual) for other voters. In this case, the most popular design candidate across voters is estimated using the same techniques described under Strategy I above, except that the positive-vote-candidates are collected from all participants, not only from the participant whose voting window we are discussing.

Strategy V: Competitor Analysis

In this family of schemes, a GA or EA is used in conjunction with a study to assess the impact of a design on a competitive market. As described in connection with various embodiments disclosed herein, competitor genes, or competitor products (whole phenotypes) may be considered and used to influence seed population, mutation, reproduction, directed breeding, and the like. Here a respondent's selections may be augmented by rules or constraints that introduce or maintain factors related to a competitive market, including one or more competitive products.

Survey Fraud Detection

In any survey based system, particularly when the respondents are rewarded for participating in the survey, there is a possibility that some of the respondents will cheat the system to finish quickly without thinking about the answers. These respondents are known in the industry as "speeders" or "straightliners". Speeders are respondents who answer questions so quickly as to cast doubt about their level of engagement or attention to the questions. Straightliners are respondents who tend to choose the same answer (or answers in the same position) too often, resulting in a statistically highly unlikely pattern.

Since their answers do not add value to the results, cheaters are terminated during the survey, or their answers may be scrubbed out of the data set in the subsequent data analysis. For speeder detection, a minimum time can be predetermined for a respondent to look and make choices among the various alternatives in a choice set. If the respondent spends less than that minimum time on a preset number of consecutive choice sets, the respondent is determined to be a speeder and the results from that respondent are discarded. For straightliner detection, the respondents' results are examined for patterns, such as all the first choices being selected. Statistical tests (such as a chi squared test) can be run on the distribution of the respondents' results to aid in identifying patterns within a certain level of statistical confidence. If the respondent is determined to be a straightliner, the results from that respondent are discarded. By discarding results from respondents that are not making an honest effort to evaluate the product forms being presented, the value of the results from the group of respondents is increased.

Speciation and Dynamic or Co-Evolutionary Segmentation

When the $\beta$ parameter used to control mate selection (Eq. (3)) is set to a high enough value, such as 40.0, then the mechanisms and procedures outlined above will automatically allow different preference profiles to emerge and to coexist during the process. (In case Eq. (5) is used instead, then the $\gamma$ parameter needs to be small enough.) To the extent that the participants represent a population of consumers in a market, and to the extent that different subgroups in that market end up evolving preferences for distinct combinations of product attributes, then the system in effect performs a sort of dynamic segmentation of that market. The term "dynamic" is used here to indicate that the preference profiles and the corresponding preferred designs are co-evolved during the process. This is different from existing approaches to market segmentation, which either assume given preference profiles (for which appropriate design are developed), or given designs for which the appropriate customers are identified. This section is intended to explain how the current implementation affords that segmentation capability, and to present a simple example.

Assortative Mating

To the extent that crossover operations between certain individuals (design candidates) results in new candidates that are less preferred by the participants, we seek to prevent such mating from occurring. However, we do not know a priori which such matings will be deleterious. The R-space mechanisms that express individuals' mate choices can learn, over time, which mate pairs are compatible and which are not, based upon the assessment by participants of the outcomes of actual matings. Pairings of genetic material that are successful will gradually tend to occur more frequently and, thereby, crowd-out those pairings that are less successful. The prohibition (or reduced likelihood) of certain mate pairs is known as assortative mating, and each set of individuals that are allowed to mate with each other, but not with members of another set, is known as a species.

The evolution of species (speciation) is of direct importance to dynamic participant preference segmentation. When a design exercise begins, the R-space is homogenous: the R values of the population of design candidates are distributed uniformly in R-space. As evolution proceeds, information is gained (through the participants' feedback) about which pairings of genetic material are more successful than others. As a result of participants' assessments and the crossover operations on the reproduction genes, the distribution of the gene values in R-space becomes heterogeneous. In other words, the R-space begins to cluster. This heterogeneity is structured in a way that keeps certain individuals near each other and far from others. These clusters correspond to species, that is, sets of individuals that are reproductively isolated. As reproductive isolation emerges, each species, along with the participants who have evolved it through their voting, become specialized to a particular sub-region of the design space, and they are less subject to interference from other species.

Multiple Niches in an Ecology and Simulation of Competitive Dynamics

When a market has multiple segments, there exists a set of distinct preferences profiles for each of these segments. Each segment's preference represents an area in the design search space. These areas can be thought of as distinct ecological niches. The assortative mating dynamic allows multiple species to emerge and persist, where each species inhabits its own niche. The number of participants supporting each segment—a proxy for the size of that market segment—determines the carrying capacity of that niche, and thus the size of the corresponding species. In other words, as R-space clusters form, the size of a cluster (the number of design candidates that belong to that particular species) reflects the size of the market segment (assuming a balanced level of voting among participants, which can be controlled in the current implementation, either by limiting the number of voting screens presented to each participant, or by disregarding the votes submitted by a given participant that participant has reached his or her allotted number of votes.) Because the participants discover design possibilities as they interact with the system (and thereby form opinions), and the designs evolve in response to the participants, one can describe the interaction between designs and participants to be in some sense co-evolutionary. The preferences evoked by the evolving designs allow the system as a whole to converge on a set of designs that delineate multiple segments in the market.

Figure 10:
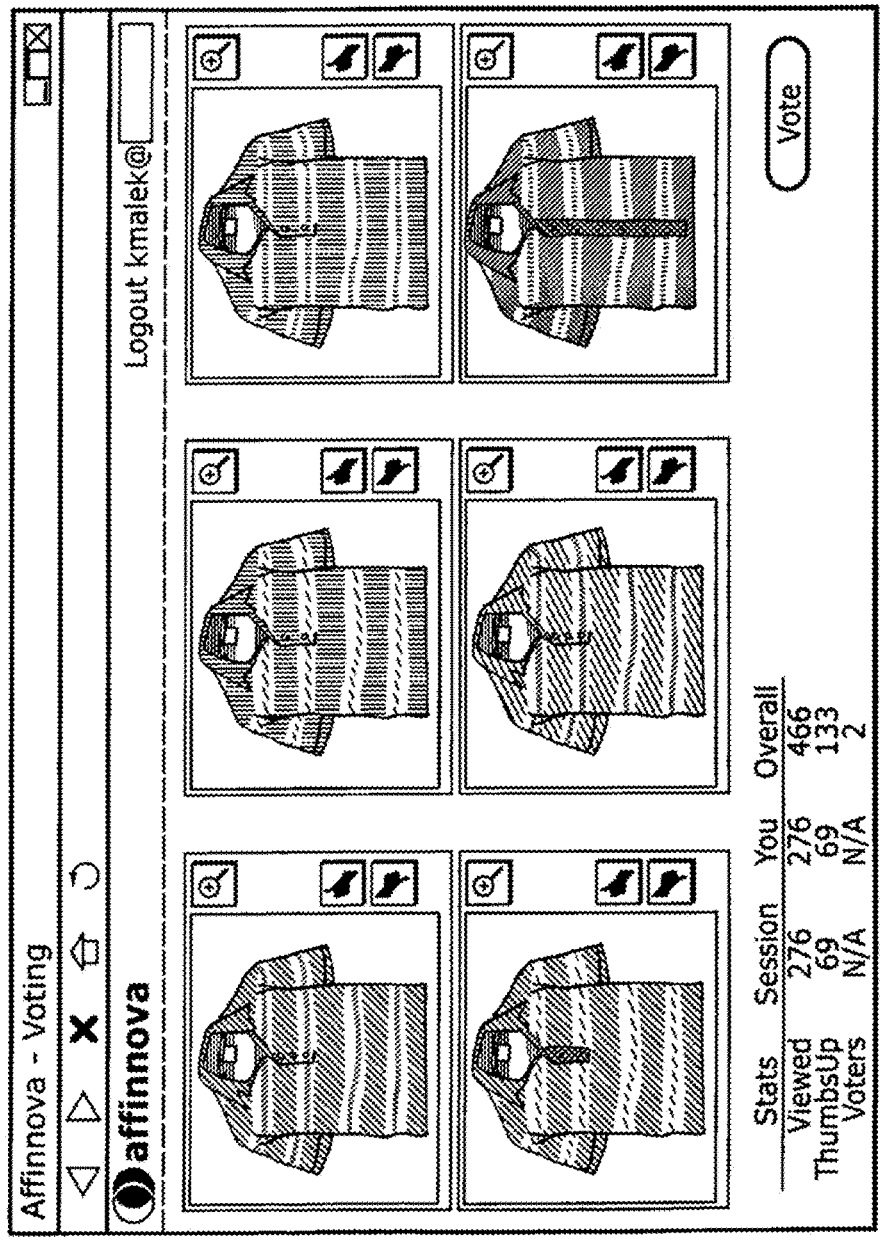
Figure 11:
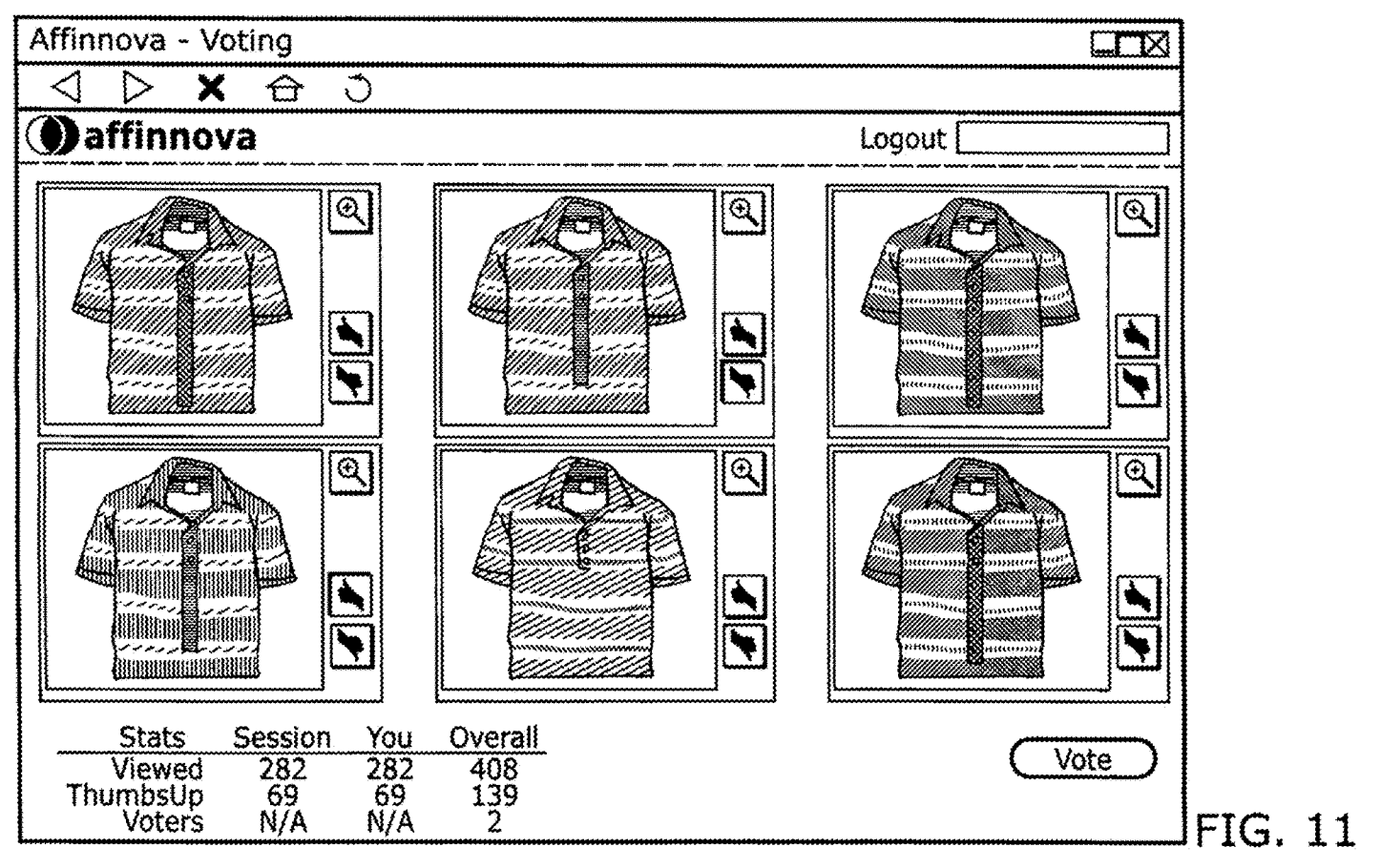
Figure 12:
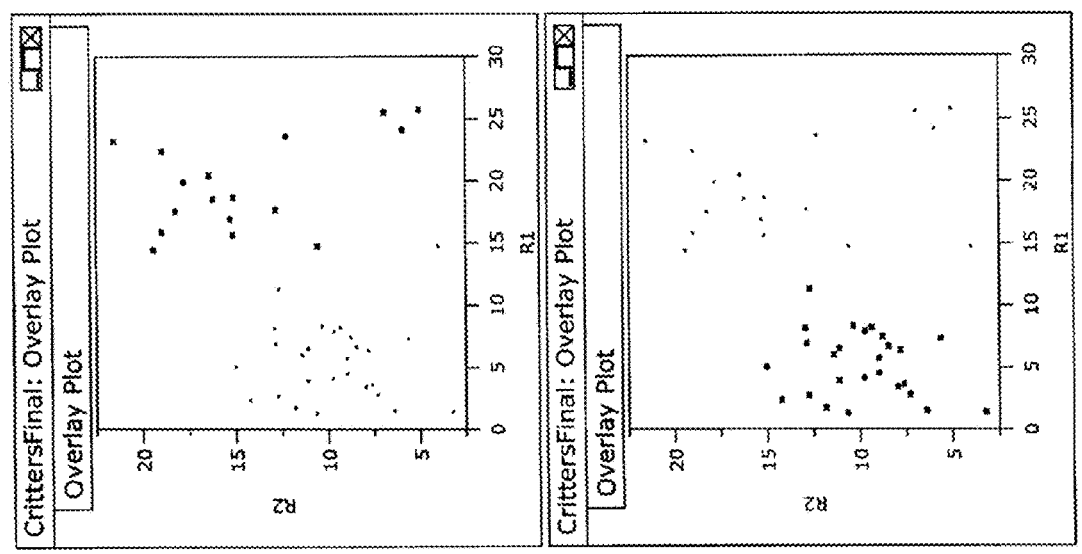
FIG. 12 is a screenshot depicting an exemplary and non-limiting embodiment of an R-space plot.
Figure 13:
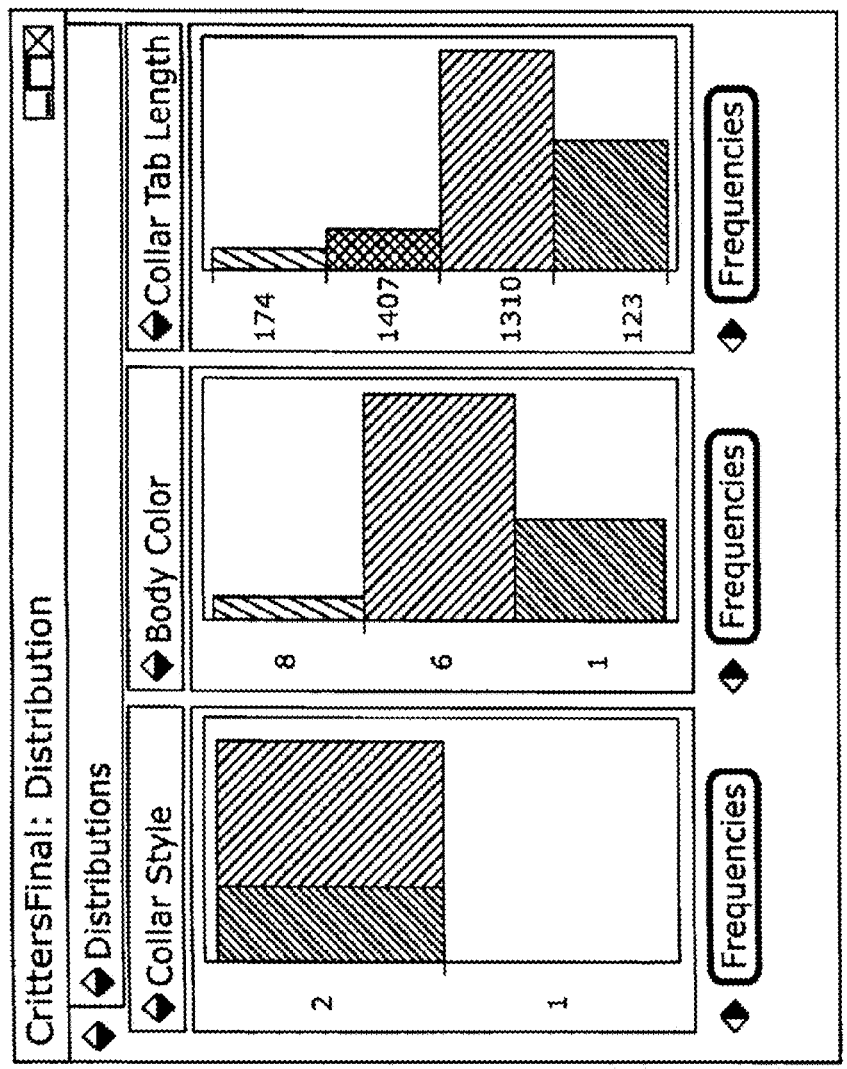
FIGS. 13 and 14 are screenshots depicting the distribution of feature genes in an exemplary and non-limiting embodiment of a design exercise.
Figure 14:
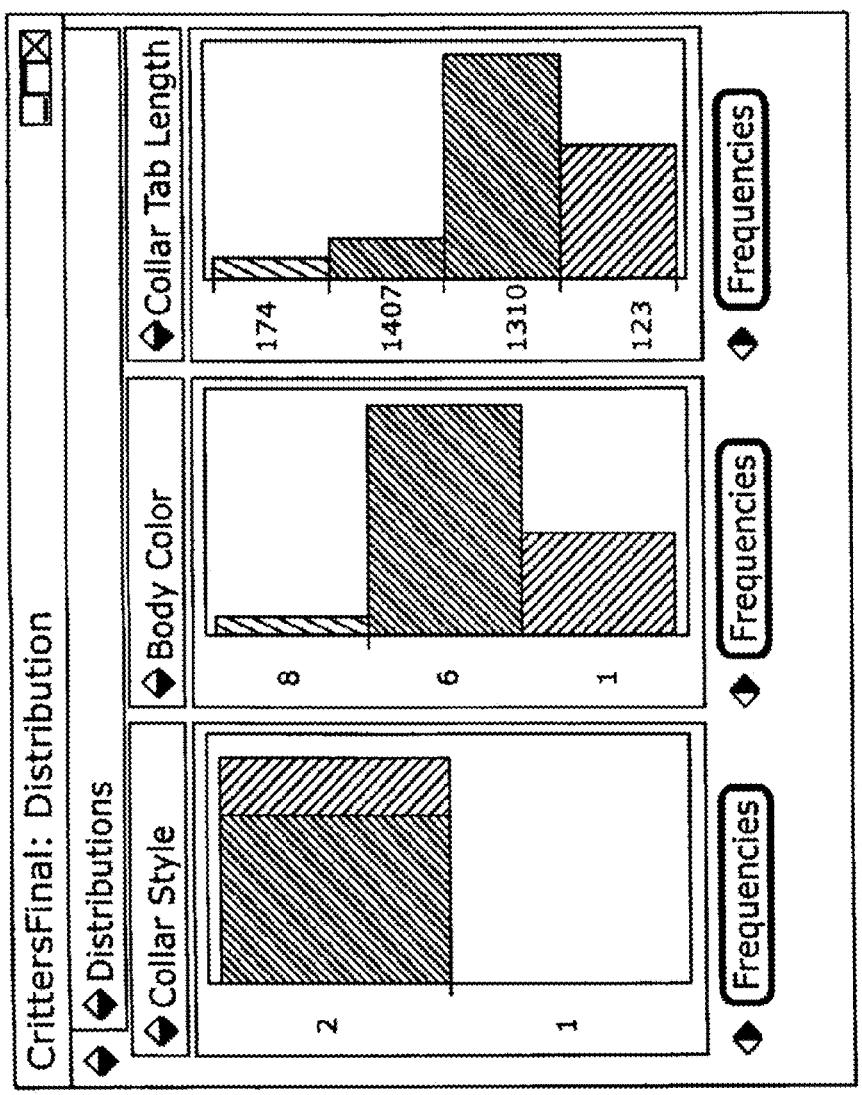

FIGS. 8 through 14 present an example of this dynamic segmentation process. In this example, two participants interacted with the system concurrently. The process starts with uniformly distributed reproduction genes and feature genes (see FIGS. 8 and 9, respectively) based on a random seeding of the population of candidates. After a number of voting cycles, two segments emerge, one corresponding to participant 1, and the other to participant 2. FIGS. 10 and 11 show the focus windows for the two participants at that point in the exercise. The content of each focus window is dominated by the design of choice for that participant, that is, the design choices shown to the first participant may feature different colors, patterns, and design styles (e.g. tab length) than the design choice presented to the second participant. The design choices shown to either participant may be highly concentrated in R-space, that is, each design choice may be very similar to each other deign choice shown to that participant (e.g. similar colors, similar patterns, etc.). In other exercises the design choices presented to participants may be scattered in R-space, that is, each design choice may have a different color or pattern from other design choices being presented to the participant. FIG. 12 shows the R-space plot at that point, with the design candidates corresponding to the two segments highlighted; in this embodiment, the two clusters are clearly distinguished. Finally, FIGS. 13 and 14 show the distribution of feature gene values for each participant at that point in the process. FIG. 13 depicts the distribution of feature genes 1 though 3 for participant 1. Style "2" is the only surviving collar style, since it is preferred by both segments. Participant 1 prefers a purplish body style (body style "1") and a short tab length (value equal to 123).

In embodiments, the presence of multiple niches may be associated with the competitive dynamics of a market or niche. Thus, by including such competitor factors, an EA, such as a GA, may be used to evolve a set of "best designs" specifically within a competitive context, such as where various designs are presented side-by-side with products that have competitor attributes (such as competitor genes, or entire phenotypes corresponding to known competitor products). Such strategies may allow, for example, identification of the success or failure of designs that result when introducing a competitor's feature to a client's design, introducing a client's proposed feature to a competitor's product, or the like. Such strategies may allow insight into complex situations, such as when a client introduces a new product that has a "best feature," and a competitor's copying of the same feature results in the competitor's product also evolving into a better species, perhaps even preferable to the clients new design. By tracking the presence of competitor genes and products within an EA exercise, the evolution of the best design, or a set of different favorable species, may be used to simulate, or evaluate, the competitive dynamics within a marketplace, such as the likely impact of introducing a new design into the competitive marketplace. Such analysis may allow, for example (a) estimates of the share an evolved design may achieve in relation to existing designs, (b) estimates of the impact that would be achieved by adopting a feature of a competitor product within a client's product, (c) estimates of what would occur if a competitor adopted a client's feature in its product, (d) the impact of the introduction of one or more species into a marketplace on the overall mix of market share of various alternative designs, and (e) the impact of introduction of new product designs or features on specific alternative designs (e.g., do particular species, when introduced, cannibalize similar species that are already in the marketplace that are revealed to be disfavored in the selection process). Taken together, introduction into EA and tracking within EA of competitor factors (genes, phenotypes, etc.) and market factors (share, such as weighting presence of members in an EA population by market share), including at seed population, mutation, selection, reproduction, and other steps, allows a range of novel analytic methods that provide insight into the role that a design or feature may have if introduced into the marketplace.

In embodiments, such analysis may include a game theoretic approach that stages a series of "rounds" of interaction among concepts that include competitor concepts, or concepts that include competitor genes, such that the impact of the presence of a competitor concept or gene on the outcome of a round of competition in a simulation or game may be estimated, at least in part, based on the fitness of such a solution as evaluated with an EA method, such as an GA method. Such game theoretic methods may aggregate a market share estimate across multiple competitive scenarios or rounds in order to reduce error or achieve improved accuracy of market share estimation.

Where a possible concept space or design space includes a large number of variations, as is the case for almost all products that include a large number of features, shares simulated by conventional measures, such as based on direct choice, can be quite inaccurate, or noisy, in a relative sense (as a comparison among designs) even though such estimates may appear precise in an absolute sense, such as in estimating market share. This may be due to small numbers assigned to each item in conventional methods. Conventional methods using aggregate utilities aren't subject to this problem, but such methods have other problems. In embodiments a hybrid approach uses round robin sets of 2 items, 3 items, etc., and agglomerates the results for these sets of all possible concepts within the larger simulated set, to arrive at a novel method of estimating a new share for a concept.

Embodiments may also include methods to estimate switching from one product to another, using a broad range of selectors who have indicated some preference for a product or concept, and projecting switching behavior down to a smaller group that likes a product most out of the larger simulated set. In general, one may use information from EA, and in particular GA, that includes various features, in order to provide estimates of share, or to improve or stabilize other estimates of share that may be derived from an understanding of switching behavior among items, in particular large sets of items.

Thus, in embodiments, the likelihood that a user may switch from one product version to another version, such as a competitive version, in a game-theoretic or simulation-based approach to estimating market share, may be based on the extent of preference of one or more concepts as compared to others as evidenced in an evolutionary process involving selection among many variants of concept.

In each of the embodiments described herein, information about products purchased most often by respondents may be considered and used, either to help seed or influence an EA, or to weight or evaluate results, such as by helping understand how the pool of respondents relates to the overall pool of purchasers who make up a market.

In embodiments, a survey of respondents may include requesting information about what product is purchased most often. Such information may be used to supply information in connection with the methods and systems disclosed herein, such as to include most often purchased products in an initial seeding population, including them at later stages, such as by constrained breeding, or including features from such products as genes in the EA methods described herein. In embodiments, a method may weight respondents so that the bought-most-often shares for a survey question correspond to actual measured sales/unit sales/volume sales data. This balancing or weighting may improve many sampling problems, both noise and bias, without requiring detailed and hard-to-implement weighting processes on secondary characteristics (e.g. race, gender, ethnicity, etc., which may or may not be linked to actual product preference). Such methods may also minimize the need to do post-hoc arbitrary calibration (e.g., specific effects adjustments). Thus, embodiments disclosed herein may include automatically weighting of products purchased as indicated by respondents to a survey to actual market share, such that respondent feedback is so weighted to share.

FIG. 14 depicts a distribution of feature genes for participant 2. Collar style "2" (tab collar) is the only surviving collar style. Participant 2 prefers a green body style (body style "6") and a long tab length (value equal to 1310).

Click and Comment

Figure 15:
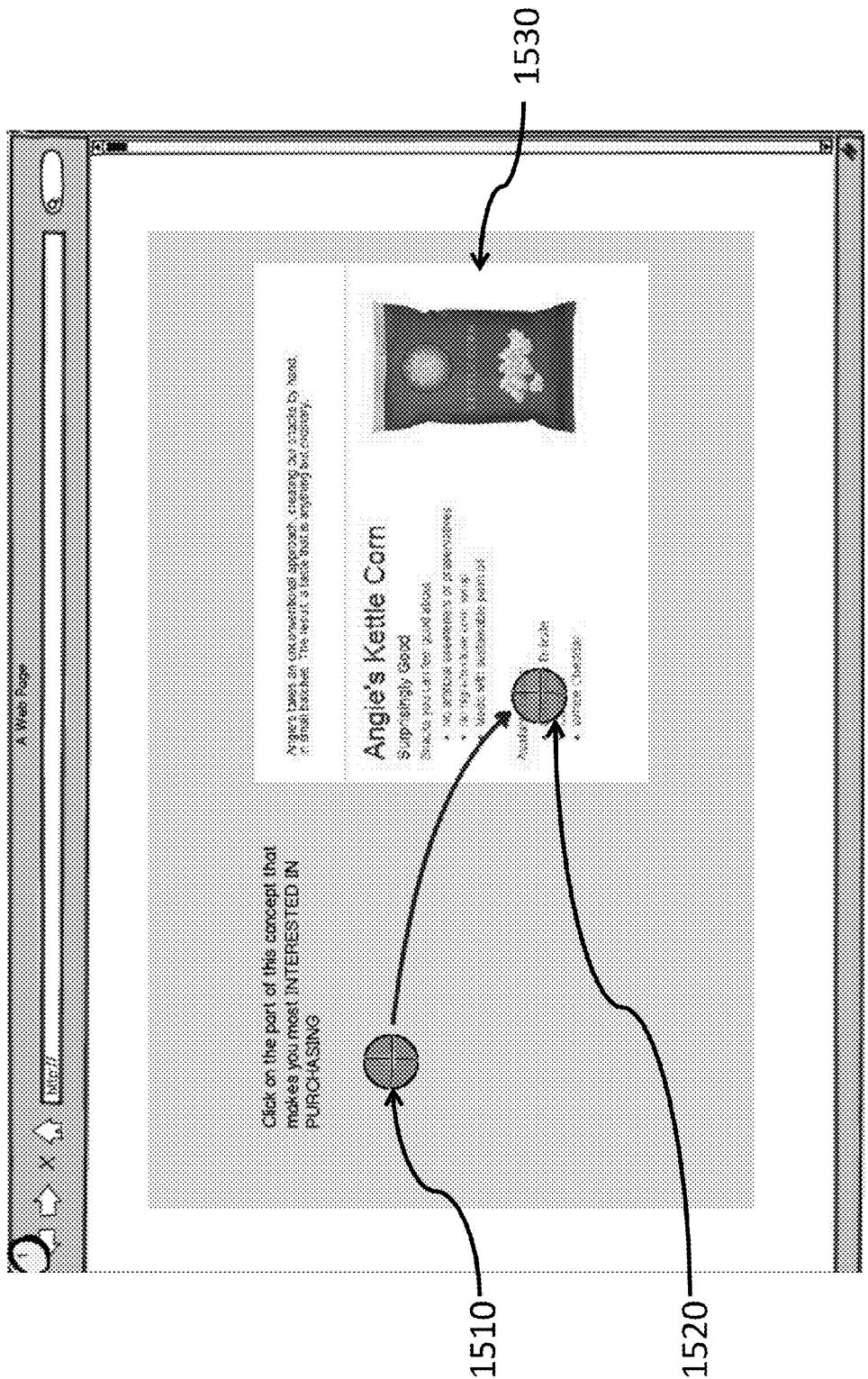
FIG. 15 is a screenshot depicting a user interface for gathering preferences related to a concept with a click input according to an exemplary and non-limiting embodiment.

In a further exemplary embodiment, a graphical user interface is provided to respondents and preferences are collected by click and comment input for featurized concepts. In this embodiment, respondents are presented with a graphically depicted concept and asked to indicate elements of the concept that they particularly like or dislike. FIG. 15 shows a screenshot of a product advertising concept along with a click indicator. In this case, the respondent uses an input device such as a mouse or a touch screen to indicate the areas on the concept graphic that contain the elements of the concept that are likes or dislikes. In FIG. 15, the respondent is shown dragging a colored indicator 1510 to an area where there is an element of the concept 1520 that the respondent likes. As such, the respondent clicks or touches on the areas associated with elements of the concept that are liked and then repeats for elements that are disliked to generate click data. A respondent can select none or one or more likes and dislikes on the concept graphic. While various graphic indications of the click location are possible, in FIG. 15 a colored circle with a cross is shown as the indicator 1520 being placed onto the concept graphic area liked. Dislikes can be similarly indicated with an indicator 1520 of different color or shape.

Figure 16:
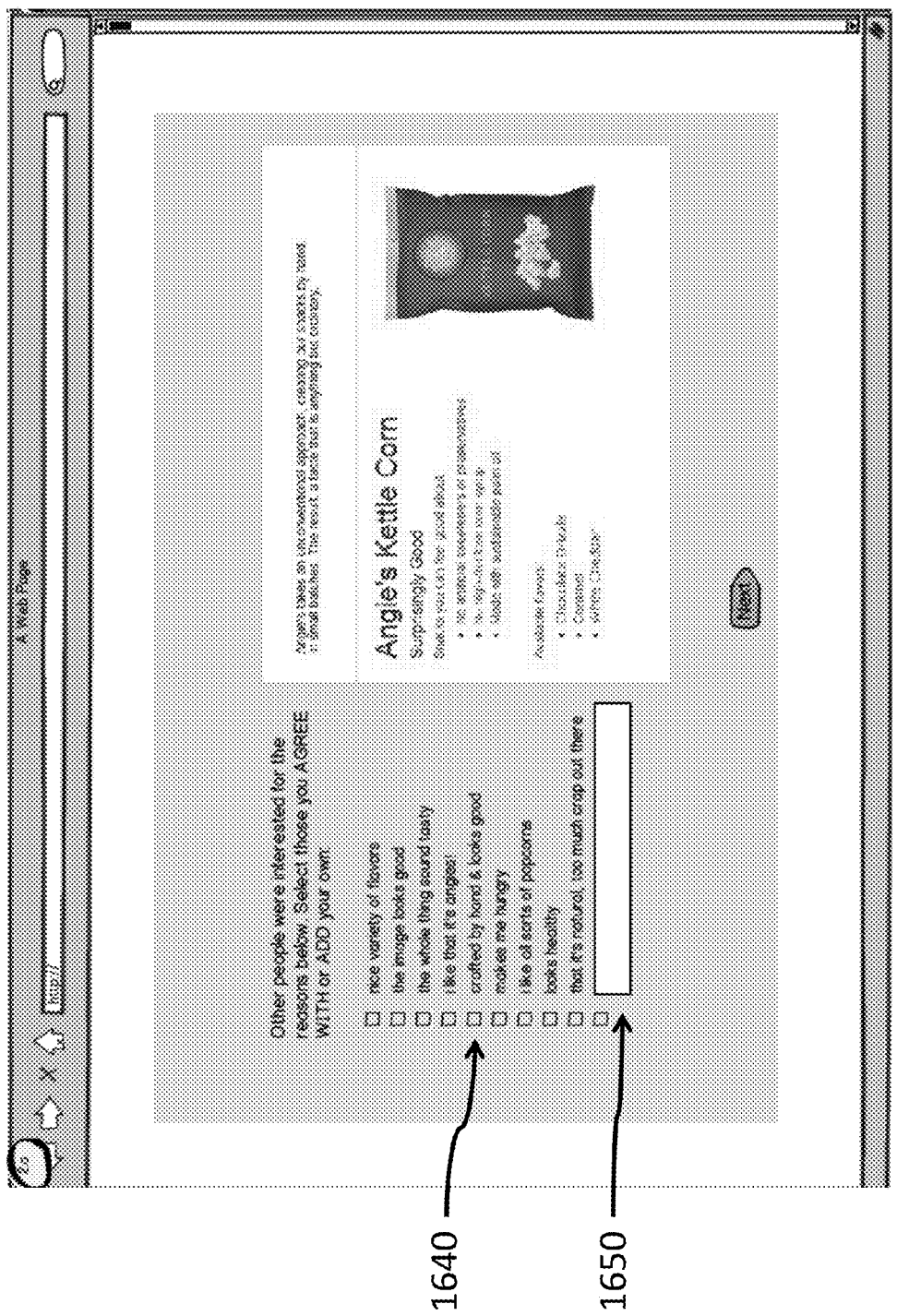
FIG. 16 is a screenshot depicting a user interface for text based explanation for a preference according to an exemplary and non-limiting embodiment.

After the respondent places a like or dislike mark 1520 on the particular element location, the respondent is invited to provide a comment explaining his or her selection, via a pop-up window or other user interface as shown in FIG. 16. In various embodiments, the respondent can be asked to provide a text based explanation or reason 1650 why they particularly like or dislike the element of the concept they have previously indicated. Alternately, a variety of explanatory statements 1640 can be provided and the respondent can choose which is most appropriate.

Figure 17:
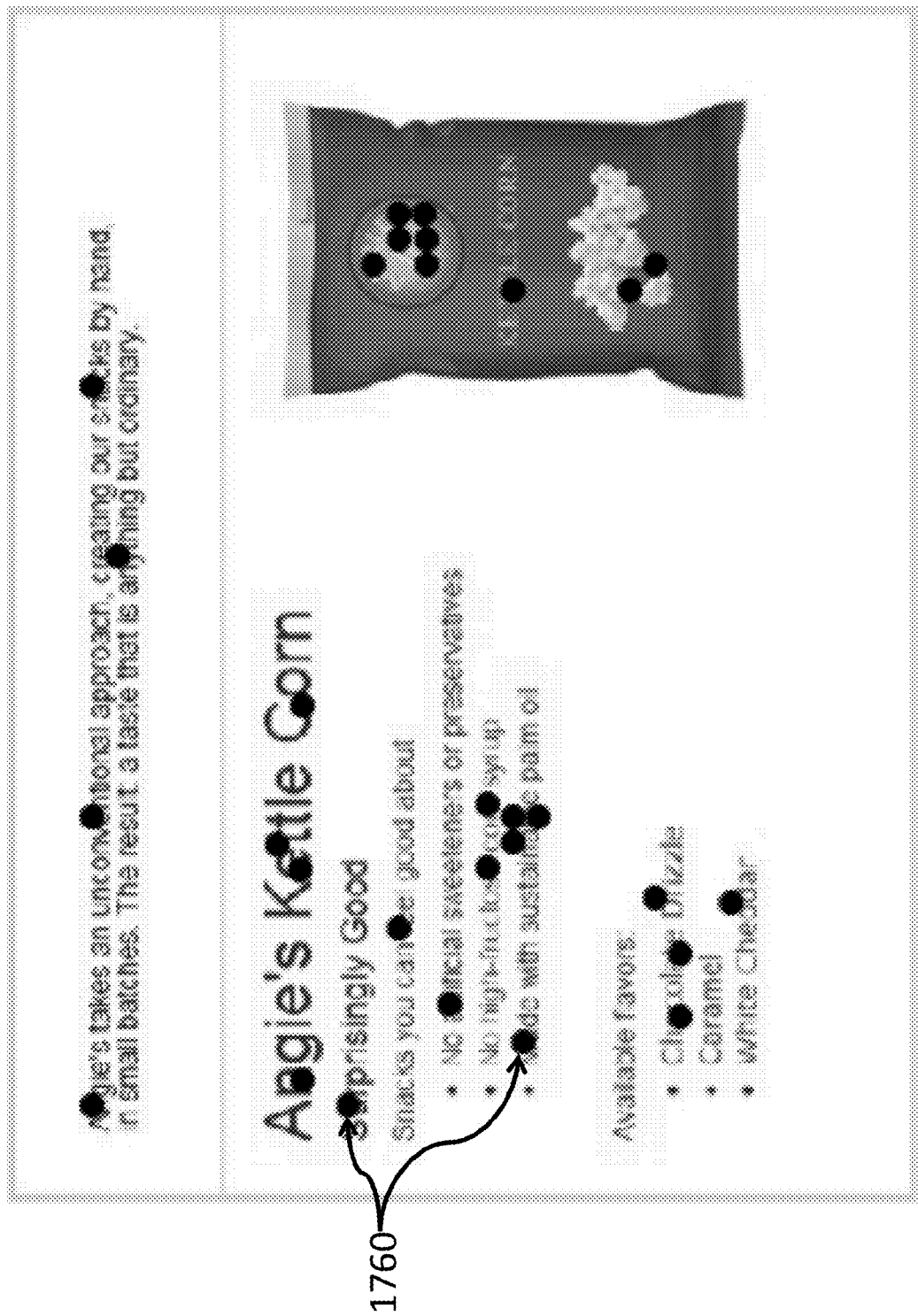
FIG. 17 is a screenshot depicting click locations from respondents according to an exemplary and non-limiting embodiment.
Figure 18:
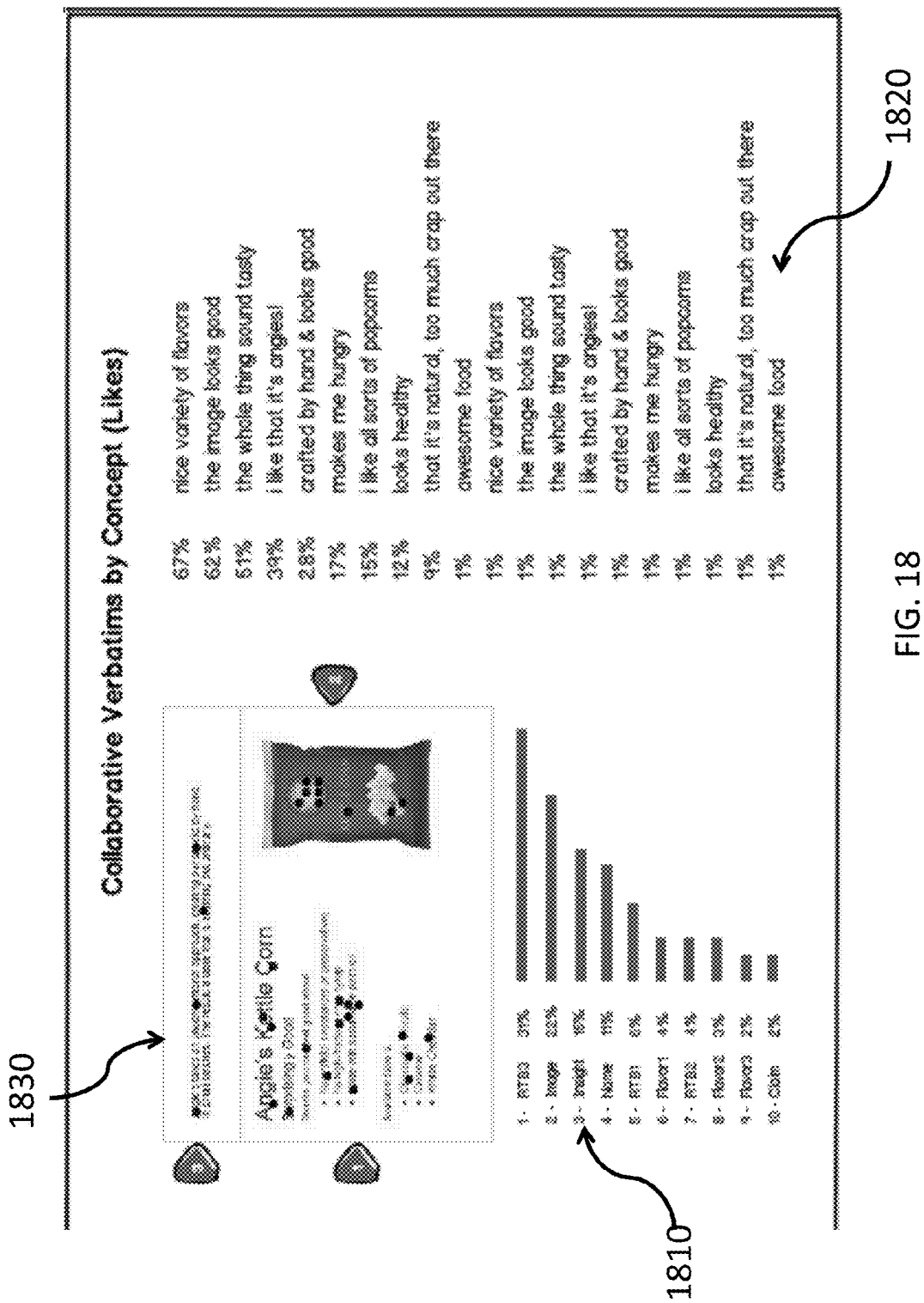
FIG. 18 is a screenshot of a summary of gathered preferences indicated by click along with text based explanations according to an exemplary and non-limiting embodiment.

After the respondent has provided the like or dislike indications, the click data can be analyzed. FIG. 17 is a screenshot of recorded click location data from a group of respondents overlaid onto a concept graphic. The click locations 1760, can then be associated with elements of the concept by the area where the element is presented and the relative number of clicks on each element of the concept can be determined. The comment data associated with each like or dislike can also be compiled. FIG. 18 shows a screenshot of example data gathered by click and comment from a group of respondents. The bar chart 1810 shows the distribution of like clicks for each of the elements presented in the concept. In this case, the top three likes are indicated as 1, 2 and 3 on the concept graphic 1830 shown above in FIG. 18, #1 is one of the Reasons to Buy, #2 is the Image of the package and #3 is the Insight into why the product should be desirable. A ranking table 1820 of the comment data and the recorded reasons provided why the respondents liked the product is also provided in FIG. 18.

Figure 19:
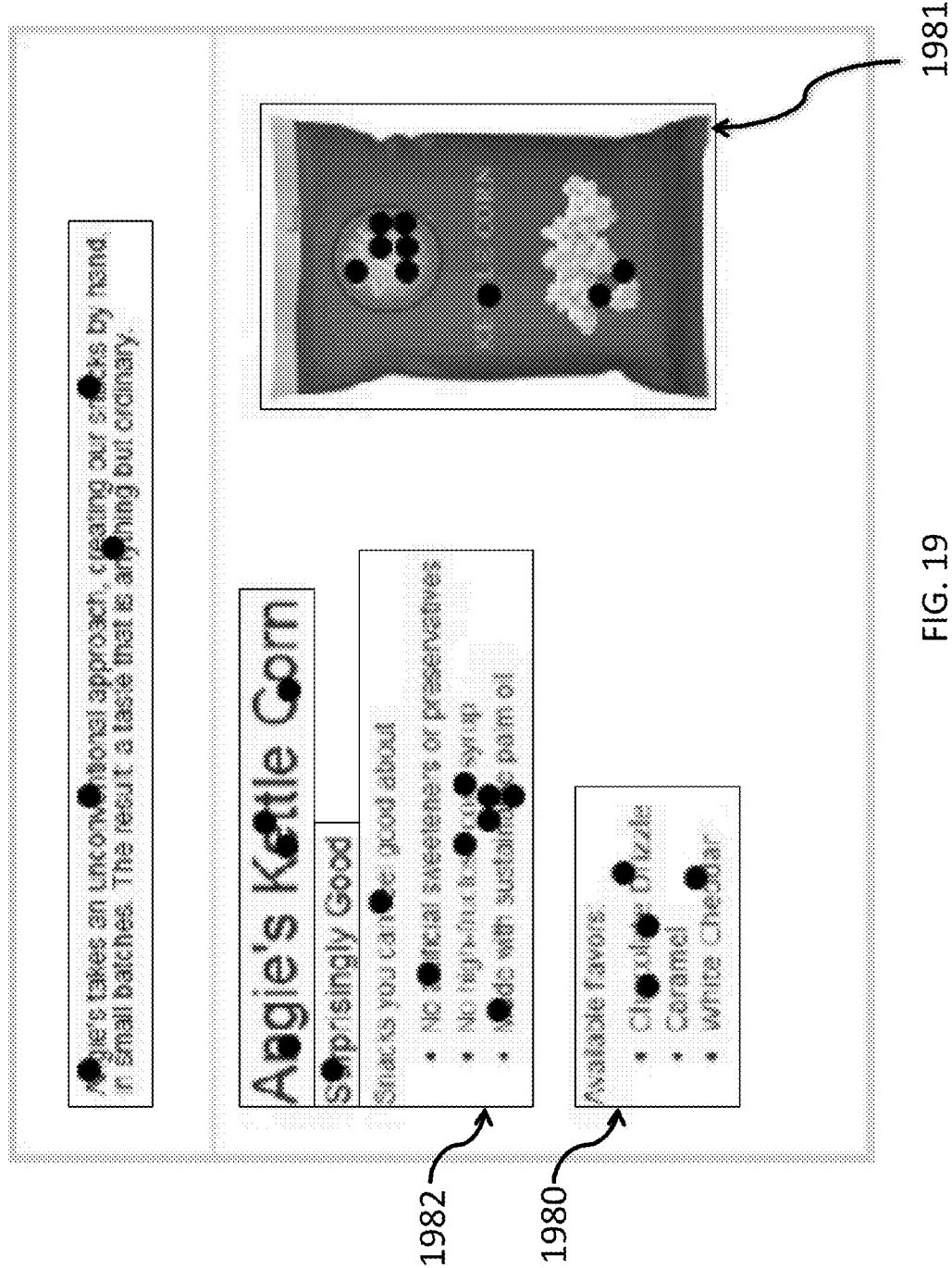
FIG. 19 is an illustration of zones surrounding elements of the concept with click locations according to an exemplary and non-limiting embodiment.

To make it easier to relate the click data to the elements of the concept, the areas of the concept graphic can be broken into zones. FIG. 19 is an illustration of zones, 1981 and 1982 for example that are associated with elements of the example concept. In this embodiment, click data inside zone 1980 is determined to be associated with the element of the concept that is presented in that area of the concept graphic. The zones 1980, 1981 and 1982 can be setup before the concepts are presented to the respondents so the gathering of the number of clicks for each zone can then be automatically determined. Zones 1980, 1981 and 1982 can be setup to be separate from one another or when different aspects of the same element are presented in different areas of the concept graphic, a zone can be connected to another zone (such as 1980 to 1981) to simplify data collection. For the example shown in FIG. 19, the zone 1981 that includes the image of the package received 9 clicks whereas the zone 1980 that includes the available flavors received 4 clicks. As such, the image of the package is deemed to be more important by the group of respondents to the product concept than the available flavors as shown in this concept graphic.

In another exemplary embodiment, the zones can be used to create a graphical user interface for presenting the data gathered from the respondents. In this case, the concept graphic is presented so that when an element zone is selected by a user, the click and comment data associated with that element is provided as a table or a graphic.

Figure 22:
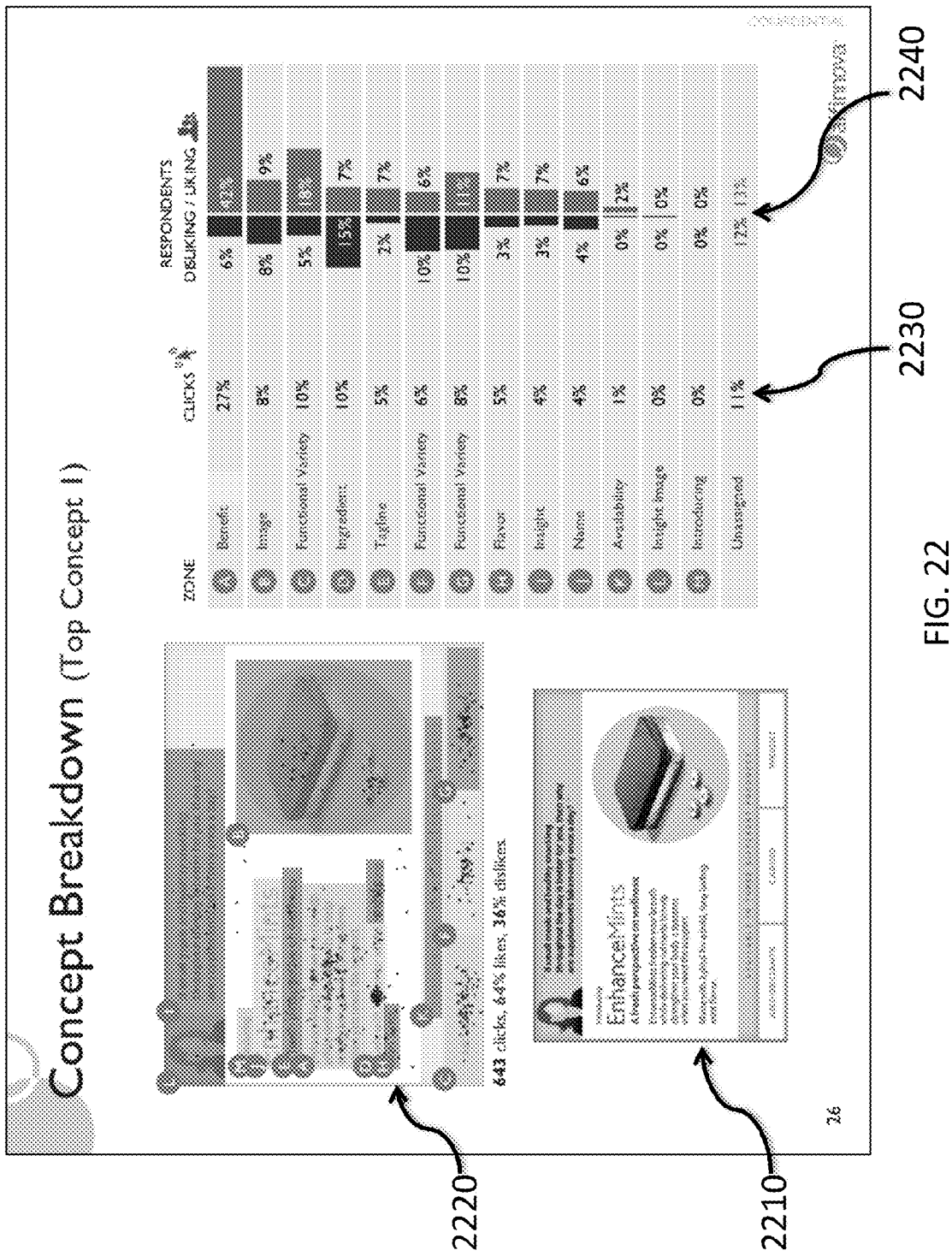
FIG. 22 is a screenshot of results showing the concept graphic, zones within the concept graphic, the click locations over the graphic and the likes and dislikes for the elements of the concept relative to the zones according to an exemplary and non-limiting embodiment.

FIG. 22 shows a screenshot of an aggregate of example data that may be obtained using the click and comment method. 2210 is the concept graphic as presented to the respondents. 2220 shows the concept graphic with the zones indicated and the click data shown. The table on the right side shows the results of analyzing the click and comment data from the respondents. 2230 is a list of the elements of the concept in order by the relative number of clicks received by each element. 2240 is a positive/negative dichotomous graphic that shows the % of respondents that liked or disliked each element.

Click Clustering

Figure 20:
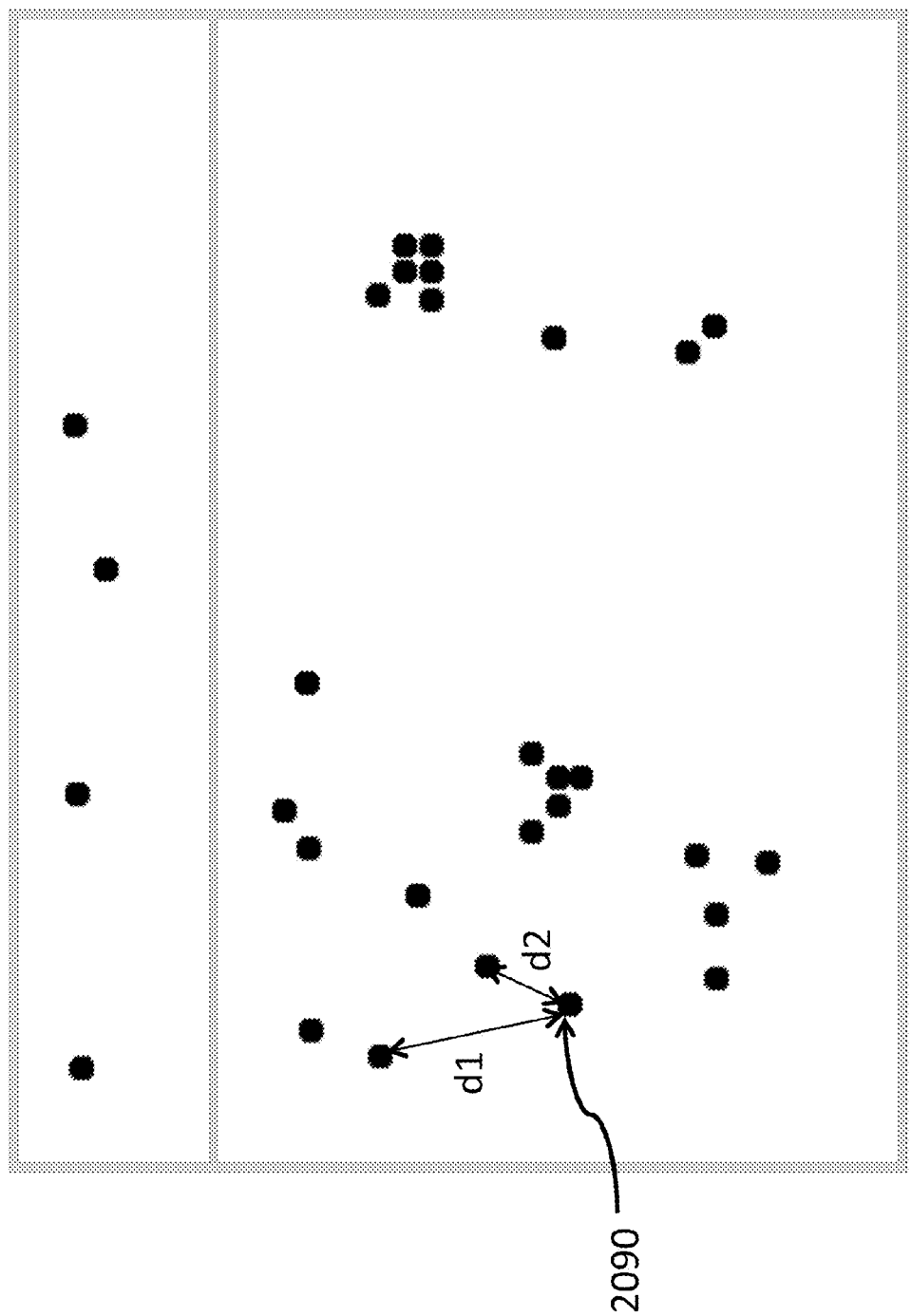
FIG. 20 is an illustration of the click locations over the entire concept graphic according to an exemplary and non-limiting embodiment.

In another embodiment, analysis is performed on click location data such as that shown in FIG. 20 to identify clusters of clicks, which are then linked as a group preference for an element of a graphically presented concept. There are a number of algorithms known to those skilled in the art for identifying clusters within data sets including density based algorithms, hierarchical algorithms and linkage algorithms.

The embodiments described herein introduce several innovative algorithms to substantially improve the identification of clusters in data generated from a click and comment type user interface, although it can be applied to other sources of data. Where click and comment datasets typically include the following:

- Data points consist of click locations on a graphical representation of a concept. The concept is typically a new product description, a message concept description, a product package, an advertisement, an image of a direct mail piece, or other two dimensional representation (possibly of a three dimensional object).
- The graphical representation is often wider than it is tall, due partly to aspect ratios but also due to the inherent visible field of vision of the human eye. For example, classic dimensional ratios are 3 high×4 wide, 2 high×3 wide, or 1 high×1.68 wide (the golden mean).
- The graphics frequently include text, either represented as lines, sentences, or bulleted statements. This text can indicate a product description, one or more claims, one or more statements of fact, a tagline, or something else.
- The graphical representation can include images of various sizes, such as product pictures inset below a full description of the product and how it should be used.
- The graphical representation can include background colors, textures, objects, irregular shapes, inset images of packages, logos, seals, animals, people, plants, buildings, faces, decorative designs, emotive imagery, and so forth.

The click locations generally correspond with elements or areas of interest on the graphical representation of the concept. For example, clusters of clicks can concentrate in areas that people like or dislike on the graphical representation of the concept, which may strongly emphasize certain elements of the concept over others. Data of this sort represents many strong challenges to existing clustering algorithms. For example:

Many existing algorithms have extreme difficulty with irregular (non-circular) shapes.

Many existing algorithms have a strong bias to creating clusters of more equal size.

Many existing algorithms require a single focus for a cluster that is based on density (a center point, mean, or similar parameter).

More sophisticated density based algorithms which offer flexibility in the covariance structure estimation for clusters may require a lot of data and/or be extremely sensitive and non-robust.

Many existing algorithms apply to spaces with dimensions that are equally weighted.

Many (or all) existing algorithms execute a single pass through, seeking clusters that meet one criterion for success.

Some algorithms are designed to identify irregularly shaped clusters that are limited to specific types of irregular shapes that must be pre-specified, or that conform to specific dimension reduction techniques (like spectral decomposition or matrix-based dimension reduction).

Algorithms that are designed to identify a wide range of irregularly shaped clusters can be extremely unstable and lack robustness.

In accordance with exemplary and non-limiting embodiments, there are provided several significant innovations to existing clustering algorithms that are adapted to the specific needs of the "click-and-comment" interface described above.

In an embodiment of a clustering algorithm, an extended linkage clustering algorithm is provided wherein m linkages are used to define clusters of data in a set. This algorithm begins with a set of seed clusters each containing a minimum number (K) of datapoints, wherein the datapoints are all within a predetermined maximum distance of each other, and then extends the clusters by sequentially including any datapoints that are within a predetermined maximum distance of at least m datapoints that are already in the cluster. Where m is less than the total number of datapoints in the set and where distance d can be determined between datapoints located at $X_1, Y_1$ and $X_2, Y_2$ by using the equation below or other types of distance algorithms.

$$d=sqrt((X_1-X_2)^2+(Y_1-Y_2)^2)$$

Simple variations can extend to datapoints that are within the maximum distance proportional to the number of datapoints in the cluster, or extend to datapoints that have a predetermined maximum average distance to the nearest n datapoints in the cluster. The key advantage of this algorithm is that it can reliably identify irregularly shaped clusters and unequally sized clusters, while dramatically reducing problems associated with other linkage algorithms due to chaining effects. Instead of requiring a single datapoint to "chain" or "bridge" between two groups of datapoints, at least K datapoints are required to identify the group of datapoints as a cluster, which dramatically reduces the chances of single outlier datapoints causing adjacent clusters to be grouped together as a single cluster. Where outlier datapoints are common and may result from "misclicks" or from cheating behaviors as discussed previously. If K is kept sufficiently low (e.g. 4 or 10), a K clustering algorithm retains the ability to identify very irregular clusters while avoiding problems due to outlier datapoints. K, m and n can be selected arbitrarily, or as a function of the data (for example, as a percentage or ratio of the total number of data points).

In another embodiment, a clustering algorithm is provided that includes the use of integrated exogenous information from the graphical representation of the concept. This algorithm augments the measurement of distance between datapoints with supplemental information drawn from the content of the graphics that underlie the datapoints. By including information from the underlying graphics that is associated with the datapoints during the analysis, it can be easier to identify clusters of datapoints. As such, the underlying graphics help to structure the datapoints by adding additional layers of data to discriminate between datapoints, but do not determine the datapoints.

Information from the underlying graphics that can be useful to associate with datapoints to make it easier to identify clusters relative to the concept being evaluated can include for example:

Colors, or color regions in the graphic.

Text regions such as in the same line of text or in the same sentence.

Individual objects within the graphic.

Pre-identified regions including information from the image's construction such as the software used to generate the region of the graphic (e.g. Microsoft PowerPoint or Affinnova Studio).

This exogenous information from the underlying graphics could be used in any portion of the clustering algorithm, and in many different algorithms. For example, it could be introduced as a direct modification of the distance function (as described above), or as a mechanism for proposing solutions for a distance-based algorithm, or as a method for adding robustness to linkage based algorithms by downplaying points that appear outside of known regions of interest. For example:

$$Similarity_{I,J}=K_0*SimilarityBase_{I,J}+K_1*SimilarityObject+K_2*SimilarityText+K_3*SimilarityColor+ \ldots$$

Where:

The K values are constants that are greater than zero and sum to 1.

The similarity values are all between 0 and 1

Similarity Base is the similarity derived from the geometric position of the points (from the clicks)

SimilarityObject is a value indicating whether (or how likely) the points are contained within the same object (presumably derived from automated object extraction software or otherwise provided by a user, or some combination thereof)

SimilarityText is a value indicating whether (or how likely) the points are contained within the same text field or text line (presumably derived from OCR, possibly combined with content analysis or domain specific algorithms)

SimilarityColor is a value indicating the similarity of the colors for the pair of pixels (or pixel regions) that map to the points (clicks) that are superimposed onto the image.

In yet another embodiment, a clustering algorithm is provided that includes the use of integrated dimension biased exogenous information based on domain specific content. One of the key problems associated with identifying clustered on a graphically representation of a concept is that the graphic is likely to contain objects which "stretch" in one direction such as, text. Thus, standard clustering algorithms are likely to group two horizontal clusters of points that are "stacked" on top of each other together as a single cluster, when in fact those clusters are distinct and are derived from likes and dislikes relating to underlying lines of text. This issue can be substantially ameliorated by applying an exogenous shrinkage factor to one dimension of regions of datapoints, thereby changing linearly extended groups of datapoints to more easily identify clusters. For the case of text, this shrinkage factor is typically horizontally oriented. However shrinkage factors can be applied broadly to different types of click location data associated with a graphic representation of a concept. Indeed, this general approach can be combined with various computer image analysis techniques to identify linearly extended objects or regions of interest, and apply shrinkage factors only or primarily to areas dominated by datapoints that overlay such linearly extended objects or regions of interest such as text. Alternatively, a shrinkage factor can apply to an entire image, and may utilize information about the overall dimensionality of the image (or of sub-images identified through image extraction mechanisms) to apply shrinkage factors to all or parts of a set of points.

A shrinkage factor is a simple factor that indicates that one dimension of distance (for example, horizontal) should be treated as less important than another. Thus in an example, if datapoint A is 40 pixels from datapoint B in the X dimension, a shrinkage factor of 2, would mean that datapoint A is analyzed as if it were only 20 pixels from datapoint B in the X dimension. Various algorithms for measuring separation distances between datapoints as well as linkage algorithms can be applied to the data set after a shrinkage factor has been applied.

In yet a further embodiment, a clustering algorithm is provided that includes the use of multistage clustering analysis for diverse sets of datapoints that are expected to have different sizes and densities of data clusters. This can occur for example when a background scene is included as an element in the concept being evaluated along with other localized elements, so that datapoints associated with click locations are diffusely spread over the background along with small tight clusters. If the parameters of a clustering algorithm are set to ensure that we separate small, dense clusters, then we are almost certain to miss the large diffuse cluster. On the other hand, if the parameters of a clustering algorithm are set to ensure that we find the large diffuse cluster, then we are almost certain to merge together the smaller, dense, and cleanly separated clusters. Therefore, in this embodiment, a multistage clustering analysis is provided. Wherein, the first stage analysis is intended to identify small and sharply defined clusters of datapoints, with algorithmic parameters selected appropriately. The second (or subsequent) stage of analysis is intended to identify larger and more diffuse clusters, with different algorithmic parameters. Modifications to this multistage approach can be implemented to prevent clusters in the second (or subsequent) stage that overlap and/or contain clusters from prior stages.

Figure 25:
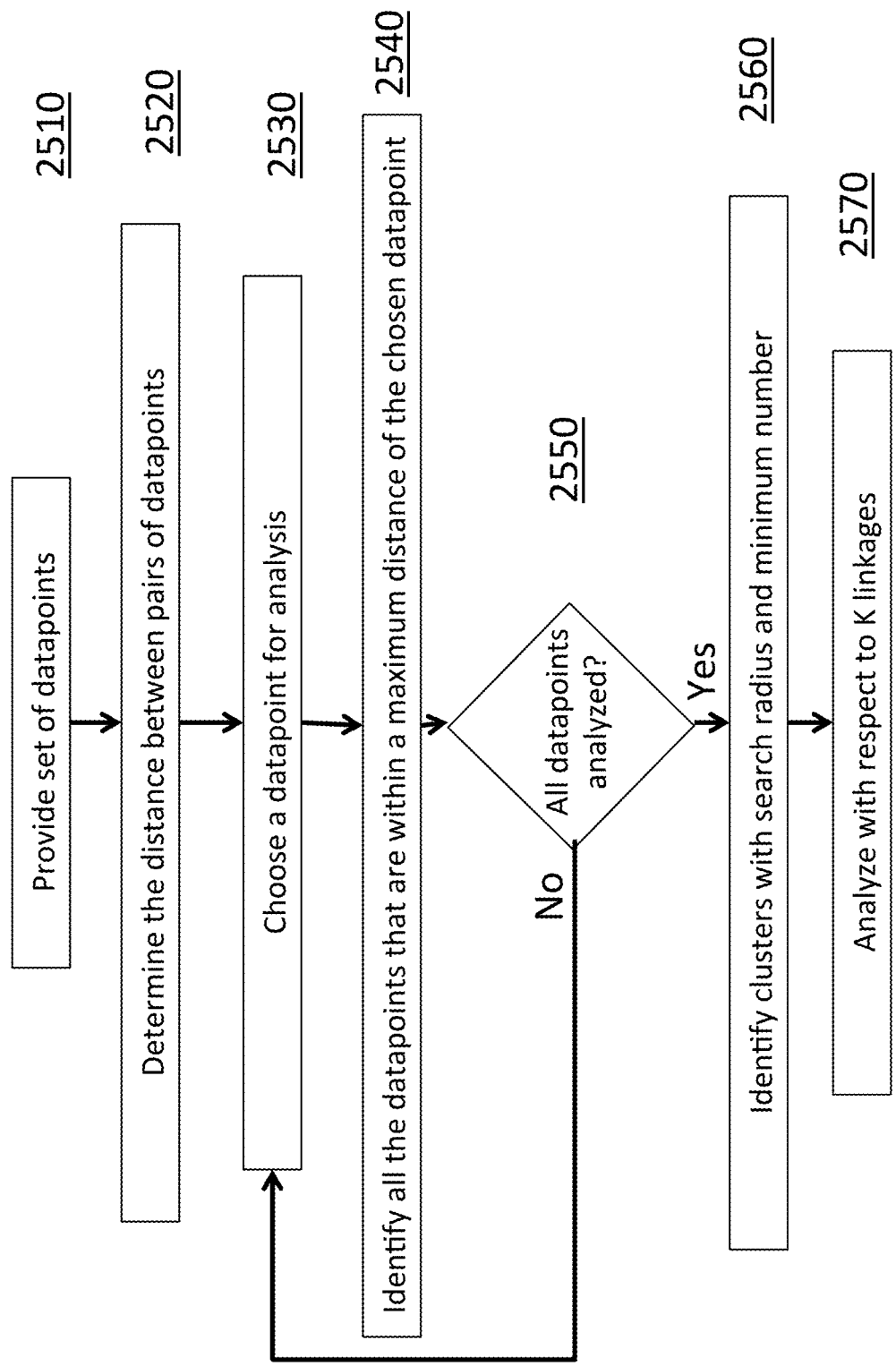
FIG. 25 is a flowchart of a method of identifying clusters among sets of click data points from an evaluation of a graphical representation of a concept according to an exemplary and non-limiting embodiment.

FIG. 25 is a flowchart for clustering analysis using the methods described herein. In Step 2510, a set of datapoints is provided for clustering analysis from a click and comment evaluation of a graphic representation of a concept. In Step 2520, distances d are determined between pairs of datapoints. In this step, the distances can be determined between all the pairs of all the datapoints or the distances can be determined between datapoints in identified regions of interest related to the graphic representation of the concept being evaluated. FIG. 20 shows an example for the distances d1 and d2 to adjacent datapoints from datapoint 2090. Where the distance data for the datapoints and datapoint pairs is typically stored in a distance matrix along with any relevant exogenous data from the underlying graphic. Shrinkage factors or distance biasing based on exogenous data can be applied during the distance determination step as appropriate to the nature of the elements of the graphic representation of the concept and as discussed previously. The exogenous data can be used to separate different groups of datapoints for analysis, such as all the datapoints from a blue region or a text region are analyzed together.

In Step 2530 a datapoint is chosen for clustering analysis. Then in Step 2540, the neighboring datapoints are identified that are within a maximum search distance of the chosen datapoint. If there are more datapoints than a minimum cluster number (e.g. 4 or 10) that meet this search distance criteria, the group of datapoints is identified as a cluster. In Step 2550, the datapoints are checked between those that have been analyzed and those that have not been analyzed and the analysis process lops back through Steps 2530 and 2540 until all of the datapoints have been analyzed. Then in Step 2560, all the clusters with a minimum number of datapoints and a maximum distance between the datapoints are identified and the associated datapoints are assigned to individual clusters and the associated locations of the clusters relative to the graphic representation of the elements of the concept being evaluated.

Figure 21:
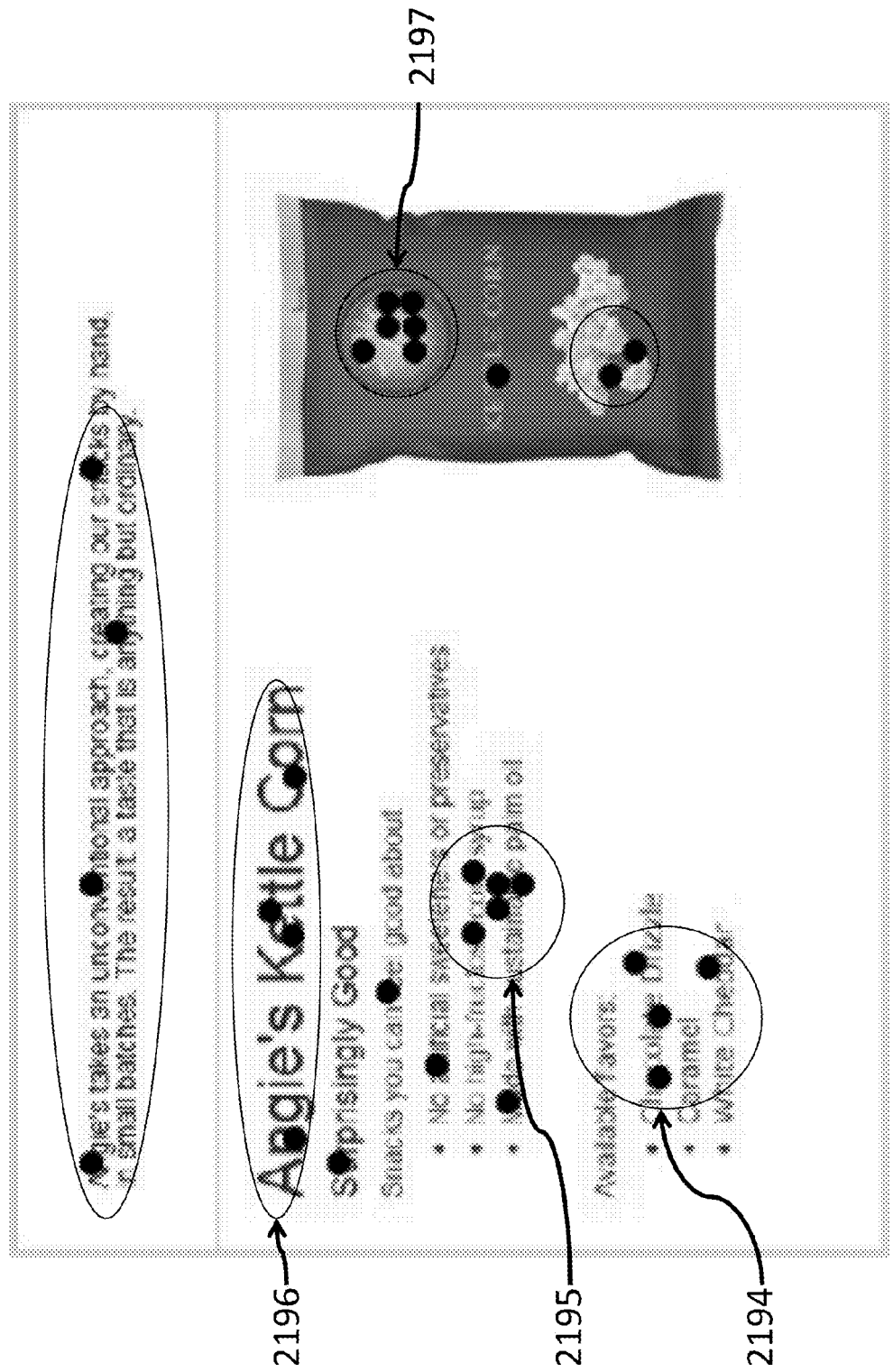
FIG. 21 is an illustration of the clusters of clicks identified over the concept graphic according to an exemplary and non-limiting embodiment.

In Step 2570, the remaining datapoints that have not been assigned to clusters are analyzed for clustering by including linkages with other datapoints across the clusters, where the number of linkages is chosen to be small (e.g. 2 or 3). If new clusters are then identified, the datapoints are assigned to the cluster along with the location of the cluster relative to the graphic representation of the concept. This step can be repeated using the identified clusters to determine whether any of the cluster should merged. The end result, is a series of identified clusters with associated locations relative to the elements of the graphic representation of the concept being evaluated as shown for example in FIG. 21. Where in FIG. 21 a number of clusters such as 2194, 2195, 2196 and 2197 have been identified and the associated groups of datapoints have been encircled to highlight the cluster over the underlying elements of the concept. The clusters and number of datapoints in each cluster can be used to determine the relative importance of different elements of the concept as determined by the group of respondents.

Derived Elements

In evaluating the results of a clustering analysis relative to the graphic representation of the concept being evaluated, it is interesting to note that derived elements can be identified that are different from the zoned elements shown in FIG. 19. An example, is provided by the tight cluster of datapoints 2197 over the graphic element on the package which is a small portion of the much larger package zone 1981 shown in FIG. 19. Obviously the respondents were very interested by the graphic element under cluster 2197 while they were less interested in the package as a whole. Likewise, the cluster 2195 shows a derived element that is a portion of the larger text zone 1982 shown in FIG. 19. The cluster 2195 indicates a small, derived element, which includes specific aspects of the text statements related to why the user can feel good about the product, such as the use of sustainable ingredients. In the case shown in FIG. 21, clustering analysis was used to evaluate the click data provided by a group of respondents and as a result, a number of derived elements (such as those in the graphic underlying clusters 2194, 2195, 2196 and 2197) were identified as points of interest by the respondents. The value of this cluster analysis is shown by the fact that the derived elements are different from the zone elements shown in FIG. 19. In addition, the derived elements can be more specific than the zone elements so that more insight is gathered from the click input data provided by the respondents.

In one embodiment, the demographic information collected about each user may be used to alter the evolutionary algorithm described above. For example, a system may accept input from a wide universe of users but only use input from a set of users having a particular demographic for the purposes of evolving the universe of design objects. This embodiment allows the manufacturer to determine the preferences of a particular market segment without requiring the manufacturer to affirmatively direct a market research effort at a particular demographic market.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A method comprising:
   (i) determining, by executing an instruction with a processor, data points associated with components of a graphical user interface;
   (ii) determining, by executing an instruction with the processor, a distance between respective ones of the data points and respective ones of the other data points;
   (iii) identifying, by executing an instruction with the processor, a presentation format of respective ones of the components of the graphical user interface;
   (iv) one of maintaining or modifying, by executing an instruction with the processor, the determination of the distance between the respective ones of the data points and respective ones of the other data points based on the presentation format of the respective components of the graphical user interface;
   (v) choosing, by executing an instruction with the processor, a first one of the data points;
   (vi) identifying, by executing an instruction with the processor, all of the other data points within a maximum distance of the chosen data point;
   (vii) repeating, by executing an instruction with the processor, (v)-(vi) choosing a different one of the data points until all of the data points have been chosen;
   (viii) reducing cluster identification bias by identifying, by executing an instruction with the processor, one or more clusters, respective ones of the one or more clusters having a predefined minimum number, K, of data points within a predefined search radius; and
   (ix) preventing identification errors of the one or more clusters caused by outlier data points of the data points by analyzing the one or more clusters with respect to K linkages.

2. The method of claim 1, wherein the analyzing of the one or more clusters includes extending respective ones of the clusters.

3. The method of claim 2, wherein the analyzing of the one or more clusters includes extending respective ones of the clusters to include any data points within a predetermined maximum span of at least m data points forming the cluster, wherein m is less than a total number of all of the data points.

4. The method of claim 2, wherein the analyzing of the one or more clusters includes extending respective ones of the clusters to include any data point that is within a maximum span proportional to a number of data points in the cluster.

5. The method of claim 2, wherein the analyzing of the one or more clusters includes extending respective ones of the clusters to include any data point that is within a predetermined maximum average distance to a nearest n data points in the cluster.

6. The method of claim 1, wherein respective ones of the data points correspond to a click location from the graphical user interface of a product presented on a display.

7. The method of claim 6, further including utilizing information associating a location of respective ones of the data points to an attribute of the graphical user interface to identify the one or more clusters.

8. The method of claim 7, wherein the attribute of the graphical user interface is at least one of a color, a color region, a shape, a text region or a pre-identified region.

9. A tangible computer readable storage device or storage disk comprising instructions which, when executed, cause a processor to, at least:
   (i) determine data points associated with components of a graphical user interface;
   (ii) determine a distance between respective ones of the data points and respective ones of the other data points;
   (iii) identify a presentation format of respective ones of the components of the graphical user interface;
   (iv) one of maintain or modify the determination of the distance between the respective ones of the data points and respective ones of the other data points based on the presentation format of the respective components of the graphical user interface;
   (v) choose a first one of the data points;
   (vi) identify all of the other data points within a maximum distance of the chosen data point;
   (vii) repeat (v)-(vi) choosing a different one of the data points until all of the data points have been chosen;
   (viii) reduce cluster identification bias by identifying one or more clusters, each of the one or more clusters having a predefined minimum number, K, of data points within a predefined search radius; and
   (ix) analyze the one or more clusters with respect to K linkages to prevent identification errors of the one or more clusters caused by outlier data points of the data points.

10. The computer readable storage device or storage disk of claim 9, wherein the instructions, when executed, cause the processor to extend respective ones of the clusters when analyzing the one or more clusters.

11. The computer readable storage device or storage disk of claim 10, wherein the instructions, when executed, cause the processor to extend respective ones of the clusters to include any data points within a predetermined maximum span of at least m data points forming the cluster, wherein m is less than a total number of all of the data points.

12. The computer readable storage device or storage disk of claim 10, wherein the instructions, when executed, cause the processor to extend respective ones of the clusters to include any data point that is within a maximum span proportional to a number of data points in the cluster.

13. The computer readable storage device or storage disk of claim 10, wherein the instructions, when executed, cause the processor to extend respective ones of the clusters to include any data point that is within a predetermined maximum average distance to a nearest n data points in the cluster.

14. The computer readable storage device or storage disk of claim 9, wherein the instructions, when executed, cause the processor to identify respective ones of the data points corresponding to a click location from the graphical user interface of a product presented on a display.

15. The computer readable storage device or storage disk of claim 14, wherein the instructions, when executed, cause the processor to utilize information associating a location of respective ones of the data points to an attribute of the graphical user interface to identify the one or more clusters.

16. The computer readable storage device or storage disk of claim 15, wherein the instructions, when executed, cause the processor to select the attribute of the graphical user interface to be at least one of a color, a color region, a text region or a pre-identified region.

* * * * *